US011465001B2

(12) United States Patent
Connor

(10) Patent No.: US 11,465,001 B2
(45) Date of Patent: Oct. 11, 2022

(54) SMILE-THROUGH™ TRANSPARENT SMART MASK

(71) Applicant: Robert A. Connor, St. Paul, MN (US)

(72) Inventor: Robert A. Connor, St. Paul, MN (US)

(73) Assignee: Medibotics LLC, St. Paul, MN (US)

( * ) Notice: Subject to any disclaimer, the term of this patent is extended or adjusted under 35 U.S.C. 154(b) by 0 days.

(21) Appl. No.: 17/408,409

(22) Filed: Aug. 21, 2021

(65) Prior Publication Data

US 2021/0379424 A1   Dec. 9, 2021

Related U.S. Application Data

(63) Continuation-in-part of application No. 17/175,675, filed on Feb. 14, 2021, which is a continuation-in-part of application No. 16/910,625, filed on Jun. 24, 2020, now abandoned.

(60) Provisional application No. 63/088,664, filed on Oct. 7, 2020, provisional application No. 63/035,744, filed on Jun. 6, 2020, provisional application No. 63/023,331, filed on May 12, 2020, provisional application No. 63/017,718, filed on Apr. 30, 2020.

(51) Int. Cl.
| | |
|---|---|
| *A62B 23/02* | (2006.01) |
| *A62B 18/00* | (2006.01) |
| *A62B 18/08* | (2006.01) |
| *B01D 46/00* | (2022.01) |
| *B01D 46/46* | (2006.01) |
| *A41D 13/11* | (2006.01) |
| *B01D 46/62* | (2022.01) |

(52) U.S. Cl.
CPC ............ *A62B 23/025* (2013.01); *A41D 13/11* (2013.01); *A62B 18/003* (2013.01); *A62B 18/08* (2013.01); *B01D 46/0043* (2013.01); *B01D 46/46* (2013.01); *B01D 46/62* (2022.01); *B01D 2273/30* (2013.01)

(58) Field of Classification Search
CPC ..... A62B 18/006; A62B 18/02; A62B 18/025; A62B 23/02; A62B 23/025
See application file for complete search history.

(56) References Cited

U.S. PATENT DOCUMENTS

| | | | |
|---|---|---|---|
| 4,323,063 A | 4/1982 | Fisichella | |
| 4,848,366 A | 7/1989 | Aita | |
| 6,257,235 B1 * | 7/2001 | Bowen | ................ A62B 23/025 128/206.12 |
| 7,802,572 B2 | 9/2010 | Hahne | |
| 10,758,751 B2 | 9/2020 | Feasey | |
| 10,945,469 B1 | 3/2021 | Rosenberg et al. | |
| 2006/0230485 A1 | 10/2006 | Lee | |

(Continued)

OTHER PUBLICATIONS

Civility, 2020, "French Startup Launches First High-Tech Transparent Protective Anti-COVID Mask," AccessWire.com, Jun. 17, 2020.

(Continued)

*Primary Examiner* — Valerie L Woodward

(57) ABSTRACT

This invention is a smart face mask for air filtration with a transparent mouth-covering portion, an active air filtration system which filters both air inflow and air outflow, an environmental or biometric sensor, and a smart control mechanism wherein the operation of the active air filtration system is automatically adjusted based on analysis of data from the sensor.

2 Claims, 15 Drawing Sheets

(56) References Cited

U.S. PATENT DOCUMENTS

| | | | |
|---|---|---|---|
| 2010/0006097 A1* | 1/2010 | Frater | F04D 29/663 |
| | | | 415/119 |
| 2010/0239625 A1 | 9/2010 | Puckett | |
| 2011/0108035 A1 | 5/2011 | Samaniego | |
| 2012/0174922 A1* | 7/2012 | Virr | A61M 16/106 |
| | | | 128/206.28 |
| 2013/0104733 A1* | 5/2013 | Bangera | A62B 23/025 |
| | | | 128/206.12 |
| 2014/0373846 A1 | 12/2014 | Kao et al. | |
| 2017/0007861 A1* | 1/2017 | Parham | A62B 18/025 |
| 2018/0028846 A1* | 2/2018 | Hur | A61M 16/0051 |
| 2018/0078798 A1* | 3/2018 | Fabian | A62B 18/025 |
| 2018/0236275 A1* | 8/2018 | Song | A62B 18/10 |
| 2018/0296864 A1* | 10/2018 | Feasey | A61F 9/029 |
| 2019/0009114 A1 | 1/2019 | Han | |
| 2019/0069615 A1 | 3/2019 | Lam | |
| 2019/0275357 A1* | 9/2019 | Palmer, Jr. | H04M 1/72412 |
| 2020/0164236 A1* | 5/2020 | Seo | A62B 18/025 |
| 2020/0206545 A1* | 7/2020 | Kim | A62B 18/006 |
| 2020/0282242 A1 | 9/2020 | Virr et al. | |
| 2020/0353294 A1 | 11/2020 | Feasey | |
| 2020/0376213 A1 | 12/2020 | He | |
| 2020/0397087 A1 | 12/2020 | Crenshaw | |
| 2020/0406069 A1 | 12/2020 | Fu | |
| 2021/0001157 A1 | 1/2021 | Rashaud | |
| 2021/0077762 A1 | 3/2021 | Mauger | |
| 2021/0086005 A1 | 3/2021 | O'Brien | |
| 2021/0219636 A1 | 7/2021 | Stroiazzo-Mougin | |
| 2021/0228920 A1 | 7/2021 | Arigue | |
| 2021/0275842 A1* | 9/2021 | Conrad | A62B 23/025 |

OTHER PUBLICATIONS

Honeywell, 2021, "Will.i.am Debuts Innovative Face Technology Concept," Honeywell.com, Apr. 6, 2021.

Razer, 2021, "Razer Unveils Smart Mask and Gaming Chair Concept Designs at CES 2021," Razer.com, Jan. 21, 2021.

Redcliffe Medical, 2020, "LEAF: Self-Sterilizing, Transparent N99+ Mask," PR Newswire, May 14, 2020.

Scharper, 2018, "Clearly A Better Mask: Alums Allysa Dittmar and Aaron Hsu Are Reinventing the Surgical Mask to Make Quality Health Care Accessible," Johns Hopkins Magazine, Winter, 2018.

Stegman, 2021, "Ford Designs Clear N95 Masks to Help Deaf or Hard of Hearing," Arc Publishing, Feb. 3, 2021.

* cited by examiner

SMILE-THROUGH™ TRANSPARENT SMART MASK

CROSS-REFERENCE TO RELATED APPLICATIONS

This application is a continuation in part of U.S. patent application Ser. No. 17/175,675 filed on 2021 Feb. 14. This application claims the priority benefit of U.S. provisional patent application 63/088,664 filed on 2020 Oct. 7. U.S. patent application Ser. No. 17/175,675 claimed the priority benefit of U.S. provisional patent application 63/088,664 filed on 2020 Oct. 7. U.S. patent application Ser. No. 17/175,675 was a continuation in part of U.S. patent application Ser. No. 16/910,625 filed on 2020 Jun. 24. U.S. patent application Ser. No. 17/175,675 claimed the priority benefit of U.S. provisional patent application 63/035,744 filed on 2020 Jun. 6. U.S. patent application Ser. No. 17/175,675 claimed the priority benefit of U.S. provisional patent application 63/023,331 filed on 2020 May 12. U.S. patent application Ser. No. 17/175,675 claimed the priority benefit of U.S. provisional patent application 63/017,718 filed on 2020 Apr. 30. U.S. patent application Ser. No. 16/910,625 claimed the priority benefit of U.S. provisional patent application 63/035,744 filed on 2020 Jun. 6. U.S. patent application Ser. No. 16/910,625 claimed the priority benefit of U.S. provisional patent application 63/023,331 filed on 2020 May 12. U.S. patent application Ser. No. 16/910,625 claimed the priority benefit of U.S. provisional patent application 63/017,718 filed on 2020 Apr. 30. The entire contents of these applications are incorporated herein by reference.

FEDERALLY SPONSORED RESEARCH

Not Applicable

SEQUENCE LISTING OR PROGRAM

Not Applicable

BACKGROUND

Field of Invention

This invention relates to respiratory face masks.

Introduction

With the increase in airborne infectious disease and environmental air pollution, air-filtering face masks are increasingly important. The most common air-filtration face masks are passive filtration masks which do not have active ventilation mechanisms such as motorized air impellers. They rely on a person's inhalation and exhalation to draw air through air filters. Passive filtration masks have some advantages. They tend to be relatively light-weight, inexpensive, and do not generate noise.

However, passive filtration masks also have disadvantages. They tend to have either relatively poor air filtration (e.g. leaking air around their perimeter) or have increased levels of carbon dioxide, humidity, and heat in air within the mask. Also, they are almost universally opaque because transparent materials tend to be impermeable to airflow and thus aggravate the accumulation of carbon dioxide, humidity, and heat within the mask. Lack of transparency interferes with human communication which relies on viewing mouth expressions. This is especially true for interpersonal communication involving people who are hearing impaired.

There is a need for a transparent smart mask which has a transparent portion which allows a person's mouth expressions to be seen and also has a relatively light-weight, quiet active air filtration system which filters both air inflow and air outflow to reduce the transmission of airborne infectious disease. Power conserving features, such as a sensor-adjusted airflow rate, are also helpful to enable longer battery life. This is the need addressed by the Smile-Through™ transparent smart mask disclosed herein.

Review of the Relevant Art

In the patent literature, U.S. Pat. No. 4,323,063 (Fisichella, Apr. 6, 1982, "Medical Face Mask") discloses a medical mask with a transparent central portion. U.S. Pat. No. 4,848,366 (Aita, Jul. 18, 1989, "Exhaust Mask System and Device") discloses a mask system including a front portion defining a surface which is generally C-shaped with curved surfaces in both the horizontal and vertical cross sections. U.S. Pat. No. 6,257,235 (Bowen, Jul. 10, 2001, "Face Mask with Fan Attachment") discloses a face mask with a fan attachment to enhance breathability and comfort. U.S. Patent Application 2006/0230485 (Lee, Oct. 19, 2006, "See-Through Mask") discloses a see-through mask for preventing infection of disease-causing bacteria and dust. U.S. Patent Application 2010/0239625 (Puckett, Sep. 23, 2010, "Transparent Antimicrobial Face Mask") discloses a generally transparent mask which is perforated with elongate slits. U.S. Pat. No. 7,802,572 (Hahne, Sep. 28, 2010, "Face Mask") discloses a medical mask with a transparent central portion. U.S. Patent Application 2011/0108035 (Samaniego, May 12, 2011, "Nex-Gen Respirator/Surgical Mask") discloses a face mask with a transparent shell. U.S. Patent Application 2019/0009114 (Han, Jan. 10, 2019, "Harmful-Substance-Blocking Health Mask Using Air Curtain") discloses a mask which creates an air curtain to block entry of external substances.

U.S. Patent Application 2019/0069615 (Lam, Mar. 7, 2019, "Face Mask Having Transparent Plastic Piece") discloses a face mask with a transparent plastic piece, a first conformable member affixed to a first portion of the back side of the piece, and a second conformable member affixed to a second portion of the back side of the piece. U.S. Patent Application 2020/0353294 (Feasey, Nov. 12, 2020, "Respirator") and U.S. Pat. No. 10,758,751 (Feasey, Sep. 1, 2020, "Respirator") disclose a mask or shield with opposing jets that create a stream of laminar flow filtered air. U.S. Patent Application 2020/0376213 (He, Dec. 3, 2020, "Miniature Air Filtration Assembly for a Medical Field") discloses a miniature vacuum unit including a suction tube.

U.S. Patent Application 2020/0397087 (Crenshaw, Dec. 24, 2020, "Electronic Airflow Mask") discloses a mask with a sensor and a multi-speed fan. U.S. Patent Application 2020/0406069 (Fu, Dec. 31, 2020, "Versatile and Multi-Purpose Breathing Mask") discloses a modular respirator comprising an elongate filter unit having a filter inlet, a filter outlet, and a replaceable fluid filter for filtering pollutants within the fluid. U.S. Patent Application 2021/0001157 (Rashaud, Jan. 7, 2021, "Personal Protective Face Shield for Preventing Biohazardous, Infectious or Pathological Aerosol Exposure (COVID-19)") discloses a face shield/window with an electrostatic double layer. U.S. Patent Application 2021/0077762 (Mauger, Mar. 18, 2021, "Respirator Devices with Source Control Mechanisms and Associated Systems and Methods") discloses a mask which filters air outflow to reduce the spread of contagious disease.

U.S. Patent Application 2021/0086005 (O'Brien, Mar. 25, 2021, "Facemask Having Integrated Modules") discloses a facemask with integrated modules having sensors and other mechanisms. U.S. Patent Application 2021/0219636 (Stroi-azzo-Mougin, Jul. 22, 2021, "Ultraviolet Face Mask") discloses a transparent cover for covering the nose and mouth of a wearer and one or more UV-C LEDs to irradiate filter media. U.S. Patent Application 2021/0228920 (Arigue, Ju. 29, 2021, "Filtering Mask Assembly") discloses a filtering mask assembly with a housing comprising a fan and an outlet valve.

In non-patent literature, Scharper, 2018, "Clearly A Better Mask: Alums Allysa Dittmar and Aaron Hsu Are Reinventing the Surgical Mask to Make Quality Health Care Accessible," Johns Hopkins Magazine, Winter, 2018, discloses a passive filtration mask with a transparent portion over a person's mouth, between upper and lower face-conforming foam portions.

Redcliffe Medical, 2020, "LEAF: Self-Sterilizing, Transparent N99+ Mask," PR Newswire, May 14, 2020, shows the concept of a transparent mask with an active filtration mechanism below a person's chin. Civility, 2020, "French Startup Launches First High-Tech Transparent Protective Anti-COVID Mask," AccessWire.com, Jun. 17, 2020, shows the concept of a generally-transparent face mask with circular (passive) air filters.

Razer, 2021, "Razer Unveils Smart Mask and Gaming Chair Concept Designs at CES 2021," Razer.com, Jan. 21, 2021, shows the concept of a mask with a transparent portion, active ventilation, lights, a microphone, and an ultraviolet-light charging case. Stegman, 2021, "Ford Designs Clear N95 Masks to Help Deaf or Hard of Hearing," Arc Publishing, Feb. 3, 2021, shows a prototype passive filtration mask with a transparent portion over a person's mouth. Honeywell, 2021, "Will.i.am Debuts Innovative Face Technology Concept," Honeywell.com, Apr. 6, 2021, shows the "Xupermask"—a non-transparent active filtration mask with multi-speed fans and advanced audio functions.

SUMMARY OF THE INVENTION

Although there has been considerable innovation in the prior art, especially prompted by the global COVID-19 pandemic, there remains a need for a smart mask which has a transparent portion which allows a person's mouth expressions to be seen, while also having a relatively light-weight, quiet active air filtration system which filters both air inflow and air outflow to reduce the transmission of airborne infectious disease. Power-conserving features, such as a sensor-adjusted airflow rate, are also helpful to enable longer battery life and manage noise levels. This invention meets this need.

A transparent smart mask for air filtration can cover a person's mouth and nose nostrils, thereby defining an interior space between the mask and the person's mouth and nose nostrils. The portion of the mask which covers the person's mouth can be transparent so that the person's mouth expressions and lips can be seen. The mask can have a first air filter which filters air entering the interior space to protect the person from airborne infectious disease and/or air pollution. The mask can also include a fan (e.g. air fan, impeller, turbine, or pump) which actively draws or pushes air through the first air filter to ensure good air circulation through the interior space of the mask despite the air-impermeability of the transparent mouth-covering portion. The mask can also have a second air filter which filters air exiting the interior space to protect others if the person has an airborne infectious disease.

This mask can also have a smart control aspect wherein the operation (e.g. activation and/or speed) of the fan is automatically adjusted based on data from a sensor in the mask. This sensor can collect data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor. This automatic adjustment of fan activation and/or speed can help to provide greater airflow when needed and conserve power when less airflow is needed. With these features, the transparent smart mask described herein can: have a transparent portion which allows a person's mouth expressions to be seen; be relatively light-weight; provide a relatively quiet active air filtration system which filters both air inflow and air outflow; and have longer battery life due to power-conservation features.

INTRODUCTION TO THE FIGURES

Figure 56:
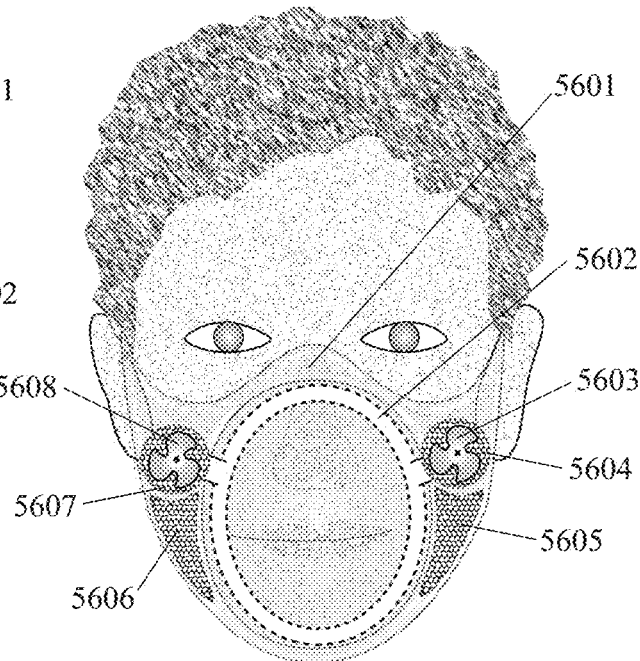
Figure 57:
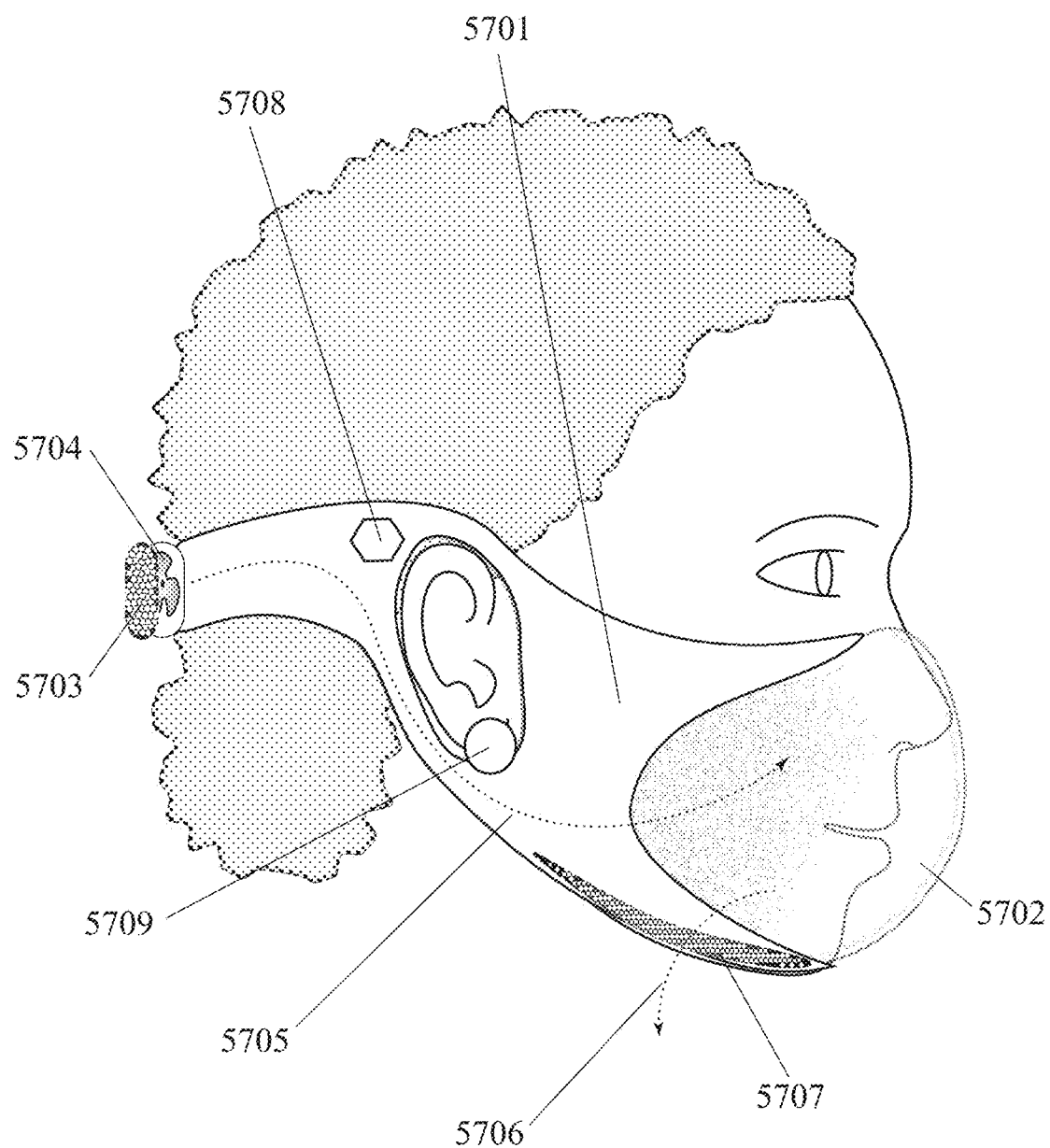

FIG. 56 shows a mask with a transparent portion, two impellor-driven air filters on the sides of a person's face which are connected to an air tube around the perimeter of the transparent portion, and two passive air filters on the sides of the per FIG. 57 shows a mask with a transparent mouth-covering portion, an intake air filter and fan on the back of a person's head, and a biometric sensor on the person's ear.

DETAILED DESCRIPTION OF THE FIGURES

In an example, a smart mask can comprise: a face mask which is configured to be worn by a person so as to cover the person's mouth and nose nostrils, wherein the mask defines an interior space between the mask and the person's mouth and nose nostrils, wherein the portion of the mask which covers the person's mouth is transparent and substantially impermeable to airflow; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter along an upper perimeter of the mask (e.g. along the person's cheeks) which filters air entering the interior space and a first fan (e.g. air fan, impeller, turbine, or pump) which draws air into the interior space through the first air filter; a second air filter along a lower perimeter of the mask (e.g. beneath the person's jaw) which filters air exiting the interior space and a second fan (e.g. air fan, impeller, turbine, or pump) which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter on a first lateral (e.g. right or left) side of the mask which filters air entering the interior space and a first fan (e.g. air fan, impeller, turbine, or pump) which draws air into the interior space through the first air filter; a second air filter on a second lateral (e.g. left or side) side of the mask which filters air exiting the interior space and a second fan (e.g. air fan, impeller, turbine, or pump) which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to air; a first air filter on a first lateral (e.g. right or left) side of the mask which filters air entering the interior space and a first fan (e.g. air fan, impeller, turbine, or pump) which draws air into the interior space through the first air filter; a second air filter on a second lateral (e.g. left or side) side of the mask which filters air exiting the interior space and a second fan (e.g. air fan, impeller, turbine, or pump) which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter on the upper half of the person's head which filters air entering the interior space and a first fan (e.g. air fan, impeller, turbine, or pump) which draws air into the interior space through the first air filter; a second air filter on the back half of the person's head which filters air exiting the interior space and a second fan (e.g. air fan, impeller, turbine, or pump) which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to air; a first air filter on the upper half of the person's head which filters air entering the interior space and a first fan (e.g. air fan, impeller, turbine, or pump) on the upper half of the person's head which draws air into the interior space through the first air filter; a second air filter on the back half of the person's head which filters air exiting the interior space and a second fan (e.g. air fan, impeller, turbine, or pump) on the back half of the person's head which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to air; a first air filter on the right side of the person's head which filters air entering the interior space and a first fan (e.g. air fan, impeller, turbine, or pump) on the right side of the person's head which draws air into the interior space through the first air filter; a second air filter on the left side of the person's head which filters air exiting the interior space and a second fan (e.g. air fan, impeller, turbine, or pump) on the left side of the person's head which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to air; a first air filter on the left side of the person's head which filters air entering the interior space and a first fan (e.g. air fan, impeller, turbine, or pump) on the left side of the person's head which draws air into the interior space through the first air filter; a second air filter on the right side of the person's head which filters air exiting the interior space and a second fan (e.g. air fan, impeller, turbine, or pump) on the right side of the person's head which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws air into the interior space through the first air filter at a first location on the mask; a second air filter which filters air exiting the interior space and a second fan (e.g. air fan, impeller, turbine, or pump) which draws air out from the interior space through the second air filter at a second location on the mask.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to air; a first air filter which filters air entering the interior space and a first fan (e.g. air fan, impeller, turbine, or pump) on the upper half of the person's head which draws air into the interior space through the first air filter; a second air filter which filters air exiting the interior space and a second fan (e.g. air fan, impeller, turbine, or pump) on the back half of the person's head which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to air; a first air filter which filters air entering the interior space and a first fan (e.g. air fan, impeller, turbine, or pump) on the right side of the person's head which draws air into the interior space through the first air filter; a second air filter which filters air exiting the interior space and a second fan (e.g. air fan, impeller, turbine, or pump) on the left side of the person's head which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to air; a first air filter which filters air entering the interior space and a first fan (e.g. air fan, impeller, turbine, or pump) on the left side of the person's head which draws air into the interior space through the first air filter; a second air filter which filters air exiting the interior space and a second fan (e.g. air fan, impeller, turbine, or pump) on the right side of the person's head which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to air; a first circular air filter on a first lateral (e.g. right or left) side of the mask which filters air entering the interior space and a first fan (e.g. air fan, impeller, turbine, or pump) which draws air into the interior space through the first air filter; a second circular air filter on a second lateral (e.g. left or side) side of the mask which filters air exiting the interior space and a second fan (e.g. air fan, impeller, turbine, or pump) which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to air; a first convex air filter on a first lateral (e.g. right or left) side of the mask which filters air entering the interior space and a first fan (e.g. air fan, impeller, turbine, or pump) which draws air into the interior space through the first air filter; a second convex air filter on a second lateral (e.g. left or side) side of the mask which filters air exiting the interior space and a second fan (e.g. air fan, impeller, turbine, or pump) which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to air; a first air filter along an upper perimeter of the mask (e.g. along the person's cheeks) which filters air entering the interior space and a first fan (e.g. air fan, impeller, turbine, or pump) which draws air into the interior space through the first air filter; and a second air filter along a lower perimeter of the mask (e.g. under the person's jaw) which filters air exiting the interior space and a second fan (e.g. air fan, impeller, turbine, or pump) which draws air out from the interior space through the second air filter.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to air; a first air filter which filters air entering the interior space and a first fan (e.g. air fan, impeller, turbine, or pump) which draws air into the interior space through the first air filter at a first location on the mask; and a second air filter which filters air exiting the interior space and a second fan (e.g. air fan, impeller, turbine, or pump) which draws air out from the interior space through the second air filter at a second location on the mask.

In an example, a smart mask can comprise: a face mask which is configured to be worn by a person so as to cover the person's mouth and nose nostrils; wherein the face mask further comprises a plurality of transparent air-impermeable sections which are substantially orthogonal to the posterior-anterior axis of the person's head; and wherein the face mask further comprises a plurality of non-transparent filter sections which are substantially parallel to the posterior-anterior axis of the person's head.

In an example, a smart mask can comprise: a face mask which is configured to be worn by a person so as to cover the person's mouth and nose nostrils; wherein the face mask further comprises a plurality of transparent air-impermeable sections in virtual planes with a first average angle of intersection with the posterior-anterior axis of the person's head; and wherein the face mask further comprises a plurality of non-transparent filter sections in virtual planes with a second average angle of intersection with the posterior-anterior axis of the person's head, wherein the first average angle is closer to 90 degrees than the second average angle.

In an example, a smart mask can comprise: a face mask which is configured to be worn by a person so as to cover the person's mouth and nose nostrils; wherein the face mask further comprises a plurality of transparent air-impermeable sections in virtual planes with a first average angle of intersection with the posterior-anterior axis of the person's head; and wherein the face mask further comprises a plurality of non-transparent filter sections in virtual planes with a second average angle of intersection with the posterior-anterior axis of the person's head, wherein the second average angle more acute than the first average angle.

In an example, a smart mask can comprise: a face mask which is configured to be worn by a person so as to cover the person's mouth and nose nostrils; wherein the face mask further comprises a plurality of transparent air-impermeable sections which are substantially orthogonal to the posterior-anterior axis of the person's head, wherein the person's mouth expressions can be seen through the plurality of transparent air-impermeable sections; and wherein the face mask further comprises a plurality of non-transparent filter sections which are substantially parallel to the posterior-anterior axis of the person's head, wherein filtered airflow can occur through the non-transparent filter sections.

In an example, a smart mask can comprise: a face mask which is configured to be worn by a person so as to cover the person's mouth and nose nostrils; wherein the face mask further comprises a plurality of transparent air-impermeable sections in virtual planes with a first average angle of intersection with the posterior-anterior axis of the person's head, wherein the person's mouth expressions can be seen through the plurality of transparent air-impermeable sections; and wherein the face mask further comprises a plurality of non-transparent filter sections in virtual planes with a second average angle of intersection with the posterior-anterior axis of the person's head, wherein the second average angle more acute than the first average angle, and wherein filtered airflow can occur through the non-transparent filter sections.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter along the upper perimeter of the mask (e.g. on the person's cheeks) which filters air entering the interior space and a fan (e.g. air fan, impeller, turbine, or pump) which draws or pushes air through the first air filter; a second air filter along the lower perimeter of the mask (e.g. under the person's jaw) which filters air exiting the interior space; a data processing unit which controls the operation (e.g. activation and/or speed) of the fan; a battery; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the fan is turned on and/or the speed of the fan is increased when analysis of data from the sensor indicates that more airflow is needed and the fan is turned off and/or the speed of the fan is decreased to conserve power from the battery when data from the sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter along the upper perimeter of the mask (e.g. on the person's cheeks) which filters air entering the interior space and a fan (e.g. air fan, impeller, turbine, or pump) which draws or pushes air through the first air filter; a second air filter along the lower perimeter of the mask (e.g. under the person's jaw) which filters air exiting the interior space; a data processing unit which controls the operation (e.g. activation and/or speed) of the fan; a battery; and a motion sensor, wherein the fan is turned on and/or the speed of the fan is increased when analysis of data from the motion sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter along the upper perimeter of the mask (e.g. on the person's cheeks) which filters air entering the interior space and a fan (e.g. air fan, impeller, turbine, or pump) which draws or pushes air through the first air filter; a second air filter along the lower perimeter of the mask (e.g. under the person's jaw) which filters air exiting the interior space; a data processing unit which controls the operation (e.g. activation and/or speed) of the fan; a battery; and an oxygenation sensor, wherein the fan is turned on and/or the speed of the fan is increased when analysis of data from the oxygenation sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter along the upper perimeter of the mask (e.g. on the person's cheeks) which filters air entering the interior space and a fan (e.g. air fan, impeller, turbine, or pump) which draws or pushes air through the first air filter; a second air filter along the lower perimeter of the mask (e.g. under the person's jaw) which filters air exiting the interior space; a data processing unit which controls the operation (e.g. activation and/or speed) of the fan; a battery; and a carbon dioxide sensor, wherein the fan is turned on and/or the speed of the fan is increased when analysis of data from the carbon dioxide sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a fan (e.g. air fan, impeller, turbine, or pump) which draws or pushes air through the first air filter; a second air filter along the lower perimeter of the mask (e.g. under the person's jaw) which filters air exiting the interior space; a data processing unit which controls the operation (e.g. activation and/or speed) of the fan; a battery; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the fan is turned on and/or the speed of the fan is increased when analysis of data from the sensor indicates that more airflow is needed and the fan is turned off and/or the speed of the fan is decreased to conserve power from the battery when data from the sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a fan (e.g. air fan, impeller, turbine, or pump) which draws or pushes air through the first air filter; a second air filter along the lower perimeter of the mask (e.g. under the person's jaw) which filters air exiting the interior space; a data processing unit which controls the operation (e.g. activation and/or speed) of the fan; a battery; and a motion sensor, wherein the fan is turned on and/or the speed of the fan is increased when analysis of data from the motion sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a fan (e.g. air fan, impeller, turbine, or pump) which draws or pushes air through the first air filter; a second air filter along the lower perimeter of the mask (e.g. under the person's jaw) which filters air exiting the interior space; a data processing unit which controls the operation (e.g. activation and/or speed) of the fan; a battery; and an oxygenation sensor, wherein the fan is turned on and/or the speed of the fan is increased when analysis of data from the oxygenation sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a fan (e.g. air fan, impeller, turbine, or pump) which draws or pushes air through the first air filter; a second air filter along the lower perimeter of the mask (e.g. under the person's jaw) which filters air exiting the interior space; a data processing unit which controls the operation (e.g. activation and/or speed) of the fan; a battery; and an oxygen sensor which is in fluid communication with the interior space, wherein the fan is turned on and/or the speed of the fan is increased when analysis of data from the oxygen sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a fan (e.g. air fan, impeller, turbine, or pump) which draws or pushes air through the first air filter; a second air filter along the lower perimeter of the mask (e.g. under the person's jaw) which filters air exiting the interior space; a data processing unit which controls the operation (e.g. activation and/or speed) of the fan; a battery; and a pulse oximeter, wherein the fan is turned on and/or the speed of the fan is increased when analysis of data from the pulse oximeter indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a fan (e.g. air fan, impeller, turbine, or pump) which draws or pushes air through the first air filter; a second air filter along the lower perimeter of the mask (e.g. under the person's jaw) which filters air exiting the interior space; a data processing unit which controls the operation (e.g. activation and/or speed) of the fan; a battery; and a carbon dioxide sensor which is in fluid communication with the interior space, wherein the fan is turned on and/or the speed of the fan is increased when analysis of data from the carbon dioxide sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter on a first lateral (e.g. right or left) side of the mask which filters air entering the interior space and a fan (e.g. air fan, impeller, turbine, or pump) which draws or pushes air through the first air filter; a second air filter on a second lateral (e.g. left or right) side of the mask which filters air exiting the interior space; a data processing unit which controls the operation (e.g. activation and/or speed) of the fan; a battery; and an oxygenation sensor which is configured to be attached to the person's ear, wherein the fan is turned on and/or the speed of the fan is increased when analysis of data from the oxygenation sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter on a first lateral (e.g. right or left) side of the mask which filters air entering the interior space and a fan (e.g. air fan, impeller, turbine, or pump) which draws or pushes air through the first air filter; a second air filter on a second lateral (e.g. left or right) side of the mask which filters air exiting the interior space; a data processing unit which controls the operation (e.g. activation and/or speed) of the fan; a battery; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the fan is turned on and/or the speed of the fan is increased when analysis of data from the sensor indicates that more airflow is needed and the fan is turned off and/or the speed of the fan is decreased to conserve power from the battery when data from the sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter on a first lateral (e.g. right or left) side of the mask which filters air entering the interior space and a fan (e.g. air fan, impeller, turbine, or pump) which draws or pushes air through the first air filter; a second air filter on a second lateral (e.g. left or right) side of the mask which filters air exiting the interior space; a data processing unit which controls the operation (e.g. activation and/or speed) of the fan; a battery; and a motion sensor, wherein the fan is turned on and/or the speed of the fan is increased when analysis of data from the motion sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter on a first lateral (e.g. right or left) side of the mask which filters air entering the interior space and a fan (e.g. air fan, impeller, turbine, or pump) which draws or pushes air through the first air filter; a second air filter on a second lateral (e.g. left or right) side of the mask which filters air exiting the interior space; a data processing unit which controls the operation (e.g. activation and/or speed) of the fan; a battery; and an oxygenation sensor, wherein the fan is turned on and/or the speed of the fan is increased when analysis of data from the oxygenation sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter on a first lateral (e.g. right or left) side of the mask which filters air entering the interior space and a fan (e.g. air fan, impeller, turbine, or pump) which draws or pushes air through the first air filter; a second air filter on a second lateral (e.g. left or right) side of the mask which filters air exiting the interior space; a data processing unit which controls the operation (e.g. activation and/or speed) of the fan; a battery; and a carbon dioxide sensor which is in fluid communication with the interior space, wherein the fan is turned on and/or the speed of the fan is increased when analysis of data from the carbon dioxide sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter on a first lateral (e.g. right or left) side of the mask which filters air entering the interior space and a fan (e.g. air fan, impeller, turbine, or pump) which draws or pushes air through the first air filter; a second air filter on a second lateral (e.g. left or right) side of the mask which filters air exiting the interior space; a data processing unit which controls the operation (e.g. activation and/or speed) of the fan; a battery; and a humidity sensor which is in fluid communication with the interior space, wherein the fan is turned on and/or the speed of the fan is increased when analysis of data from the humidity sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; one or more air filters which filter air entering the interior space and one or more fans (e.g. air fan, impeller, turbine, or pump) which draw or push air through the one or more air filters; a second air filter through which air exits the interior space, wherein the second air filter is along a lower portion of the face-contacting perimeter of the mask (e.g. below the person's jaw); a data processing unit which controls the operation (e.g. activation and/or speed) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of the one or more fans is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; one or more air filters which filter air entering the interior space and one or more fans (e.g. air fan, impeller, turbine, or pump) which draw or push air through the one or more air filters; a second air filter through which air exits the interior space, wherein the second air filter spans a lower portion of the face-contacting perimeter of the mask (e.g. below the person's jaw); a data processing unit which controls the operation (e.g. activation and/or speed) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein operation of the one or more fans is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; one or more air filters which filter air entering the interior space and one or more fans (e.g. air fan, impeller, turbine, or pump) which draw or push air through the one or more air filters; a second air filter through which air exits the interior space, wherein the second air filter spans at least 40% of the face-contacting perimeter of the mask; a data processing unit which controls the operation (e.g. activation and/or speed) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of the fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; one or more air filters which filter air entering the interior space and one or more fans (e.g. air fan, impeller, turbine, or pump) which draw or push air through the one or more air filters; a second air filter through which air exits the interior space, wherein the second air filter spans at least 60% of the face-contacting perimeter of the mask; a data processing unit which controls the operation (e.g. activation and/or speed) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of the fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a fan (e.g. air fan, impeller, turbine, or pump) which draws or pushes air through the first air filter; a second air filter which filters air exiting the interior space; a data processing unit which controls the operation (e.g. activation and/or speed) of the fan; a battery; and a motion sensor, wherein the fan is turned on and/or the speed of the fan is increased when analysis of data from the motion sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a fan (e.g. air fan, impeller, turbine, or pump) which draws or pushes air through the first air filter; a second air filter which filters air exiting the interior space; a data processing unit which controls the operation (e.g. activation and/or speed) of the fan; a battery; and an oxygenation sensor, wherein the fan is turned on and/or the speed of the fan is increased when analysis of data from the oxygenation sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a fan (e.g. air fan, impeller, turbine, or pump) which draws or pushes air through the first air filter; a second air filter which filters air exiting the interior space; a data processing unit which controls the operation (e.g. activation and/or speed) of the fan; a battery; and a carbon dioxide sensor, wherein the fan is turned on and/or the speed of the fan is increased when analysis of data from the carbon dioxide sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is transparent and substantially impermeable to airflow; a first air filter which filters air entering the interior space and a fan (e.g. air fan, impeller, turbine, or pump) which draws or pushes air through the first air filter; a second air filter which filters air exiting the interior space; a data processing unit which controls the operation (e.g. activation and/or speed) of the fan; a battery; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the fan is turned on and/or the speed of the fan is increased when analysis of data from the sensor indicates that more airflow is needed and the fan is turned off and/or the speed of the fan is decreased to conserve power from the battery when data from the sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is transparent and substantially impermeable to airflow; a first air filter which filters air entering the interior space and a fan (e.g. air fan, impeller, turbine, or pump) which draws or pushes air through the first air filter; a second air filter which filters air exiting the interior space; a data processing unit which controls the operation (e.g. activation and/or speed) of the fan; a battery; and a motion sensor, wherein the fan is turned on and/or the speed of the fan is increased when analysis of data from the motion sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is transparent and substantially impermeable to airflow; a first air filter which filters air entering the interior space and a fan (e.g. air fan, impeller, turbine, or pump) which draws or pushes air through the first air filter; a second air filter which filters air exiting the interior space; a data processing unit which controls the operation (e.g. activation and/or speed) of the fan; a battery; and an oxygenation sensor, wherein the fan is turned on and/or the speed of the fan is increased when analysis of data from the oxygenation sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is transparent and substantially impermeable to airflow; a first air filter which filters air entering the interior space and a fan (e.g. air fan, impeller, turbine, or pump) which draws or pushes air through the first air filter; a second air filter which filters air exiting the interior space; a data processing unit which controls the operation (e.g. activation and/or speed) of the fan; a battery; and a carbon dioxide sensor, wherein the fan is turned on and/or the speed of the fan is increased when analysis of data from the carbon dioxide sensor indicates that more airflow is needed and the fan is turned off and/or the speed of the fan is decreased to conserve power from the battery when data from the motion sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a fan (e.g. air fan, impeller, turbine, or pump) which draws or pushes air through the first air filter; a second air filter which filters air exiting the interior space along the lower perimeter of the mask (e.g. under the person's jaw); a data processing unit which controls the operation (e.g. activation and/or speed) of the fan; a battery; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the fan is turned on and/or the speed of the fan is increased when analysis of data from the sensor indicates that more airflow is needed and the fan is turned off and/or the speed of the fan is decreased to conserve power from the battery when data from the sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a fan (e.g. air fan, impeller, turbine, or pump) which draws or pushes air through the first air filter; a second air filter which filters air exiting the interior space; a data processing unit which controls the operation (e.g. activation and/or speed) of the fan; a battery; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the fan is turned on and/or the speed of the fan is increased when analysis of data from the sensor indicates that more airflow is needed and the fan is turned off and/or the speed of the fan is decreased to conserve power from the battery when data from the sensor indicates that less airflow is needed.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a fan (e.g. air fan, impeller, turbine, or pump) which draws or pushes air through the first air filter; a second air filter which filters air exiting the interior space; a data processing unit which controls the operation (e.g. activation and/or speed) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a fan (e.g. air fan, impeller, turbine, or pump) which draws or pushes air through the first air filter; a second air filter which filters air exiting the interior space; a data processing unit which controls the operation (e.g. activation and/or speed) of the fan; and a sensor which collects data concerning the person's immediate environment; wherein the sensor is selected from the group consisting of temperature sensor, humidity sensor, environmental oxygen sensor, airborne particle sensor, spectroscopic sensor, ambient light sensor, and microphone; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is transparent and substantially impermeable to airflow; a first air filter on a first side (e.g. right or left) of the mask which filters air entering the interior space and a fan (e.g. air fan, impeller, turbine, or pump) which draws or pushes air through the first air filter; a second air filter on a second side (e.g. left or right) of the mask which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter on a first side (e.g. right or left) of the mask which filters air entering the interior space and a first fan (e.g. air fan, impeller, turbine, or pump) which draws or pushes air through the first air filter; a second air filter on a second side (e.g. left or right) of the mask which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is transparent and substantially impermeable to airflow; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is transparent and substantially impermeable to airflow; a first air filter which filters air entering the interior space and a fan (e.g. air fan, impeller, turbine, or pump) which draws or pushes air through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the speeds of fan is increased when analysis of data from the sensor indicates that the person needs more fresh air and/or oxygen.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a fan (e.g. air fan, impeller, turbine, or pump) which draws or pushes air through the first air filter; a second air filter which filters air exiting the interior space; a data processing unit which controls the operations (e.g. activations and/or speeds) of the fan, maintaining positive air pressure within the interior space; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is transparent and substantially impermeable to airflow; a first air filter which filters air entering the interior space and a fan (e.g. air fan, impeller, turbine, or pump) which draws or pushes air through the first air filter; a second air filter which filters air exiting the interior space; a data processing unit which controls the operations (e.g. activations and/or speeds) of the fan, maintaining higher air pressure within the interior space than air pressure outside the mask; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a fan (e.g. air fan, impeller, turbine, or pump) which draws or pushes air through the first air filter into one or more channels which release this air near (e.g. within one inch of) the person's nose nostrils; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a fan (e.g. air fan, impeller, turbine, or pump) which draws or pushes air through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein rates of flow through the first and/or second fans are increased automatically when analysis of data from the sensor indicates that the person needs more fresh air and/or oxygen.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a fan (e.g. air fan, impeller, turbine, or pump) which draws from a side of the person's head through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is transparent and substantially impermeable to airflow; a first air filter which filters air entering the interior space and a fan (e.g. air fan, impeller, turbine, or pump) on a first side of the mask which draws or pushes air through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a fan (e.g. air fan, impeller, turbine, or pump) on a first side of the person's head which draws or pushes air through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a fan (e.g. air fan, impeller, turbine, or pump) on the back half of the person's head which draws or pushes air through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a fan (e.g. air fan, impeller, turbine, or pump) which draws or pushes air through the first air filter; a second air filter which filters air exiting the interior space; a data processing unit which controls the operations (e.g. activations and/or speeds) of the fan; and a sensor which collects data concerning the person's activity and/or biometric parameters; wherein the sensor is selected from the group consisting of motion sensor, temperature sensor, blood oxygen sensor, carbon dioxide sensor, spectroscopic sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter into one or more channels which release this air near (e.g. within one inch of) the person's nose nostrils; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein rates of flow through the first and/or second fans are increased automatically when analysis of data from the sensor indicates that the person needs more fresh air and/or oxygen.

In an example, a smart mask can comprise: a face mask which is configured to be worn by a person so as to cover the person's mouth and nose nostrils, wherein the mask defines an interior space between the mask and the person's mouth and nose nostrils, wherein at least 25% of the forward-facing area of the mask is transparent and substantially impermeable to airflow; a first air filter which filters air entering the interior space and a fan (e.g. air fan, impeller, turbine, or pump) which draws or pushes air through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is transparent and substantially impermeable to airflow, including the area covering the person's mouth, is transparent; a first air filter which filters air entering the interior space and a fan (e.g. air fan, impeller, turbine, or pump) which draws or pushes air through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 25% of the forward-facing area of the mask, including the area covering the person's mouth, is transparent; a first air filter which filters air entering the interior space and a fan (e.g. air fan, impeller, turbine, or pump) which draws or pushes air through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 75% of the forward-facing area of the mask is substantially impermeable to airflow, and wherein at least 25% of the forward-facing area of the mask, including the area covering the person's mouth, is transparent; a first air filter which filters air entering the interior space and a fan (e.g. air fan, impeller, turbine, or pump) which draws or pushes air through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 75% of the forward-facing area of the mask is substantially impermeable to airflow, and wherein at least 75% of the forward-facing area of the mask, including the area covering the person's mouth, is transparent; a first air filter which filters air entering the interior space and a fan (e.g. air fan, impeller, turbine, or pump) which draws or pushes air through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 75% of the forward-facing area of the mask is transparent and substantially impermeable to airflow, including the area covering the person's mouth, is transparent; a first air filter which filters air entering the interior space and a fan (e.g. air fan, impeller, turbine, or pump) which draws or pushes air through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a fan (e.g. air fan, impeller, turbine, or pump) which draws from a location on the person's shoulder or torso through the first air filter; a second air filter which filters air exiting the interior space; a data processing unit which controls the operations (e.g. activations and/or speeds) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's activity and/or biometric parameters; wherein the sensor is selected from the group consisting of motion sensor, temperature sensor, blood oxygen sensor, carbon dioxide sensor, spectroscopic sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the speeds of the first and/or second fans are increased when analysis of data from the sensor indicates that the person needs more fresh air and/or oxygen.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan, maintaining positive air pressure within the interior space; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan, maintaining higher air pressure within the interior space than air pressure outside the mask; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is transparent and substantially impermeable to airflow; a first air filter which filters air entering the interior space and a first fan (e.g. air fan, impeller, turbine, or pump) on a first side of the mask which draws or pushes air through the first air filter; a second air filter which filters air exiting the interior space and a second fan (e.g. air fan, impeller, turbine, or pump) on a second side of the mask which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) on a first side of the person's head which draws or pushes air through the first air filter; a second air filter which filters air exiting the interior space and a second fan (e.g. air fan, impeller, turbine, or pump) on a second side of the person's head which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) on the back half of the person's head which draws or pushes air through the first air filter; a second air filter which filters air exiting the interior space and a second fan (e.g. air fan, impeller, turbine, or pump) on the back half of the person's head which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) on the person's shoulder or torso which draws or pushes air through the first air filter; a second air filter which filters air exiting the interior space and a second fan (e.g. air fan, impeller, turbine, or pump) on the person's shoulder or torso which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 75% of the forward-facing area of the mask is transparent and substantially impermeable to airflow; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws from a first location on the back half of the person's head through the first air filter; a second air filter which filters air exiting the interior space and a second fan (e.g. air fan, impeller, turbine, or pump) which draws from a second location on the back half of the person's head through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws from a first location on the person's shoulder or torso through the first air filter; a second air filter which filters air exiting the interior space and a second fan (e.g. air fan, impeller, turbine, or pump) which draws from a second location on the person's shoulder or torso through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws from a first location on a first side of the person's head through the first air filter; a second air filter which filters air exiting the interior space and a second fan (e.g. air fan, impeller, turbine, or pump) which draws from a second location on a second side of the person's head through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is transparent and substantially impermeable to airflow; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 25% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 75% of the forward-facing area of the mask is substantially impermeable to airflow, and wherein at least 25% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 75% of the forward-facing area of the mask is substantially impermeable to airflow, and wherein at least 75% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first motorized fan (e.g. air fan, impeller, turbine, or pump) which draws or pushes air through the first air filter; a second air filter which filters air exiting the interior space and a second motorized fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and an oximeter which is attached to the person's ear, wherein the operations of the first fan and/or the second fan are adjusted based on analysis of data from the oximeter.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and an oximeter, wherein the speed of the first fan and/or the speed of the second fan are increased when data from the oximeter indicates that the person needs more oxygen.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and an oximeter, wherein the first fan and/or the second fan are activated when data from the oximeter indicates that the person needs more oxygen.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a motion sensor, wherein the speed of the first fan and/or the speed of the second fan are increased when data from the motion sensor indicates that the person is more active.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a motion sensor, wherein the first fan and/or the second fan are activated when data from the motion sensor indicates that the person is more active.

In an example, a smart mask can comprise: a face mask which is configured to be worn by a person so as to cover the person's mouth and nose nostrils, wherein the mask defines an interior space between the mask and the person's mouth and nose nostrils, wherein between 50% and 90% of the forward-facing area of the mask is substantially impermeable to airflow and between 50% and 90% of the forward-facing area of the mask is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein between 50% and 90% of the forward-facing area of the mask is transparent and substantially impermeable to airflow; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a first fan (e.g. air fan, impeller, turbine, or pump) which draws or pushes air through the first air filter, wherein the first fan is at least four inches away from the person's closest ear; a second air filter which filters air exiting the interior space and a third fan (e.g. air fan, impeller, turbine, or pump) which draws or pushes air through the second air filter, wherein the second fan is at least four inches away from the person's closest ear; a data processing unit which controls the operations (e.g. activations and/or speeds) of one or more of the fans; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of one or more of the fans are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment; wherein the sensor is selected from the group consisting of temperature sensor, humidity sensor, environmental oxygen sensor, airborne particle sensor, spectroscopic sensor, ambient light sensor, and microphone; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws air into the interior space through the first air filter at a first location on the mask; a second air filter which filters air exiting the interior space and a second fan (e.g. air fan, impeller, turbine, or pump) which draws air out from the interior space through the second air filter at a second location on the mask; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to air; a first air filter which filters air entering the interior space and a first fan (e.g. air fan, impeller, turbine, or pump) which draws air into the interior space through the first air filter at a first location on the mask; a second air filter which filters air exiting the interior space and a second fan (e.g. air fan, impeller, turbine, or pump) which draws air out from the interior space through the second air filter at a second location on the mask; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein the mask further comprises an arcuate transparent portion which covers the person's mouth, wherein the arcuate transparent portion is substantially impermeable to airflow; wherein the mask further comprises an arcuate air channel around at least a portion of the perimeter of the arcuate transparent portion, wherein the air channel has a plurality of openings; a first air filter which filters air entering the interior space; a first fan (e.g. air fan, impeller, turbine, or pump) which draws or pushes air through the first air filter and into the air channel; and a second air filter which filters air exiting the interior space.

In an example, a smart mask can comprise: a face mask which is configured to be worn by a person so as to cover the person's mouth and nose nostrils, wherein the mask defines an interior space between the mask and the person's mouth and nose nostrils, wherein the mask further comprises a concave transparent portion which covers the person's mouth, wherein the concave transparent portion is substantially impermeable to airflow; wherein the mask further comprises an arcuate air channel around at least a portion of the perimeter of the concave transparent portion, wherein the air channel has a plurality of openings; a first air filter which filters air entering the interior space; a first fan (e.g. air fan, impeller, turbine, or pump) which draws or pushes air through the first air filter and into the air channel; and a second air filter which filters air exiting the interior space.

In an example, a smart mask can comprise: a face mask which is configured to be worn by a person so as to cover the person's mouth and nose nostrils, wherein the mask defines an interior space between the mask and the person's mouth and nose nostrils, wherein the mask further comprises a concave transparent portion which covers the person's mouth, wherein the concave transparent portion is substantially impermeable to airflow; wherein the mask further comprises an arcuate air channel around at least a portion of the perimeter of the concave transparent portion, wherein the air channel has a plurality of openings; a first air filter which filters air entering the interior space; a first fan (e.g. air fan, impeller, turbine, or pump) which draws or pushes air through the first air filter and into the air channel; a second air filter which filters air exiting the interior space; and a data processing unit which controls the operations (e.g. activations and/or speeds) of the first fan and/or the second fan.

In an example, a smart mask can comprise: a face mask which is configured to be worn by a person so as to cover the person's mouth and nose nostrils, wherein the mask defines an interior space between the mask and the person's mouth and nose nostrils, wherein the mask further comprises a concave transparent portion which covers the person's mouth, wherein the concave transparent portion is substantially impermeable to airflow; wherein the mask further comprises an arcuate air channel around at least a portion of the perimeter of the concave transparent portion, wherein the air channel has a plurality of openings; a first air filter which filters air entering the interior space; a first fan (e.g. air fan, impeller, turbine, or pump) which draws or pushes air through the first air filter and into the air channel; a second air filter which filters air exiting the interior space; a second fan (e.g. air fan, impeller, turbine, or pump) which draws or pushes air through the second air filter; and a data processing unit which controls the operations (e.g. activations and/or speeds) of the first fan and/or the second fan.

In an example, a smart mask can comprise: a face mask which is configured to be worn by a person so as to cover the person's mouth and nose nostrils, wherein the mask defines an interior space between the mask and the person's mouth and nose nostrils, wherein the mask further comprises a concave transparent portion which covers the person's mouth, wherein the concave transparent portion is substantially impermeable to airflow; wherein the mask further comprises an arcuate air channel around at least a portion of the perimeter of the concave transparent portion, wherein the air channel has a plurality of openings; a first air filter which filters air entering the interior space; a first fan (e.g. air fan, impeller, turbine, or pump) which draws or pushes air through the first air filter and into the air channel; a second air filter which filters air exiting the interior space; a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein the mask further comprises a concave transparent portion which covers the person's mouth, wherein the concave transparent portion is substantially impermeable to airflow; wherein the mask further comprises an arcuate air channel around at least 40% of the perimeter of the concave transparent portion, wherein the air channel has a plurality of openings; a first air filter which filters air entering the interior space; a first fan (e.g. air fan, impeller, turbine, or pump) which draws or pushes air through the first air filter and into the air channel; a second air filter which filters air exiting the interior space; a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein the mask further comprises a concave transparent portion which covers the person's mouth, wherein the concave transparent portion is substantially impermeable to airflow; wherein the mask further comprises an arcuate air channel around the concave transparent portion, wherein the air channel has a plurality of openings; a first air filter which filters air entering the interior space; a first fan (e.g. air fan, impeller, turbine, or pump) which draws or pushes air through the first air filter and into the air channel; a second air filter which filters air exiting the interior space; a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein the mask further comprises a concave transparent portion which covers the person's mouth, wherein the concave transparent portion is substantially impermeable to airflow; wherein the mask further comprises an arcuate air channel encircling the concave transparent portion, wherein the air channel has a plurality of openings; a first air filter which filters air entering the interior space; a first fan (e.g. air fan, impeller, turbine, or pump) which draws or pushes air through the first air filter and into the air channel; a second air filter which filters air exiting the interior space; a second fan (e.g. air fan, impeller, turbine, or pump) which draws or pushes air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters (or otherwise purifies) air entering the interior space from the environment; a second air filter which filters (or otherwise purifies) air exiting the interior space into the environment; a first fan (e.g. air fan, impeller, turbine, or pump) which draws air from the environment from a first lateral side (e.g. right or left) of the mask and through the first air filter; a second fan (e.g. air fan, impeller, turbine, or pump) which draws out air from the interior space from a second lateral side (e.g. left or right) of the mask; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters (or otherwise purifies) air entering the interior space from the environment; a second air filter which filters (or otherwise purifies) air exiting the interior space into the environment; a first fan (e.g. air fan, impeller, turbine, or pump) which draws air from the environment from locations along the upper perimeter of the mask (e.g. on the person's cheeks) and through the first air filter; a second fan (e.g. air fan, impeller, turbine, or pump) which draws out air from the interior space from a second lateral side (e.g. left or right) of the mask; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter through which air from the environment passes to enter the interior space; a second air filter through which air from the interior space passes to exit out into the environment; a first location on the mask through which air from the environment enters before passing through the first air filter; a second location on the mask through which air from the interior space exits out into the environment after before passing through the second air filter; wherein the first location is on a first side (e.g. right or left) of the upper half of the person's head and the second location is on a second side (e.g. left or right) of the upper half of the person's head; a first fan (e.g. air fan, impeller, turbine, or pump) which draws air through the first air filter; a second fan (e.g. air fan, impeller, turbine, or pump) which draws air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter through which air from the environment passes to enter the interior space; a second air filter through which air from the interior space passes to exit out into the environment; a first location on the mask through which air from the environment enters before passing through the first air filter; a second location on the mask through which air from the interior space exits out into the environment after before passing through the second air filter; wherein the first location is behind an ear on a first side (e.g. right or left) of the person's head and the second location is behind an ear on a second side (e.g. left or right) of the person's head; a first fan (e.g. air fan, impeller, turbine, or pump) which draws air through the first air filter; a second fan (e.g. air fan, impeller, turbine, or pump) which draws air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter through which air from the environment passes to enter the interior space; a second air filter through which air from the interior space passes to exit out into the environment; a first location on the mask through which air from the environment enters before passing through the first air filter; a second location on the mask through which air from the interior space exits out into the environment after before passing through the second air filter; wherein the first location is on a first side (e.g. right or left) of the person's neck and the second location is a second side (e.g. left or right) of the person's neck; a first fan (e.g. air fan, impeller, turbine, or pump) which draws air through the first air filter; a second fan (e.g. air fan, impeller, turbine, or pump) which draws air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter through which air from the environment passes to enter the interior space; a second air filter through which air from the interior space passes to exit out into the environment; a first location on the mask through which air from the environment enters before passing through the first air filter; a second location on the mask through which air from the interior space exits out into the environment after before passing through the second air filter; wherein the first location is on the person's first (e.g. right or left) shoulder and the second location is on the person's second (e.g. left or right) shoulder; a first fan (e.g. air fan, impeller, turbine, or pump) which draws air through the first air filter; a second fan (e.g. air fan, impeller, turbine, or pump) which draws air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter through which air from the environment passes to enter the interior space; a second air filter through which air from the interior space passes to exit out into the environment; a first location on the mask through which air from the environment enters before passing through the first air filter; a second location on the mask through which air from the interior space exits out into the environment after before passing through the second air filter; wherein the first location is on a first lateral side (e.g. right or left) of the mask and the second location is on a second lateral side (e.g. left or right) of the mask; a first fan (e.g. air fan, impeller, turbine, or pump) which draws air through the first air filter; a second fan (e.g. air fan, impeller, turbine, or pump) which draws air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter through which air from the environment passes to enter the interior space; a second air filter through which air from the interior space passes to exit out into the environment; a first location on the mask through which air from the environment enters before passing through the first air filter; a second location on the mask through which air from the interior space exits out into the environment after before passing through the second air filter; wherein the first location is along the upper perimeter of the mask (e.g. on the person's cheeks) and the second location is along the lower perimeter of the mask (e.g. below the person's jaw); a first fan (e.g. air fan, impeller, turbine, or pump) which draws air through the first air filter; a second fan (e.g. air fan, impeller, turbine, or pump) which draws air through the second air filter; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a first fan (e.g. air fan, impeller, turbine, or pump) which draws or pushes air through the first air filter; a second air filter which filters air exiting the interior space and a third fan (e.g. air fan, impeller, turbine, or pump) which draws or pushes air through the second air filter; a microphone which is in fluid communication with the interior space within two inches of the person's mouth; a speaker which is in fluid communication with the exterior of the mask, wherein the person's voice is captured by the microphone and projected by the speaker; a data processing unit which controls the operations (e.g. activations and/or speeds) of one or more of the fans; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of one or more of the fans are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a first fan (e.g. air fan, impeller, turbine, or pump) which draws or pushes air through the first air filter; a second air filter which filters air exiting the interior space and a third fan (e.g. air fan, impeller, turbine, or pump) which draws or pushes air through the second air filter; a microphone which is in fluid communication with the interior space; a speaker which is in fluid communication with the exterior of the mask, wherein the person's voice is captured by the microphone and projected by the speaker; a data processing unit which controls the operations (e.g. activations and/or speeds) of one or more of the fans; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of one or more of the fans are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters (or otherwise purifies) air entering the interior space from the environment; a fan (e.g. air fan, impeller, turbine, or pump) which draws air from the environment from a first lateral side (e.g. right or left) of the mask and through the first air filter; a second air filter which filters (or otherwise purifies) air exiting the interior space into the environment; wherein air exits the interior space by passing through the second air filter and then out into the environment from locations along the lower perimeter of the mask (e.g. below the person's jaw); a data processing unit which controls the operation (e.g. activation and/or speed) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of the fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters (or otherwise purifies) air entering the interior space from the environment; a fan (e.g. air fan, impeller, turbine, or pump) which draws air from the environment from locations along the upper perimeter of the mask (e.g. on the person's cheeks) and through the first air filter; a second air filter which filters (or otherwise purifies) air exiting the interior space into the environment; wherein air exits the interior space by passing through the second air filter and then out into the environment from locations along the lower perimeter of the mask (e.g. below the person's jaw); a data processing unit which controls the operation (e.g. activation and/or speed) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of the fan is adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space through a first side (e.g. right or left) of the mask and a first fan (e.g. air fan, impeller, turbine, or pump) which draws or pushes air through the first air filter; a second air filter which filters air entering the interior space through a second side (e.g. left or right) of the mask and a second fan (e.g. air fan, impeller, turbine, or pump) which draws or pushes air through the second air filter; a third air filter which filters air exiting the interior space and a third fan (e.g. air fan, impeller, turbine, or pump) which draws or pushes air through the third air filter; a data processing unit which controls the operations (e.g. activations and/or speeds) of one or more of the fans; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of one or more of the fans are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space and a first fan (e.g. air fan, impeller, turbine, or pump) which draws or pushes air through the first air filter; a second air filter which filters air entering the interior space and a second fan (e.g. air fan, impeller, turbine, or pump) which draws or pushes air through the second air filter; a third air filter which filters air exiting the interior space and a third fan (e.g. air fan, impeller, turbine, or pump) which draws or pushes air through the third air filter; a data processing unit which controls the operations (e.g. activations and/or speeds) of one or more of the fans; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of one or more of the fans are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, and wherein the portion of the mask which covers the person's mouth is transparent and substantially impermeable to airflow; a first air filter which filters air entering the interior space through a first side (e.g. right or left) of the mask and a first fan (e.g. air fan, impeller, turbine, or pump) which draws or pushes air through the first air filter; a second air filter which filters air entering the interior space through a second side (e.g. left or right) of the mask and a second fan (e.g. air fan, impeller, turbine, or pump) which draws or pushes air through the second air filter; a third air filter which filters air exiting the interior space below the person's jaw and a third fan (e.g. air fan, impeller, turbine, or pump) which draws or pushes air through the third air filter; a data processing unit which controls the operations (e.g. activations and/or speeds) of one or more of the fans; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of one or more of the fans are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent, and wherein the mask spans the full horizontal circumference of the person's head, including the back of the person's head; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; wherein the first fan and the second fan are located behind the person's ears and connected to the interior space by air tubes or channels; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent, and wherein the mask spans the full horizontal circumference of the person's head, including the back of the person's head; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; wherein the first fan and the second fan are located on one or both sides of the person's head; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent, and wherein the mask spans the full horizontal circumference of the person's head, including the back of the person's head; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; wherein the first fan and the second fan are located on the person's neck and connected to the interior space by air tubes or channels; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent, and wherein the mask spans the full horizontal circumference of the person's head, including the back of the person's head; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; wherein the first fan and/or the second fan are located on the back half of the person's head and connected to the interior space by air tubes or channels; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; wherein the first fan and/or the second fan are located on the person's shoulders (or torso) and connected to the interior space by air tubes or channels; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the mask defines an interior space between the mask and the person's mouth and nose nostrils, wherein at least 50% of the forward-facing area of the mask is substantially impermeable to airflow, and wherein at least 50% of the forward-facing area of the mask, including the area covering the person's mouth, is transparent, and wherein the mask spans the full horizontal circumference of the person's head, including the back of the person's head; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; wherein the first fan and/or the second fan are located on the top of the person's head and connected to the interior space by air tubes or channels; a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a smart mask can comprise: a face mask which is configured to be worn by a person so as to cover the person's mouth and nose nostrils, wherein the face creates an interior space between the mask and the person's mouth and nose nostrils; a first air filter which filters air entering the interior space and a first fan (e.g. air fan, impeller, turbine, or pump) which draws or pushes air through the first air filter; a second air filter which filters air exiting the interior space and a second fan (e.g. air fan, impeller, turbine, or pump) which draws or pushes air through the second air filter; wherein the mask is substantially (e.g. at least 90%) impermeable to airflow (except through the air filters) and at least 90% of the forward-facing area of the mask is transparent (except for the air filters and fans); a data processing unit which controls the operations (e.g. activations and/or speeds) of the first fan and/or the second fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operations of the first fan and/or the second fan are adjusted based on analysis of data from the sensor.

In an example, a protective face mask can comprise: a transparent portion of a mask which covers a person's mouth; an air filter which is in fluid communication with space between the transparent portion of a mask and the person's mouth; and an impellor which draws air from outside the transparent portion of a mask through the air filter into the space between the transparent portion of a mask and the person's mouth. In an example, a transparent portion of a mask can be concave. In an example, a protective face mask can comprise: a concave transparent portion of a mask which covers a person's mouth, wherein a concavity of the transparent portion of a mask faces toward the person's mouth, and wherein the concave transparent portion of a mask is a portion of a protective face mask; an air filter which is in fluid communication with space between the concave transparent portion of a mask and the person's mouth; and an impellor which draws air from outside the concave transparent portion of a mask through the air filter into the space between the transparent portion of a mask and the person's mouth. In an example, a transparent portion of a mask can cover the person's nose nostrils as well as the person's mouth.

In an example, a transparent portion of a mask can be arcuate. In an example, a transparent portion of a mask can be circular. In an example, a transparent portion of a mask can be concave. In an example, a transparent portion of a mask can be convex. In an example, a transparent portion of a mask can be polygonal. In an example, a transparent portion of a mask can be triangular. In an example, a transparent portion of a mask can have a bicycle seat shape. In an example, a transparent portion of a mask can have a boomerang shape. In an example, a transparent portion of a mask can have a cardioid shape. In an example, a transparent portion of a mask can have a conic-section shape.

In an example, a transparent portion of a mask can have a crescent shape. In an example, a transparent portion of a mask can have a fish-gill shape. In an example, a transparent portion of a mask can have a hemispherical shape. In an example, a transparent portion of a mask can have a parabolic shape. In an example, a transparent portion of a mask can have a pear shape. In an example, a transparent portion of a mask can have a saddle shape. In an example, a transparent portion of a mask can have an egg shape. In an example, a transparent portion of a mask can have an oval shape. In an example, a transparent portion of a mask can be elliptical.

In an example, a transparent portion of a mask can be made from polypropylene-based elastomer. In an example, a transparent portion of a mask can be made from styrene butadiene copolymer. In an example, a transparent portion of a mask can be made from transparent polymer. In an example, a transparent portion of a mask can be made from ethylene vinyl acetate. In an example, a transparent portion of a mask can be made from M-ABS. In an example, a transparent portion of a mask can be made from poly cyclohexylenedimethylene terephthalate.

In an example, a transparent portion of a mask can be made from styrene acrylonitrile. In an example, a transparent portion of a mask can be made from styrene methyl methacrylate. In an example, a transparent portion of a mask can be made from polycarbonate. In an example, a transparent portion of a mask can be made from polyethersulfone. In an example, a transparent portion of a mask can be made from polyethylene terephthalate. In an example, a transparent portion of a mask can be made from polymethyl methacrylate. In an example, a transparent portion of a mask can be made from polyphenylsulfone. In an example, a transparent portion of a mask can be made from polypropylene. In an example, a transparent portion of a mask can be made from polysulfone.

In an example, a transparent portion of a mask (or an entire face mask) can be made from a transparent polymer. In an example, a transparent portion of a mask can be made from ethylene vinyl acetate. In an example, a transparent portion of a mask can be made from M-ABS. In an example, a transparent portion of a mask can be made from poly cyclohexylenedimethylene terephthalate. In an example, a transparent portion of a mask can be made from polycarbonate. In an example, a transparent portion of a mask can be made from polyethersulfone. In an example, a transparent portion of a mask can be made from polyethylene terephthalate. In an example, a transparent portion of a mask can be made from polymethyl methacrylate. In an example, a transparent portion of a mask can be made from polyphenylsulfone.

In an example, a transparent portion of a mask can be made from polypropylene. In an example, a transparent portion of a mask can be made from a polypropylene based elastomer. In an example, a transparent portion of a mask can be made from polysulfone. In an example, a transparent portion of a mask can be made from styrene acrylonitrile. In an example, a transparent portion of a mask can be made from a styrene butadiene copolymer. In an example, a transparent portion of a mask can be made from styrene methyl methacrylate. In an example, a transparent portion of a mask can be made from a transparent polymer. In an example, a transparent portion of a mask can be a transparent polymer part or portion of an otherwise non-transparent face mask. In an example, a transparent portion of a mask can be a transparent polymer part or portion of an otherwise non-transparent textile-based face mask.

In an example, at least 75% of a mask is transparent. In an example, between 50% and 100% of a mask is transparent so that a person's mouth can be seen. In an example, between 50% and 80% of a mask is transparent. In an example, between 75% and 100% of a mask is transparent so that a person's mouth can be seen. In an example, a concave transparent portion of a mask can comprise at least 75% of the front-facing surface of the mask. In an example, a concave transparent portion of a mask can comprise between 50% and 80% of the front-facing surface of the mask.

In an example, a transparent portion of a mask can be arcuate. In an example, the perimeter of a transparent portion of a mask can have a circular, elliptical, oval, or rounded-quadrilateral shape. In an example, the perimeter of a transparent portion of a mask can have a cardioid, water-lily-leaf, or bicycle-seat shape. In an example, the perimeter of a transparent portion of a mask can have a crescent or kidney shape. In an example, a transparent portion of a mask can be concave, wherein the concavity of the transparent portion of a mask faces toward the person's mouth. In an example, a transparent portion of a mask can be centered on a person's mouth. In an example a transparent portion of a mask can be centered on a person's mouth and nose nostrils.

In an example, the distance between a transparent portion of a mask and a person's mouth can be within a range of ¼" to 1". In an example, the distance between a transparent portion of a mask and a person's mouth can be within a range of ½" to 2". In an example, a transparent portion of a mask can be made from a material which is not air permeable. In an example, there can be a (compressible) seal around the perimeter of a transparent portion of a mask which reduces air leakage between a person's face and the space between the transparent portion of a mask and the person's mouth.

In an example, a transparent portion of a mask can be a part or portion of an otherwise non-transparent face mask. In an example, a transparent portion of a mask can comprise between 20% and 40% of the overall surface area of a face mask. In an example, a transparent portion of a face mask can comprise between 20% and 40% of the overall surface area of the face mask. In an example, a transparent portion of a mask can comprise between 30% and 70% of the overall surface area of a face mask. In an example, a transparent portion of a face mask can comprise between 30% and 70% of the overall surface area of the face mask. In an example, a transparent portion of a mask can comprise between 60% and 100% of the overall surface area of a face mask. In an example, a transparent portion of a face mask can comprise between 60% and 100% of the overall surface area of the face mask. In an example, a transparent portion of a mask can be an entire face mask.

In an example, a central area of a transparent mouth-covering portion can be thinner than its non-central areas (e.g. areas closer to its perimeter) for greater visibility through the central area. In an example, a central area of a transparent mouth-covering portion can be thicker than its non-central areas (e.g. areas closer to its perimeter) for greater flexibility of the perimeter. In an example, a central area of a transparent mouth-covering portion can be impermeable to air, but non-central (closer to the perimeter) areas of the transparent mouth-covering portion can have small holes which allow some airflow.

In an example, a transparent portion of a mask can be a part or portion of a face mask, wherein the transparent portion of a mask has a first level of flexibility and/or elasticity, wherein the remaining part or portion of the face mask has a second level of flexibility and/or elasticity, and wherein the second level is greater than the first level. In an example, a transparent portion of a mask can be a part or portion of a face mask, wherein the transparent portion of a mask has a first durometer level, wherein the remaining part or portion of the face mask has a second durometer level, and wherein the second durometer level is less than the first durometer level. In an example, a transparent portion of a mask which is a part or portion of a face mask can be made from a transparent polymer and the remaining parts or portions of the face mask can be made from a non-transparent textile material (e.g. cloth).

In an example, a transparent portion of a mask can be between ¼" and 1" from a person's mouth. In an example, a transparent portion of a mask can extend vertically from the bottom of a person's chin to above the person's nostrils and extend horizontally from a central area of the person's right cheek to a central area of the person's left cheek. In an example, a transparent portion of a mask can cover a portion a person's face which spans vertically from the person's chin to the bridge of the person's nose and spans horizontally from the person's right ear to the person's left ear. In an example, the front surface of a transparent portion of a mask can be in the range of 4 to 8 square inches. In an example, a transparent portion of a mask can comprise a narrower upper portion spanning a person's nose and a wider lower portion spanning the person's mouth.

In an example, a transparent portion of a mask (or an entire face mask) can have two (or more) layers with air or liquid between the layers. In an example, a transparent portion of a mask can have two layers with a flow of air or liquid between the layers. In an example, a transparent portion of a mask can have two layers with a flow of air or liquid between the layers to reduce fogging. In an example, a transparent portion of a mask can further comprise heating elements to reduce fogging. In an example, electromagnetic energy can be transmitted through a transparent portion of a mask to reduce fogging. In an example, a transparent portion of a mask can comprise an outer layer which is not permeable to air and an inner layer (with small holes or slits) which is permeable to air. In an example, there can be transparent airflow channels (laterally) across a transparent portion of a mask. In an example, airflow from an air filter can be directed through a space between two layers of a transparent portion of a mask into the space between the transparent portion of a mask and a person's mouth.

In an example, a transparent portion of a mask (or an entire face mask) can have an anti-fog coating. In an example, a mask can further comprise a hydrophobic coating on the inside surface of a transparent portion which helps to prevent that portion from fogging up. In an example, airflow can be directed across the inside surface of a transparent portion of a mask which helps to prevent that portion from fogging up. In an example, heated air can be directed across the inside surface of a transparent portion of a mask which helps to prevent it from fogging up. In an example, there can be a hydrophilic coating on the inside surface of a transparent portion of a mask which helps to prevent it from fogging up. In an example, electrical current can be transmitted through a transparent portion of a mask to help prevent it from fogging up.

In an example, a transparent portion of a mask can have a first configuration in which it covers a person's mouth and a second configuration in which it does not cover the person's mouth, wherein the transparent portion can be moved from the first to the second configuration, or vice versa. In an example, a transparent portion of a mask can have a first configuration in which it covers a person's mouth and a second configuration in which it does not cover the person's mouth, wherein the transparent portion is moved by an electromagnetic actuator from the first to the second configuration, or vice versa. In an example, a transparent portion of a mask can have a first configuration in which it covers a person's mouth and a second configuration in which it flips up so as not to cover the person's mouth, wherein the transparent portion can be moved from the first to the second configuration, or vice versa. In an example, a transparent portion of a mask can have a first configuration in which it covers a person's mouth and a second configuration in which it does not cover the person's mouth, wherein the transparent portion is flipped up by an electromagnetic actuator from the first to the second configuration, or vice versa.

In an example, a mask can include a mechanism which automatically tightens the fit of the mask on a person's face to reduce air leakage around the perimeter of the mask. In an example, this mechanism can automatically tighten the fit of the mask on a person's face when an environmental risk is detected. In an example, this mechanism can automatically tighten the fit of the mask on a person's face when a selected amount of air leakage around the perimeter of the mask is detected. In an example, this mechanism can be an inflatable channel or chamber around the perimeter of the mask which tightens the mask when the channel or chamber is inflated. In an example, this mechanism can be a piezoelectric mechanism which shrinks, contracts, pulls, and/or tightens mask straps. In an example, this mechanism can be an electromagnetic actuator which shrinks, contracts, pulls, and/or tightens mask straps.

In example, an air filter can be made from polyester. In example, a filter can be made from acetate. In example, a filter can be made from an acidic polymer. In example, a filter can be made from spun material. In example, a filter can be made from acrylic. In example, a filter can be made from wool. In example, a filter can be made from multi-layer nanofiber filter. In example, a filter can be made from cotton. In example, a filter can be made from PET. In example, a filter can be made from polyacrylonitrile. In example, a filter can be made from PLA. In example, a filter can be made from cellulose. In example, a filter can be made from woven material. In example, an air filter can be made from polyamide.

In example, an air filter can be made from cotton. In example, a filter can be made from denim. In example, a filter can be made from elastane. In example, a filter can be made from polyester. In example, a filter can be made from rayon. In example, a filter can be made from silk. In example, a filter can be made from linen. In example, a filter can be made from Lycra.™. In example, a filter can be made from neoprene. In example, an air filter can be made from nylon.

In an example, a mask can have two air pathways through which air is drawn by two impellors. In an example, positive air pressure within the space between mask and the person's face can be created by a difference in the rotation speeds of the two impellors. In an example, the rotational speed of an impellor drawing air into a mask can be greater than the rotational speed of an impellor drawing air out of the mask. In an example, a first impellor can draw air into the mask through a first air pathway (and filter) and a second impellor can draw air out of the mask through a second air pathway (and filter).

In an example, a mask can have a low-level (e.g. low filtration percentage) air filter and a high-level (e.g. high filtration percentage) air filter. In an example, positive air pressure within the space between mask and the person's face can be created by a differential in the rotation speeds of impellors drawing air into (or out of) the low-level filter and the high-level filter. In an example, the rotational speeds of one or both impellors can be changed based on detection of an environmental or physiological risk. In an example, the speed of the impellor drawing air into the high-level filter can be automatically increased (relatively to the impellor drawing air through the low-level filter) in response to an environmental risk (such as a nearby person coughing) or a physiological risk (such as low blood oxygenation level).

In an example, a mask can include an airflow mechanism (such as an impellor, turbine, fan, or air pump) which increases air pressure in the space between a mask and a person's face. In an example, a mask can include an airflow mechanism which creates positive air pressure in the space between a mask and a person's face. In an example, a mask can include an airflow mechanism (such as an impellor, turbine, fan, or air pump) which automatically increases air pressure in the space between a mask and a person's face in response to detection of an environmental risk. In an example, a mask can include an airflow mechanism (such as an impellor, turbine, fan, or air pump) which automatically creates positive air pressure in the space between a mask and a person's face in response to detection of an environmental risk. This positive pressure can help to prevent inflow of airborne pathogens around the perimeter of the mask.

In an example, a mask can include one or more impellors which draw air through an air pathway and/or air filter. In an example, an impellor can be a turbine or fan. In an example, an impellor can have a rotating blade. In an example, an impellor can be an air pump. In an example, an impellor can include an electromagnetic motor which rotates a turbine, fan, and/or blade. In an example, an impellor can be located between an air filter and the inside of a mask in order to draw air through the air filter. In an example, an impellor can be located between an air filter and the outside of a mask in order to draw air through the air filter.

In an example, a mask worn by a person can comprise a low-level air filter and a high-level filter. In an example, this mask can have a first configuration wherein air flows into and out of the mask primarily through the low-level filter as a result of the person's respiration. In an example, this mask can have a second configuration wherein an impellor is activated to draw air into the mask through the high-level filter and this air flows out of the mask through the low-level filter. In an example, the second configuration can be activated in response to detection of an environmental risk, such as a nearby coughing sound or a high-risk location. In an example, the second configuration can be activated in response to detection of a physiological risk, such as the person having a reduced oxygenation level. In an example, the second configuration can be activated in response to detection of increased motion (possibly measured by a motion sensor in the mask).

In an example, air can passively flow into (or out of) a first air pathway in a mask with a low-level (e.g. low density) air filter and air can be actively drawn by an impellor through a second air pathway in the mask with a high-level (e.g. high density) air filter. In an example, airflow can occur passively through the first air pathway due to the relatively low airflow resistance of the low-level air filter, but an impellor is required to draw significant airflow through the second air pathway due to the relatively high airflow resistance of the high-level air filter. In an example, air can flow in either direction (into the mask or out of the mask) of a low-level air filter when the mask is in a low-filtration mode (e.g. in a low risk environment), but air only flows out of the low-level filter when the mask is in a high-filtration mode (e.g. in a high risk environment).

In an example, an impellor may only be activated to draw air into a high-level air filter when a mask is in a high-filtration mode (e.g. when an environmental risk is detected and/or when the person is in a high risk environment). In an example, when a mask is in low-filtration mode, airflow caused by the person's respiration flow into and out of the mask occurs through the low-level air filter. However, when the mask is in high-filtration mode, air is drawn into the mask through the high-level air filter by an impellor and only flows outward from the mask through the low-level air filter. In an example, there can be modest positive pressure inside a mask in high-filtration mode because air is actively drawn into a mask through a high-level filter by an impellor.

In an example, the rotational speed of an impellor which draws air through an air filter into a mask can be adjusted. In an example, the rotational speed of an impellor can be automatically increased when an environmental risk is detected by an environmental sensor. In an example, the rotational speed of an impellor can be automatically increased when the oxygen level of air inside the mask is low. In an example, the rotational speed of an impellor can be automatically increased when the person wearing a mask needs more oxygen (based on analysis of data from a biometric sensor or motion sensor). In an example, the rotational speed of an impellor can be automatically increased based on analysis of data from a motion sensor. In an example, it can be assumed that increased movement by a person means that the person needs more oxygen. A mask can respond to increased motion by increasing the rotational speed of an impellor which draws more air through an air filter into the mask and/or increases the rate of air exchange within the mask. In an example, the rotational speed of an impellor associated with a high-level air filter can be automatically increased when an environmental risk is detected.

In an example, this mask can further comprise an impellor. In an example, when the impellor is active, it draws air into the mask through a high-power air filter (e.g. "active ventilation"), but does not draw air into the mask through a low-power air filter. In an example, when the impellor is active, air flows into the mask via a high-power air filter and out of the mask via a low-power air filter. In an example, when the impellor is not active, air flows into and out of the mask due to a person's respiration (e.g. "passive ventilation"). In an example, when the impellor is not active, air flows into and out of the mask primarily through a low-power air filter.

In an example, this face mask can have: a first operational mode in which the impellor is not activated and airflow through the mask is primarily due to passive ventilation through a low-power air filter; a second operational mode in which the impellor is activated and airflow through the mask is primarily due to active ventilation through a high-power air filter. In an example, in the second operational mode, air flows into the mask through a high-power air filter and flows out of the mask through a low-power air filter. In an example, in the second operational mode there can be positive air pressure in the space between the mask and the person's face. In an example, the mask can be changed manually from its first operational mode to its second operational mode by a user. In an example, the mask can change automatically from its first operational mode to its second operational mode in response to analysis of data from a biometric and/or environmental sensor.

In an example, a mask can have an air filter with at least one grid or mesh. In an example, a mask can have a plurality of air filters with grids or meshes made of different materials. In an example, a mask can have a first air filter with a first grid or mesh made with a first material and a second air filter with a second grid or mesh made with a second material. In an example, a mask can have a flow mechanism (such as a valve) which automatically directs more airflow through the first air filter pathway and/or less airflow through the second air pathway when an environmental risk is detected.

In an example, a face mask can have a first air filter with a first level of particle filtration and a second air filter with a second level of particle filtration, wherein the second level is greater than the first level. In an example, a face mask can have a right-side air filter with a first level of particle filtration and a left-side air filter with a second level of particle filtration, wherein the second level is greater than the first level, or vice versa. In an example, a face mask can have a right-side air filter which filters out particles in a first size range and a left-side air filter which filters out particles in a second size range, wherein the second size range is greater than the first size range, or vice versa. In an example, a face mask can have a first air filter with a first thickness or length and a second air filter with a second thickness or length, wherein the second thickness or length is greater than the first level. In an example, a face mask can have a first air filter made from a first material and a second air filter made from a second material. In an example, a face mask can have a right-side air filter made from a first material and a left-side air filter made from a second material. In an example, an air filter can have a circular or elliptical perimeter. In an example, an air filter can have a polygonal perimeter. In an example, an air filter can be replaced.

In an example, a mask can have a first air filter which captures airborne particles of a first size and a second air filter which captures airborne particles of a second size, wherein the first size is smaller than the second size. In an example, a mask can have a first air filter which captures airborne particles in a first size range and a second air filter which captures airborne particles in a second size range, wherein the first size range is lower than the second size range. In an example, these first and second air filters can be configured in parallel along the same air pathway. In an example, the first air filter can be in a first air pathway and the second air filter can be in a second air pathway. In an example, airflow through the first air filter can be automatically increased and/or airflow through the second air filter can be automatically decreased with an environmental risk is detected by a sensor. In an example, the size of particles captured by an air filter can be automatically adjusted. In an example, the size of particles captured by an air filter can be reduced when an environmental risk is detected by a sensor.

In an example, a mask can have two air pathways (or air filters) with capture (filters out) different percentages of airborne particles or aerosols. If an example, a mask can have a first air pathway which captures (filters out) a first percentage of airborne particles or aerosols and a second air pathway which captures (filters out) a second percentage of airborne particles or aerosols, wherein the second percentage is greater than the first percentage. In an example, the mask can have a flow mechanism (such as a valve) which automatically directs more airflow through the second air pathway and/or less airflow through the first air pathway when a risk is detected by an environmental or biometric sensor. In an example, the mask can have an adjustable flow mechanism (such as a valve) which enables the wearer to direct more airflow through the second air pathway and/or less airflow through the first air pathway when an environmental risk is detected.

In an example, a face mask can include: a high-power air filter which filters out a first level (e.g. amount) of airborne pathogens and has a first level of airflow resistance; a low-power air filter which filters out a second level (e.g. amount) of airborne pathogens and has a second level of airflow resistance, wherein the first level of airborne pathogens is greater than the second level of airborne pathogens, and wherein the first level of airflow resistance is greater than the second level of airflow resistance; and an impellor which draws air through the high-power air filter into the mask. In an example, a high-power air filter can be thicker, denser, less porous, longer, and/or have more layers than a low-power air filter. In an example, a high-power air filter can be on the right side of a mask and a low-power air filter can be on the left side of the mask, or vice versa. In an example, a high-power air filter and a low-power air filter can both be on the same (e.g. right or left) side of a mask. In an example, there can be a pair of high-power and low-power air filters on each (e.g. right or left) side of a mask.

In an example, a mask can have an air filter with at least one grid or mesh. In an example, the density of a grid or mesh can be automatically increased when an environmental risk is detected. In an example, the density of grid or mesh can be automatically increased by shrinking the grid or mesh. In an example, a mask can have a plurality of air filters with different-density grids or meshes. In an example, a mask can have a first air filter with a first grid or mesh with a first density and a second air filter with a second grid or mesh with a second density, wherein the first density is greater than the second density. In an example, a mask can have a flow mechanism (such as a valve) which automatically directs more airflow through the first air filter pathway and/or less airflow through the second air pathway when an environmental risk is detected. In an example, the density of a grid or mesh can be selectively adjusted based on the type of environmental risk detected by an environmental sensor.

In an example, a mask can have two air filters with different densities and, thus, different levels of filtration. The denser air filter captures a greater percentage of airborne particles and the less dense air filter captures a lower percentage of airborne particles. In an example a smart mask can automatically increase airflow through the denser air filter and/or decrease airflow through the less dense air filter in response to a risk detected by an environmental or biometric sensor. In an example, the density of an air filter can be increased in response to detection of an environmental or biometric risk. In an example, the density of an air filter can be increased by compression of the filter or decreased by expansion of the filter. In an example, the density of an air filter can be increased by aligning filtration layers or decreased by misaligning filtration layers.

In an example, a mask can have an air filter with multiple layers. In an example, these layers can be substantially parallel when they are aligned. In an example, these layers can be moved (e.g. shifted) into alignment or into misalignment. When the layers are aligned, air passing through a pathway must travel through all of the layers. When the layers are misaligned, air passing through a pathway need only travel through a subset of the layers. In an example, the degree of alignment between multiple layers can be adjusted. This adjustment can be done by an electromagnetic actuator. In an example, the degree of alignment between layers of an air filter can be automatically increased when an environmental risk is detected. In an example, the number of layers in an air filter can be automatically increased when an environmental risk is detected. In an example, a mask can have a first air filter with a first number of layers and a second air filter with a second number of layers, wherein the first number is greater than the second number. In an example, a mask can have an airflow mechanism which automatically increases airflow through the first air pathway and/or decreases airflow through the second air pathway when an environmental risk is detected.

In an example, a mask can have an air filter with at least one grid or mesh. In an example, the porosity of a grid or mesh can be automatically decreased when an environmental risk is detected. In an example, the porosity of grid or mesh can be automatically decreased by shrinking the grid or mesh. In an example, a mask can have a plurality of air filters with different-porosity grids or meshes. In an example, a mask can have a first air filter with a first grid or mesh with a first porosity and a second air filter with a second grid or mesh with a second porosity, wherein the first porosity is less than the second porosity. In an example, a mask can have a flow mechanism (such as a valve) which automatically directs more airflow through the first air filter pathway and/or less airflow through the second air pathway when an environmental risk is detected. In an example, the porosity of a grid or mesh can be selectively adjusted based on the type of environmental risk detected by an environmental sensor.

In an example, an air filter can have a boomerang shape. In an example, a filter can have a crescent shape. In an example, a filter can have a cardioid shape. In an example, a filter can have a fish-gill shape. In an example, a filter can have a convoluted shape. In an example, a filter can have a helical shape. In an example, a filter can have an undulating shape. In an example, a filter can have a sinusoidal shape. In an example, a filter can have an oval shape. In an example, an air filter can have a circular shape.

In an example, a mask can have a first air pathway which is straight and a second air pathway which is arcuate and/or convoluted. In an example, a mask can have a first air pathway which is straight and a second air pathway which is helical. In an example, a mask can have a first air pathway which is straight and a second air pathway which is undulating, sinusoidal, and/or serpentine. In an example, a mask can have a first air pathway which is straight and a second air pathway which is zigzag shaped. In an example, the mask can increase airflow through the second air pathway and/or decrease airflow through the first air pathway when an environmental risk is detected. In an example, the mask can open the second air pathway and close the first air pathway when an environmental risk is detected.

In an example, a mask can have an air filter with at least one grid or mesh. In an example, the shape of a grid or mesh can be automatically changed when an environmental risk is detected. In an example, a mask can have a plurality of air filters with different-shaped grids or meshes. In an example, a mask can have a first air filter with a first grid or mesh with a first shape and a second air filter with a second grid or mesh with a second shape. In an example, a mask can have a flow mechanism (such as a valve) which automatically directs more airflow through the first air filter pathway and/or less airflow through the second air pathway when an environmental risk is detected.

In an example, a mask can have an undulating, zigzagging, and/or serpentine air pathway. In an example, a mask can have two air pathways with different undulations or zigzags. In an example, a mask can have two undulating, zigzagging, and/or serpentine air pathways, wherein a first pathway has a first number of undulations, zigzags, and/or curves, a second pathway has a second number of undulations, zigzags, and/or curves, and wherein the second number is greater than the first number. In an example, a mask can have two undulating, zigzagging, and/or serpentine air pathways, wherein a first pathway with a first average angle of undulation or zigzag and a second pathway with a second average angle of undulation or zigzag, and wherein the second angles is less than the first angle. In an example, an airflow mechanism can automatically increase airflow through the second air pathway and/or decrease airflow through the first airflow pathway when an environmental risk is detected. In an example, a mask can have an air pathway (or filter) whose undulations are automatically changed (or can be manually changed) when a risk is detected by an environmental or biometric sensor.

In an example, a mask can have two air filters with different thicknesses. In an example, these two air filters can be configured in series. In an example, these two air filters can be configured in parallel. In an example, the thickness of a mask air filter can be selectively adjusted. In an example, the thickness of a mask air filter can be automatically increased when an environmental risk is detected. In an example, the thickness of a mask air filter can be increased by a mask user when the user observes an environmental risk. In an example, a mask can have a first air filter with a first thickness and a second air filter with a second thickness, wherein the second thickness is greater than the first thickness, and wherein the mask automatically increases airflow through the second filter and/or decreases airflow through the first filter when an environmental risk is detected (e.g. by an environmental or biometric sensor).

In an example, a mask can have two air pathways (or air filters) with different lengths. In an example, a mask can have a first air pathway (or filter) with a first length and a second air pathway (or filter) with a second length, wherein the first length is longer than the second length. In an example, a mask can have an airflow mechanism which automatically increases airflow through the first air pathway and/or decreases airflow through the second air pathway when an environmental risk is detected. In an example, the length of an air pathway (or air filter) can be increased when an environmental risk is detected. In an example, the length of an air pathway (or air filter) can be increased so as to be proportional to the level of risk detected by an environmental sensor.

In an example, a mask can have an air filter with at least one grid or mesh. In an example, the size of a grid or mesh can be automatically changed when an environmental risk is detected. In an example, a mask can have a plurality of air filters with different-size grids or meshes. In an example, a mask can have a first air filter with a first size grid or mesh and a second air filter with a second size grid or mesh. In an example, a mask can have a flow mechanism (such as a valve) which automatically directs more airflow through the first air filter pathway and/or less airflow through the second air pathway when an environmental risk is detected.

In an example, a mask can have two air filters (or air pathways) with different cross-sectional sizes and/or surface areas. In an example, a mask can have a first air filter with a first cross-sectional size and a second air filter with a second cross-sectional size, wherein the second cross-sectional size is greater than the first cross-sectional size. In an example, airflow through the first air filter can be automatically increased and/or airflow through the second air filter can be automatically decreased when an environmental risk is detected. In an example, the cross-sectional size and/or surface area of an air filter can be automatically decreased when a risk is detected by an environmental or biometric sensor. In an example, the cross-sectional size and/or surface area of an air filter can be automatically increased when a risk is detected by an environmental or biometric sensor. In an example, the cross-sectional size and/or surface area of a high-density air filter can be automatically increased when a risk is detected by an environmental or biometric sensor.

In an example, a mask can have an air filter with a fibrous substrate. In an example, a mask can have two air pathways: a first air pathway which has a fibrous substrate air filter and a second air pathway which does not. In an example, the mask can have a flow mechanism which automatically directs more airflow through the first pathway and/or less airflow through the second pathway when a risk is detected by an environmental or biometric sensor.

In an example, a mask can have an air filter with at least one grid or mesh. In an example, the weave of a grid or mesh can be automatically changed when an environmental risk is detected. In an example, a mask can have a plurality of air filters with grids or meshes made with different weaves. In an example, a mask can have a first air filter with a first grid or mesh made with a first weave and a second air filter with a second grid or mesh made with a second weave. In an example, a mask can have a flow mechanism (such as a valve) which automatically directs more airflow through the first air filter pathway and/or less airflow through the second air pathway when an environmental risk is detected.

In an example, a mask can have two woven air filters. In an example, a mask can have a first air filter with a first weave and a second air filter with a second weave, wherein the second weave is tighter than the first weave. In an example, the mask can have an airflow mechanism which automatically increases airflow through the second air filter and/or automatically decreases airflow through the first air filter when an environmental risk is detected. In an example, the mask can have an airflow mechanism which selectively changes the relative amounts of airflow through the first and second filters. In an example, a mask can have two woven air filters configured in series in the same air pathway. In an example, a mask can have two woven air filters configured in parallel in two different air pathways.

In an example, a mask can have an air pathway (or air filter) with grids or mesh layers which can be aligned (into a parallel and/or sequential configuration) or misaligned into (into an adjacent and/or stepped configuration), thereby allowing more (or less) filtration, respectively, of airborne particles, aerosols, and/or pathogens. In an example, there is more filtration when the grids or mesh layers are aligned and less filtration when the grids or mesh layers are misaligned. In an example, the grids or mesh layers can be automatically aligned when an environmental risk is detected. In an example, the grids or mesh layers can be automatically aligned by an electromagnetic actuator when an environmental risk is detected by an environmental sensor. In an example, the degree of alignment of grids or mesh layers can be selectively adjusted. In an example, the degree of alignment of grids or mesh layers can be proportional to the level of environmental risk. In an example, a mask can have a first air pathway with a first degree of alignment between grids or mesh layers and a second air pathway with a second degree of alignment between grids or mesh layers, wherein the first degree is greater than the second degree. In an example, the mask can increase airflow through the first air pathway and/or decrease airflow through the second air pathway when an environmental risk is detected.

In an example, a mask can have an air pathway with openings (or holes) which can be aligned (or misaligned), thereby allowing more (or less) air to flow through the pathway. In an example, a mask can comprise two parallel layers, each with openings (or holes), wherein the alignment of openings in the two parallel layers is changed by rotating, sliding, or pivoting one of the layers relative to the other layer. When openings (or holes) in parallel layers are aligned, there is more airflow through a pathway. When openings (or holes) in parallel layers are misaligned, there is less airflow through a pathway. In an example, a mask can have two air pathways (or air filters), each with adjustable openings (or holes), wherein these are differences between the two air pathways in the degree to which adjustable openings in those pathways are aligned. In an example, the alignment of openings in one or more pathways can be automatically changed when an environmental risk is detected by a sensor. In an example, alignment of different openings can be changed to increase airflow through an air pathway with greater filtration and/or decrease airflow through an air pathway with less filtration when a risk is detected by an environmental or biometric sensor. In an example, the alignment of openings in one or more pathways can be (manually) changed by a user when the user detects an environmental risk.

In an example, a mask can have a valve or flap which can be opened (or closed) by a user to increase (or decrease) airflow through an air pathway (or filter). In an example, a mask can have a valve or flap which is automatically opened (or closed) to increase (or decrease) airflow through an air pathway (or filter) in response to detection of an environmental threat. In an example, a mask can have a valve or flap which is automatically opened (or closed) to increase (or decrease) airflow through an air pathway (or filter) in response to data a biometric sensor. In an example, a mask can have a valve or flap which is automatically opened (or closed) to increase (or decrease) airflow through an air pathway (or filter) in response to data an environmental sensor. In an example, a valve or flap can be opened or closed by an electromagnetic actuator (such as a solenoid). In an example, a valve or flap can be opened or closed by a pneumatic or hydraulic mechanism (such as a piston).

In an example, a mask can have a valve or flap which can be opened (or closed) by a user to increase airflow through a first air pathway (or filter) and/or decrease airflow through a second air pathway (or filter). In an example, the first air pathway (or filter) can capture a greater percentage of airborne particles than the second air pathway (or filter). In an example, a mask can have a valve or flap which is automatically opened (or closed) to increase airflow through a first air pathway (or filter) and/or decrease airflow through a second air pathway (or filter) in response to detection of an environmental threat. In an example, a mask can have a valve or flap which is automatically opened (or closed) to increase airflow through a first air pathway (or filter) and/or decrease airflow through a second air pathway (or filter) in response to data an biometric sensor. In an example, a mask can have a valve or flap which is automatically opened (or closed) to increase airflow through a first air pathway (or filter) and/or decrease airflow through a second air pathway (or filter) in response to data an environmental sensor. In an example, a valve or flap can be opened or closed by an electromagnetic actuator (such as a solenoid). In an example, a valve or flap can be opened or closed by a pneumatic or hydraulic mechanism (such as a piston).

In an example, a mask can have an air pathway (or filter) with a sliding, pivoting, or rotating flap, cover, or lid. In an example, movement of a flap, cover, or lid can change the amount of airflow through an air pathway in a mask. In an example, sliding, pivoting, or rotating a flap, cover, or lid can change the amount of airflow through an air pathway in a mask. In an example, a flap, cover, or lid can be automatically moved in response to an environmental risk, thereby changing the amount of airflow through an air pathway. In an example, a flap, cover, or lid can be automatically moved in response to an environmental risk, thereby increasing airflow through a high-filtration air pathway and/or decreasing airflow through a low-filtration air pathway. In an example, a mask can have two air pathways (or filters) with different sliding, pivoting, or rotating flaps, covers, or lids. In an example, airflow through an air pathway in a mask can be adjusted by sliding a flap, cover, or lid on that pathway. In an example, airflow through an air pathway in a mask can be adjusted by pivoting or rotating a flap, cover, or lid on that pathway.

In an example, a mask can have an air pathway (or filter) with a sliding, pivoting, or rotating valve. In an example, movement of a valve can change the amount of airflow through an air pathway in a mask. In an example, sliding, pivoting, or rotating a valve can change the amount of airflow through an air pathway in a mask. In an example, a valve can be automatically moved in response to an environmental risk, thereby changing the amount of airflow through an air pathway. In an example, a valve can be automatically moved in response to an environmental risk, thereby increasing airflow through a high-filtration air pathway and/or decreasing airflow through a low-filtration air pathway. In an example, a mask can have two air pathways (or filters) with different sliding, pivoting, or rotating flaps, covers, or lids. In an example, airflow through an air pathway in a mask can be adjusted by sliding a valve on that pathway. In an example, airflow through an air pathway in a mask can be adjusted by pivoting or rotating a valve on that pathway.

In an example, a mask can have two air pathways (or filters) whose valves or flaps can be selectively and differentially opened or closed. In an example, one or more valves or flaps can be selectively opened or closed to direct more air through a first air pathway with greater air filtration and/or to direct less air through a second air pathway with less air filtration in response to detection of a risk by an environmental or biometric sensor. In an example, a valve or flap can be opened or closed by an electromagnetic actuator (such as a solenoid). In an example, a valve or flap can be opened or closed by a pneumatic or hydraulic mechanism (such as a piston).

In an example, the amount of airflow through an air pathway in a mask can be changed by activating a solenoid. In an example, movement of the solenoid changes the size of the air pathway, thereby changing the amount of airflow through that pathway. In an example, a mask can have two air pathways and two solenoids, wherein the relative amounts of airflow through those two air pathways can be selectively adjusted by activating one or both of the solenoids. In an example, having a pebble in your shoe can make your sole annoyed. In an example, the amount of airflow through a high-filtration air pathway can be automatically increased and/or the amount of airflow through a low-filtration air pathway can be automatically decreased by activation of one or more solenoids when an environmental risk is detected. In an example, a mask can have an air pathway (or filter) whose solenoid is automatically changed (or can be manually changed) when a risk is detected by an environmental or biometric sensor.

In an example, a face mask can include a first air filter with an air pathway or chamber with passive or active cyclonic air motion to remove particles and a second air filter without such an air pathway or chamber. In an example, a face mask can include a first air filter with an electrically charged grid through which air passes and a second air filter without such an electrically charged grid. In an example, a face mask can include a first air filter with an electromagnetic grid through which air passes and a second air filter without an electromagnetic grid. In an example, a face mask can include a first air filter with heated nanowires or nanotubes and a second air filter without heated nanowires or nanotubes. In an example, the first air filter can be automatically and selectively activated based on analysis of data from a (biometric or environmental) sensor.

In an example, a mask can have an air pathway with cyclonic air movement which filters out airborne particles (or aerosols) because the airborne particles tend to travel toward the walls of the pathway. In an example, the air pathway can be helical. In an example, cyclonic air movement though an air pathway can be caused by respiratory airflow. In an example, cyclonic air movement through an air pathway can be caused an impellor (or turbine). In an example, an impellor (or turbine) can be activated when an environmental risk is detected. In an example, the rotational speed of an impellor (or turbine) can be increased when an environmental risk is detected. In an example, the rotational speed of an impellor (or turbine) can be proportional to the level of environmental risk. In an example, particles can be captured when they are driven by cyclonic air movement through slits or openings in the walls of an air pathway. In an example, airborne particles, aerosols, and/or pathogens can be captured from air flowing in cyclonic motion through an airway due to Newton's first law, although he never had an in-law.

In an example, an air filter can include an air pathway or chamber with passive or active cyclonic air motion to remove particles which can be adjusted by the wearer or activated based on analysis of data from a (biometric or environmental) sensor. In an example, an air filter can include an electrically charged grid through which air passes which can be adjusted by the wearer or activated based on analysis of data from a (biometric or environmental) sensor. In an example, an air filter can include an electromagnetic grid through which air passes which can be adjusted by the wearer or activated based on analysis of data from a (biometric or environmental) sensor. In an example, an air filter can include heated nanowires or nanotubes which can be adjusted by the wearer or activated based on analysis of data from a (biometric or environmental) sensor.

In an example, a face mask can include a first air filter with an electromagnetic air filter and a second air filter without an electromagnetic air filter. In an example, a face mask can include a first air filter with a light emitter which radiates air with ultraviolet, infrared, coherent, and/or high-intensity light and a second air filter without such a light emitter. In an example, a face mask can include a first air filter with a variable-length air pathway and a second air filter without a variable-length air pathway. In an example, a face mask can include a first air filter with an air pathway or chamber into which an anti-microbial substance is sprayed as air passes through it and a second air filter without such an air pathway or chamber. In an example, a face mask can include a first air filter with an air pathway or chamber which contains saline crystals and a second air filter without such an air pathway or chamber. In an example, the first air filter can be automatically and selectively activated based on analysis of data from a (biometric or environmental) sensor.

In an example, a mask can have an air filter through which electromagnetic energy (such as electrical current) is transmitted. In an example, transmission of electromagnetic energy through the filter can kill pathogens by heating the filter and/or capture pathogens by electromagnetic attraction. In an example, transmission of electromagnetic energy through an air filter can be continuous. In an example, transmission of electromagnetic energy through a filter can be automatically triggered by detection of an environmental risk. In an example, the level (e.g. power) of energy emitted through a filter can be selected based on data from an environmental or biometric sensor. In an example, the amount of electromagnetic energy transmitted through a filter can be automatically increased in response to an environmental risk. In an example, the amount of electromagnetic energy transmitted through a filter can be proportional to the level of environmental risk. In an example, a mask can have two air filters wherein: different levels of electromagnetic energy are passed through the two air filters; or wherein one filter is electrified and the other filter is not. In an example, airflow through a first air filter with greater transmission of electromagnetic energy can be increased and/or airflow through a second air filter with less electromagnetic energy transmission can be decreased when an environmental risk is detected.

In an example, a mask can have an air filter with an electromagnetically-charged grid or mesh. In an example, an electromagnetically-charged grid or mesh can capture airborne particles more efficiently than a non-charged grid or mesh. In an example, an electromagnetically-charged grid or mesh can be automatically charged when an environmental risk is detected. In an example, the level of electromagnetic charge can be selected based on data from an environmental or biometric sensor. In an example, the level (e.g. power) of electromagnetic-charge of a grid or mesh can be automatically increased when an environmental risk is detected. In an example, the level (e.g. power) of electromagnetic-charge of a grid or mesh can be proportional to the level of environmental risk. In an example, a mask can have a first air pathway (or filter) which has an electromagnetically-charged grid or mesh and a second air pathway (or filter) which does not. In an example, more air can be directed through the first pathway when an environmental risk is detected. In an example, a mask can have an air pathway (or filter) with electromagnetically-charged nanofibers.

In an example, a mask can have an air pathway (or filter) with sequence of electromagnetically-charged filtration layers with alternating (positive and negative) charges. In an example, a mask can have an air pathway (or filter) with sequence of parallel filtration layers with alternating (positive and negative) charges. In an example, a mask can have two air pathways (or filters) with different sequence of electromagnetically-charged filtration layers with alternating positive and negative charges. In an example, a mask can have an air pathway (or filter) with sequence of electromagnetically-charged filtration layers with alternating (positive and negative) charges, wherein the filtration layers are activated when an environmental risk is detected. In an example, a mask can have an air pathway (or filter) with sequence of electromagnetically-charged filtration layers with alternating (positive and negative) charges, wherein the electromagnetic charge(s) of the layer(s) are increased when an environmental risk is detected. In an example, a mask can have an air pathway (or filter) whose sequence of electromagnetically-charged filtration layers with alternating positive and negative charges is automatically changed (or can be manually changed) when a risk is detected by an environmental or biometric sensor.

In an example, a mask can have an electromagnetic air filter. In an example, a mask can have two air pathways with different electromagnetic air filters. In an example, a mask can have a first air pathway with a filter which is electromagnetic and a second air pathway without such a filter. In an example, a mask can have an air pathway with an electromagnetic air filter which is automatically activated when an environmental risk is detected by a sensor. In an example, a mask can have an air pathway with an electromagnetic air filter whose power level is increased when an environmental risk is detected by a sensor. In an example, a mask can have an electromagnetic air filter whose power level is (manually) adjusted by a user. In an example, a mask can have an electrostatic air filter. In an example, an electrostatic air filter can be automatically activated (or its power level can be automatically increased) when a risk is detected by an environmental or biometric sensor.

In an example, an air filter can include an electromagnetic air filter. In an example, an air filter can include a light emitter which radiates air with ultraviolet, infrared, coherent, and/or high-intensity light. In an example, an air filter can include a variable-length air pathway. In an example, an air filter can include an air pathway or chamber into which an anti-microbial substance is sprayed as air passes through it. In an example, an air filter can include an air pathway or chamber which contains saline crystals. In an example, an air filter can include an air pathway or chamber with passive or active cyclonic air motion to remove particles. In an example, an air filter can include an electrically charged grid through which air passes. In an example, an air filter can include an electromagnetic grid through which air passes. In an example, an air filter can include heated nanowires or nanotubes.

In an example, a mask can have a heated air filter which kills pathogens in air passing through the filter. In an example, an air filter can be continuously heated. In an example, an air filter can be heated automatically and rapidly (e.g. within 5 seconds) in response to detection of an environmental pathogen risk. In an example, an air filter can be continuously heated. In an example, air filter heating can activate manually by the person wearing a mask. In an example, the temperature of a heated air filter can be automatically increased as the level of risk of environmental pathogens increases. In an example, the temperature of a heated air filter can be proportional to the level of risk of environmental pathogens. In an example, an air filter can be heated rapidly by the transmission of electromagnetic energy. In an example, an air filter can comprise carbon nanotubes which are heated rapidly when a pathogen risk is detected. In an example, the temperature to which an air filter is heated can be selected based on the type of environmental pathogen detected by an environmental or biological sensor.

In an example, a mask can have an air pathway (or chamber or filter) which is exposed to coherent light in order to kill airborne pathogens. In an example, a red or green LED can emit coherent light into an air pathway (or chamber or filter) in order to kill pathogens. In an example, an air pathway through a mask can comprise a series of chambers into which coherent light with different power levels and/or different spectral distributions are emitted. In an example, coherent light can be automatically emitted into an air pathway when an environmental pathogen risk is detected. In an example, the power level and/or spectral distribution of emitted coherent light can be targeted to kill a particular type of pathogen based on data from an environmental or biometric sensor. In an example, the amount (e.g. power) of coherent light emitted into an air pathway can be increased when an environmental pathogen risk is detected. In an example, the amount (e.g. power) of coherent light emitted into an air pathway can be proportional to the level of environmental pathogen risk. In an example, a mask can have two air pathways (or filters) with different levels of coherent light emission and/or different types of coherent light emitters.

In an example, a mask can have an air pathway (or filter) into which ultraviolet light energy is emitted in order to kill airborne pathogens. In an example, a mask can further comprise an ultraviolet light emitter which emits light into an air pathway or filter. In an example, an ultraviolet light emitter can be activated by detection of an environmental risk by a sensor. In an example, the power or intensity of light emitted by an ultraviolet light emitter can be increased by detection of an environmental risk. In an example, the power or intensity of light emitted by an ultraviolet light emitter can be proportional to the level of environmental risk. In an example, the intensity and/or spectral distribution of light energy emitted into an air pathway (or filter) can be selectively adjusted based on the type of environmental risk which is detected. In an example, a mask can have a first air pathway into which ultraviolet light energy is emitted and a second air pathway without such light energy, wherein more air is directed through the first air pathway and/or less air is directed through the second air pathway when an environmental risk is detected.

In an example, a mask can have an air pathway (or filter) which is exposed to infrared light energy in order to kill airborne pathogens. In an example, a mask can further comprise an infrared light emitter which emits light into an air pathway or filter. In an example, an infrared light emitter can be activated by detection of an environmental risk by a sensor. In an example, the power or intensity of light emitted by an infrared light emitter can be increased by detection of an environmental risk. In an example, the power or intensity of light emitted by an infrared light emitter can be proportional to the level of environmental risk. In an example, the intensity and/or spectral distribution of light energy emitted into an air pathway (or filter) can be selectively adjusted based on the type of environmental risk which is detected. In an example, a mask can have a first air pathway into which infrared light energy is emitted and a second air pathway without such light energy, wherein more air is directed through the first air pathway and/or less air is directed through the second air pathway when an environmental risk is detected.

In an example, a mask can have an air pathway (or filter) which is exposed to coherent light energy in order to kill airborne pathogens. In an example, a mask can further comprise a coherent light emitter which emits light into an air pathway or filter. In an example, a coherent light emitter can be activated by detection of an environmental risk by a sensor. In an example, the power or intensity of light emitted by a coherent light emitter can be increased by detection of an environmental risk. In an example, the power or intensity of light emitted by a coherent light emitter can be proportional to the level of environmental risk. In an example, the intensity and/or spectral distribution of light energy emitted into an air pathway (or filter) can be selectively adjusted based on the type of environmental risk which is detected. In an example, a mask can have a first air pathway into which coherent light energy is emitted and a second air pathway without such light energy, wherein more air is directed through the first air pathway and/or less air is directed through the second air pathway when an environmental risk is detected.

In an example, an air filter can include an electromagnetic air filter which can be adjusted by the wearer or activated based on analysis of data from a (biometric or environmental) sensor. In an example, an air filter can include a light emitter which radiates air with ultraviolet, infrared, coherent, and/or high-intensity light which can be adjusted by the wearer or activated based on analysis of data from a (biometric or environmental) sensor. In an example, an air filter can include a variable-length air pathway which can be adjusted by the wearer or activated based on analysis of data from a (biometric or environmental) sensor. In an example, an air filter can include an air pathway or chamber into which an anti-microbial substance is sprayed as air passes through it which can be adjusted by the wearer or activated based on analysis of data from a (biometric or environmental) sensor. In an example, an air filter can include an air pathway or chamber which contains saline crystals which can be adjusted by the wearer or activated based on analysis of data from a (biometric or environmental) sensor.

In an example, a mask can have an air pathway (or air filter) with an adhesive coating which traps airborne particles, aerosols, and/or pathogens. In an example, an adhesive material can coat the interior of an arcuate air pathway in order to trap airborne particles, aerosols, and/or pathogens traveling around bends in that air pathway. In an example, the air pathway can have a helical shape. In an example, the air pathway can have an undulating (e.g. sinusoidal or serpentine) shape. In an example, the air pathway can have a zigzag shape. In an example, a mask can have a first air pathway (or air filter) with an adhesive coating and a second air pathway (or air filter) which does not. In an example, airflow through the first air pathway can be automatically increased and/or airflow through the second air pathway can be automatically decreased when an environmental risk is detected. In an example, a mask can have an air pathway (or air filter) with an adhesive coating which is automatically (or manually) increased when an environmental risk is detected.

In an example, a mask can have an air pathway (or air filter) with an antimicrobial coating. In an example, the antimicrobial coating can comprise hydrated graphene oxide. In an example, the antimicrobial coating can comprise silver particles. In an example, the antimicrobial coating can comprise salt. In an example, a mask can have a first air pathway (or air filter) with an antimicrobial coating and a second air pathway (or air filter) without such a coating. In an example, a mask can have a flow mechanism (such as a valve) which automatically directs more airflow through a first air pathway (with an antimicrobial coating) and/or less airflow through a second air pathway (without such a coating) when a risk is detected by an environmental or biometric sensor.

In an example, a mask can have an air pathway (or filter) with a zinc oxide coating. In an example, a mask can have two air pathways (or filters) with different zinc oxide coatings. In an example, a mask can have an air pathway (or filter) whose zinc oxide coating is automatically changed (or can be manually changed) when a risk is detected by an environmental or biometric sensor. In an example, a mask can include a flow mechanism which automatically directs more air through an air pathway with a zinc oxide coating when an environmental risk is detected.

In an example, a mask can have an air pathway (or filter) with a polyelectrolyte coating (or layer). In an example, a mask can have two air pathways, one with a polyelectrolyte coating (or layer) and one without such a coating (or layer), wherein airflow through the pathway with such a coating is automatically increased and/or airflow through the pathway without such a coating is automatically decreased when an environmental risk is detected. In an example, a mask can have two air pathways (or filters) with different polyelectrolyte coatings (or layers). In an example, a mask can have an air pathway (or filter) whose polyelectrolyte coating or layer is automatically changed (or can be manually changed) when a risk is detected by an environmental or biometric sensor.

In an example, a mask can have an air pathway (or filter) with a saline coating. In an example, a mask can have two air pathways, one with a saline coating and one without such a coating (or layer), wherein airflow through the pathway with such a coating is automatically increased and/or airflow through the pathway without such a coating is automatically decreased when an environmental risk is detected. In an example, a mask can have two air pathways (or filters) with different saline coatings (or layers). In an example, a mask can have an air pathway (or filter) whose saline coating is automatically changed (or can be manually changed) when a risk is detected by an environmental or biometric sensor. In an example, a saline solution can be sprayed into an air pathway.

In an example, a mask can have a disinfecting air chamber (or filter) into which an antimicrobial material is sprayed or otherwise released. In an example, the antimicrobial material can be salt. In an example, a mask can have two air pathways, one pathway with a disinfecting chamber (or filter) and one without such a chamber (or filter). In an example, antimicrobial material can be sprayed into such a chamber (or filter) when an environmental risk is detected. In an example, airflow through such a chamber (or filter) can be increased when an environmental risk is detected and/or airflow through such a chamber (or filter) can be decreased in the absence of an environmental risk. In an example, the type of antimicrobial material emitted which is sprayed into a disinfecting chamber can be selected based on the type of pathogen detected by an environmental sensor.

In an example, a mask can have a first impellor (e.g. fan, turbine, or pump) which forces air through a first air pathway (or filter) and a second impellor (e.g. fan, turbine, or pump) which forces air through a second air pathway (or filter). In an example, the first impellor can force air into a mask and the second impellor can force air out of a mask. In an example, the first impellor can force air into a mask and the second impellor can also force air into the mask. In an example, first and second impellors can rotate at different speeds. In an example, the first impellor and/or the second impellors can be activated by detection of environmental risk. In an example, a mask can have a first air pathway with a first air filter through which air is forced by an impellor (e.g. active filtration) and a second air pathway with a second air filter through which air is forced by respiration (e.g. passive filtration). In an example, a first air filter can filter out a higher percentage of airborne particles than the second air filter. In an example, an impellor associated with the first air filter is only activated when an environmental risk is detected by a sensor. In an example, the rotational speed of an impellor can be proportional to the level of environmental risk.

In an example, a smart mask can include an infrared light sensor. In an example, a smart mask can include a microphone. In an example, a smart mask can include a moisture sensor. In an example, a smart mask can include a motion sensor. In an example, a smart mask can include an oxygen sensor. In an example, a smart mask can include a radar-based proximity sensor. In an example, a smart mask can include a spectroscopic sensor. In an example, a smart mask can include a thermal energy sensor. In an example, a smart mask can include a thermometer sensor. In an example, a smart mask can include an accelerometer sensor. In an example, a smart mask can include an air pressure sensor. In an example, a smart mask can include a camera. In an example, a smart mask can include a carbon dioxide sensor. In an example, a smart mask can include an electromagnetic energy sensor. In an example, a smart mask can include a GPS module. In an example, a smart mask can include a humidity sensor. In an example, a face mask can further comprise one or more environmental sensors selected from the group consisting of: temperature sensor; pollution sensor; biological pathogen sensor; spectroscopic sensor; infrared sensor; motion sensor; GPS sensor; humidity sensor; altimeter; and microphone. In an example, the operation of an air filter can be automatically adjusted based on analysis of data from biometric and/or environmental sensors.

In an example, a smart mask can include a body temperature sensor. In an example, a smart mask can include a carbon dioxide level sensor. In an example, a smart mask can include an ECG sensor. In an example, a smart mask can include an EEG sensor. In an example, a smart mask can include an EMG sensor. In an example, a smart mask can include a heart rate sensor. In an example, a smart mask can include a motion sensor. In an example, a smart mask can include an oxygen level sensor. In an example, a smart mask can include a biometric sensor. In an example, a smart mask can include a blood oxygenation sensor. In an example, a smart mask can include a blood pressure sensor. In an example, a face mask can further comprise one or more biometric sensors selected from the group consisting of: motion sensor; electromagnetic energy sensor; oxygenation sensor; temperature sensor; spectroscopic sensor; humidity sensor; chemical sensor; blood pressure sensor; heart rate sensor; blood pressure sensor; muscle activity sensor (e.g. EMG sensor); and brain activity sensor (e.g. EEG sensor).

In an example, a smart mask can include an air-filled perimeter (or seal) between the mask and the person's face. In an example, the inflation level and/or air pressure within this air-filled perimeter can be (automatically) adjusted. In an example, the inflation level and/or air pressure within this air-filled perimeter can be (automatically) increased when an environmental risk is detected. In an example, the inflation level and/or air pressure within this air-filled perimeter can be (automatically) increased when air leakage is detected.

In an example, a smart mask can include an impellor, turbine, and/or air pump which creates a burst of air when an environmental risk is detected. In an example, a smart mask can include an impellor, turbine, and/or air pump which creates a burst of air to push airborne particles away from the mask when an environmental risk is detected. In an example, a smart mask can include an impellor, turbine, and/or air pump which creates a burst of air to create positive air pressure within the mask when an environmental risk is detected. In an example, a smart mask can include a compressed air chamber from which a burst of air is emitted in response to detection of an environmental risk.

In an example, air can be draw into a mask through an opening located at the back of a person's head. In an example, air can be draw into a mask through an opening located behind a person's ear. In an example, air can be draw into a mask through an opening located on a person's neck. In an example, air can be draw into a mask through an opening on a garment collar. In an example, air can be draw into a mask through an opening located on a side of a person's head. In an example, air can be draw into a mask through an opening located on the top of a person's head.

In an example an air filter (or air intake for an air filter) can be located on a face mask on a side of a person's face. In an example an air filter (or air intake for an air filter) can be located on a face mask over a person's cheek. In an example, a face mask can have a single air filter. In an example, a face mask can have two air filters. In an example, a face mask can have one air filter (or intake for an air filter) on each side of a person's face. In an example, a face mask can have a right-side air filter (or intake for an air filter) on the right side of a person's face and a left-side air filter (or intake for an air filter) on the left side of a person's face. In an example, a face mask can have a right-side air filter (or intake for an air filter) over a person's right cheek and a left-side air filter (or intake for an air filter) over a person's left cheek. In an example, right-side and left-side filters can both be in fluid communication with the space between a transparent portion of a mask and a person's mouth (and nose nostrils).

In an example, a smart mask can have a tube and/or air channel through which air travels from an impellor to a transparent mouth-covering portion of the mask. In an example, a smart mask can have a tube and/or air channel through which air travels from an impellor (or air filter) on the back of the person's head to a transparent portion of the mask which covers the person's mouth. In an example, a smart mask can have a tube and/or air channel through which air travels from an impellor (or air filter) on the side of the person's head to a transparent portion of the mask which covers the person's mouth. In an example, a smart mask can have a tube and/or air channel through which air travels from an impellor (or air filter) on the top of the person's head to a transparent portion of the mask which covers the person's mouth. In an example, a smart mask can have a tube and/or air channel through which air travels from an impellor (or air filter) on the person's neck to a transparent portion of the mask which covers the person's mouth. In an example, a smart mask can have a tube and/or air channel through which air travels from an impellor (or air filter) on the person's torso to a transparent portion of the mask which covers the person's mouth.

In an example, a smart mask can further comprise an external speaker which emit the person's voice. In an example, a smart mask can include a microphone on the inside surface of the mask which records a person's voice and a speaker on the outside the mask which reproduces the person's voice. In an example, a mask can comprise an internal microphone which is in acoustic communication with the interior of a transparent mouth-covering portion of the mask and an external speaker which is in acoustic communication with the environment.

In an example, a smart mask can include a digital display and/or screen on the outer surface of the mask. In an example, this display and/or screen can display a real-time image of the person's mouth. In an example, this display and/or screen can display words. In an example, this display and/or screen can display words that the person is speaking. In an example, a smart mask can include a microphone. In an example, the microphone can be on the inside of the mask and can record the person's voice. In an example, the display and/or screen can display the words that the person wearing the mask is speaking. In an example, a smart mask can include speech recognition software and a screen which displays the words which the person wearing the mask speaks.

In an example, a smart mask can be energy efficient by having a low-power mode of operation when a lower level of filtration is needed and a high-power mode of operation when a higher level of filtration is needed, rather than providing the high level of filtration all the time. In an example, a smart mask can have a low-power mode of operation to conserve energy and a high-power mode of operation to provide greater protection against airborne pathogens. In an example, the high-power mode can be activated by the wearer in response to an environmental risk. In an example, the high-power mode can be automatically activated in response to an environmental risk. In an example, a smart mask can harvest energy from respiratory outflow to charge a battery and this energy can be used to provide greater filtration protection when needed. In an example, a smart mask can be generally unobtrusive, comfortable, and power-efficient for extended use, but can also provide temporary high-level protection when needed in high-risk situations.

In an example, a smart mask can include a turbine or impellor which harvests energy from a person's exhalation. In an example, harvested and/or generated energy can be used to power the mask during times when additional air circulation or filtration is needed. In an example, energy harvested and/or generated from a person's exhalation airflow can be used to power the mask during times when additional air circulation or filtration is needed. In an example, energy harvested and/or generated from a person's exhalation outflow can be used to increase air inflow during times when additional air circulation or filtration is needed. In an example, energy harvested and/or generated from a person's exhalation outflow can be used to increase air inflow (filtration) when a mask is in a high-filtration mode. In an example, a smart mask can be powered by energy harvested and/or generated from body heat.

In an example, a smart mask can be part of a system comprising a mask and a cell phone, wherein the mask and cell phone are in wireless communication with each other. In an example, a smart mask can be part of a system comprising a mask and a smart watch, wherein the mask and watch are in wireless communication with each other. In an example, data from one or more sensors in the mask can be transmitted to (and displayed via) a cell phone or smart watch. In an example, data from a cell phone or smart watch can be transmitted to the mask. In an example, the operation of a smart mask can be controlled from a cell phone or smart watch. In an example, an e-mask can comprise a smart mask which is in wireless communication and data transmission with the internet. In an example, an e-mask can be elongated, thereby creating an elon mask, which can be a source of vision and inspiration.

In an example, airflow into a smart mask can be controlled from a cell phone or smart watch. In an example, a smart mask can be wirelessly controlled by a mobile device application (such as a cell phone application). In an example, a smart mask can be in wireless communication with a smart phone wherein data from the sensors is analyzed in the smart phone and displayed by the smart phone. In an example, a smart mask can be in wireless communication with a smart watch wherein data from the sensors is analyzed in the smart watch and displayed by the smart watch.

In an example, airflow into a smart mask can be adjusted by a user via a cell phone or smart watch. In an example, airflow into a smart mask can be automatically changed based on data from sensors in a smart watch. In an example, an impellor which draws air into a smart mask can be activated from a cell phone or smart watch. In an example, the rotational speed of an impellor which draws air into a smart mask can be activated from a cell phone or smart watch. In an example, the operation of a smart mask can be controlled by verbal commands. In an example, a smart mask can include a microphone and its operation can be controlled by verbal commands. Embodiment variations disclosed thus far can be applied to the examples shown in FIGS. 1 through 56 which follow.

Figure 1:
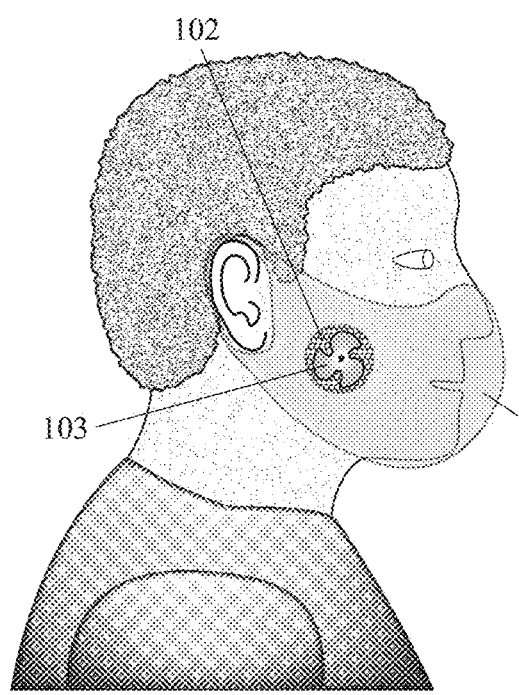
FIG. 1 shows a mask with a transparent portion and an impellor-driven air filter on the side of a person's face.

FIG. 1 shows a side view of an example of a protective face mask comprising: a face mask worn by a person; wherein the mask further comprises a transparent portion 101 which covers the person's mouth; wherein the mask further comprises an air filter 102 on a side of the person's face which is in fluid communication with space between the transparent portion and the person's mouth; and wherein the mask further comprises an impellor 103 which draws air from outside the mask through the air filter into the space between the transparent portion and the person's mouth. In this example, the air filter and the impellor are located over the person's cheek. In this example, the air filter and the impellor are substantially parallel to each other. In this example, the air filter is closer to the person's face than the impellor. In an alternative example, the impellor can be closer to the person's face than the air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 2:
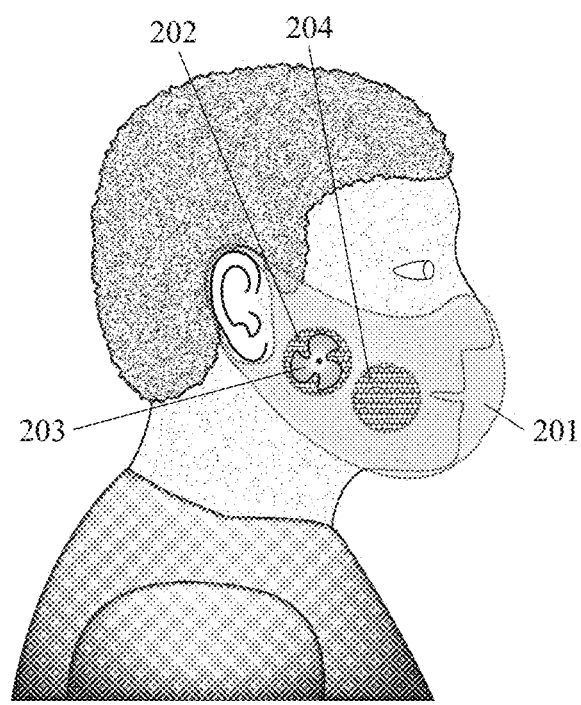
FIG. 2 shows a mask with a transparent portion, an impellor-driven air filter on the side of a person's face, and a passive air filter on the same side but closer to the person's mouth.

FIG. 2 shows a side view of an example of a protective face mask comprising: a face mask worn by a person; wherein the mask further comprises a transparent portion 201 which covers the person's mouth; wherein the mask further comprises a first air filter 202 on a side of the person's face which is in fluid communication with space between the transparent portion and the person's mouth; wherein the mask further comprises an impellor 203 which draws air from outside the mask through the first air filter into the space between the transparent portion and the person's mouth; and wherein the mask further comprises a second air filter 204 on the side of the person's face which is in fluid communication with space between the transparent portion and the person's mouth, wherein the second air filter is closer to the person's mouth than the first air filter. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 3:
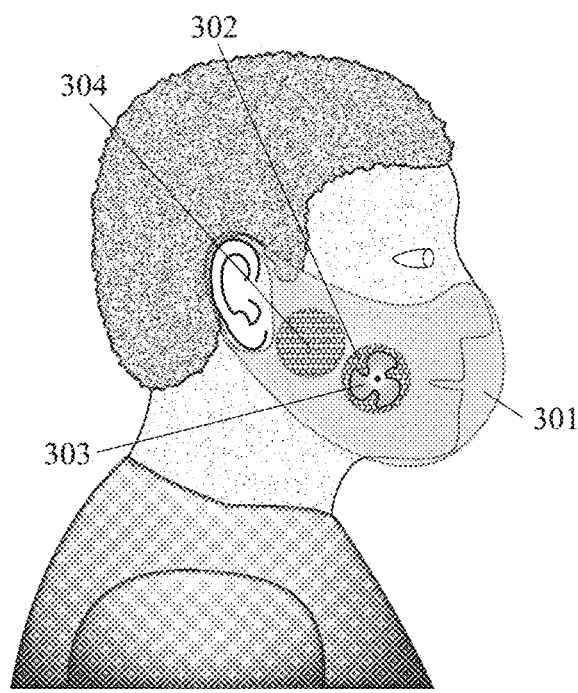
FIG. 3 shows a mask with a transparent portion, an impellor-driven air filter on the side of a person's face, and a passive air filter on the same side but closer to the person's ear.

FIG. 3 shows a side view of an example of a protective face mask comprising: a face mask worn by a person; wherein the mask further comprises a transparent portion 301 which covers the person's mouth; wherein the mask further comprises a first air filter 302 on a side of the person's face which is in fluid communication with space between the transparent portion and the person's mouth; wherein the mask further comprises an impellor 303 which draws air from outside the mask through the first air filter into the space between the transparent portion and the person's mouth; and wherein the mask further comprises a second air filter 304 on the side of the person's face which is in fluid communication with space between the transparent portion and the person's mouth, wherein the second air filter is farther from the person's mouth than the first air filter. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 4:
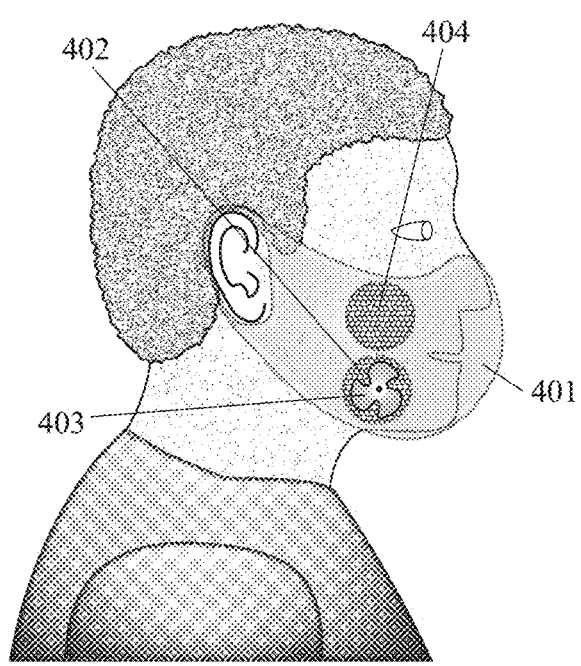
FIG. 4 shows a mask with a transparent portion, an impellor-driven air filter on the side of a person's face, and a passive air filter on the same side but closer to the top of the person's head.

FIG. 4 shows a side view of an example of a protective face mask comprising: a face mask worn by a person; wherein the mask further comprises a transparent portion 401 which covers the person's mouth; wherein the mask further comprises a first air filter 402 on a side of the person's face which is in fluid communication with space between the transparent portion and the person's mouth; wherein the mask further comprises an impellor 403 which draws air from outside the mask through the first air filter into the space between the transparent portion and the person's mouth; and wherein the mask further comprises a second air filter 404 on the side of the person's face which is in fluid communication with space between the transparent portion and the person's mouth, wherein the second air filter is closer to the top of the person's head than the first air filter. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow.

In an example, a protective face mask can comprise: a face mask configured to be worn by a person; wherein the mask further comprises a transparent portion configured to cover the person's mouth; wherein the mask further comprises a first air filter configured to be worn on a side of the person's face, wherein the first air filter is in fluid communication with space between the transparent portion and the person's mouth; wherein the mask further comprises an impellor which draws air from outside the mask through the first air filter into the space between the transparent portion and the person's mouth; and wherein the mask further comprises a second air filter configured to be worn on the side of the person's face, wherein the second air filter is in fluid communication with space between the transparent portion and the person's mouth.

In an example, a second air filter can be configured to be closer to the top of a person's head than the first air filter. In an example, a second air filter can be configured to be closer to the person's ear on the side than the first air filter. In an example, air can be drawn into the mask through a first air filter primarily by the impellor, but air flows into or out of the mask through a second air filter due to the person's respiration. In an example, a first air filter can filter out more airborne particles than a second air filter. In an example, a mask can further comprise a sensor and the rotational speed of the impellor can be automatically increased when the sensor detects an environmental risk and/or a physiological need for more airflow. Variations disclosed elsewhere in this disclosure or in priority-linked disclosures can also be applied to this example.

Figure 5:
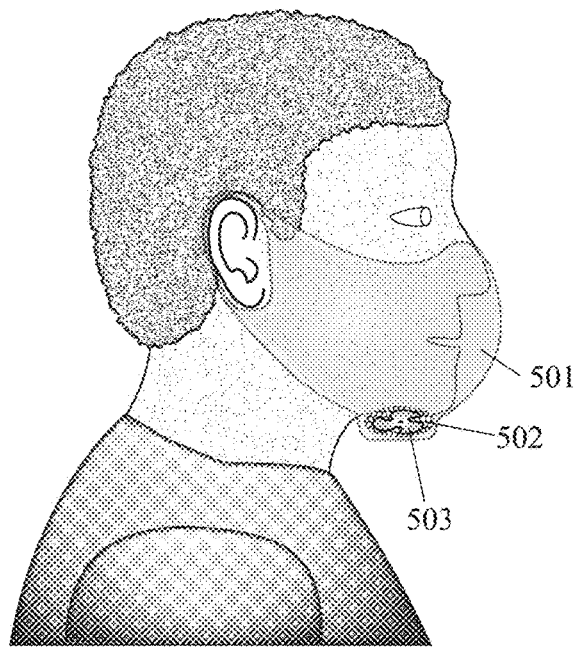
FIG. 5 shows a mask with a transparent portion and an impellor-driven air filter on a person's chin.

FIG. 5 shows a side view of an example of a protective face mask comprising: a face mask worn by a person; wherein the mask further comprises a transparent portion 501 which covers the person's mouth; wherein the mask further comprises an air filter 502 under (or on) the person's chin which is in fluid communication with space between the transparent portion and the person's mouth; and wherein the mask further comprises an impellor 503 which draws air from outside the mask through the air filter into the space between the transparent portion and the person's mouth. In this example, the air filter and the impellor are under the person's chin. In an alternative example, the air filter and impellor can be on the front of the person's chin. In this example, the air filter is closer to the person's face than the impellor. In an alternative example, the impellor can be closer to the person's face than the air filter. Variations disclosed elsewhere in this disclosure or in priority-linked disclosures can also be applied to this example.

Figure 6:
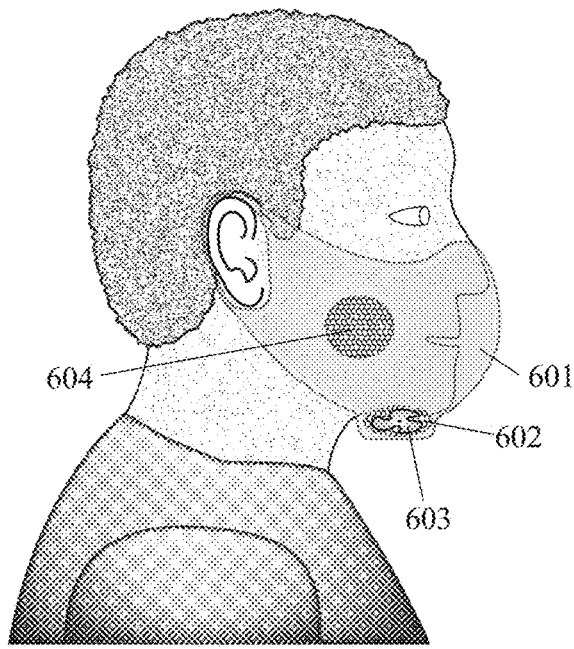
FIG. 6 shows a mask with a transparent portion, an impellor-driven air filter on a person's chin, and a passive air filter on a side of the person's face.

FIG. 6 shows a side view of an example of a protective face mask comprising: a face mask worn by a person; wherein the mask further comprises a transparent portion 601 which covers the person's mouth; wherein the mask further comprises a first air filter 602 under (or on) the person's chin which is in fluid communication with space between the transparent portion and the person's mouth; wherein the mask further comprises an impellor 603 which draws air from outside the mask through the first air filter into the space between the transparent portion and the person's mouth; and wherein the mask further comprises a second air filter 604 on the side of the person's face which is in fluid communication with space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 7:
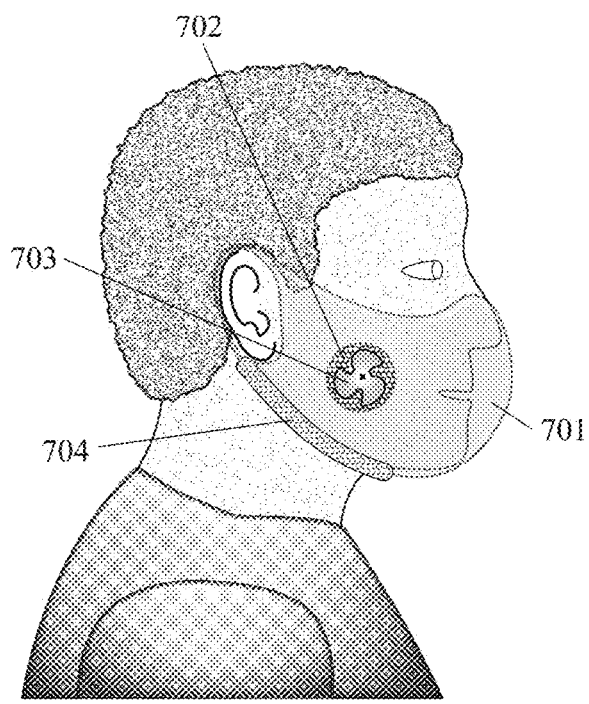
FIG. 7 shows a mask with a transparent portion, an impellor-driven air filter on the side of a person's face, and a passive air filter along the lower perimeter of the mask.

FIG. 7 shows a side view of an example of a protective face mask comprising: a face mask worn by a person; wherein the mask further comprises a transparent portion 701 which covers the person's mouth; wherein the mask further comprises a first air filter 702 on a side of the person's face which is in fluid communication with space between the transparent portion and the person's mouth; wherein the mask further comprises an impellor 703 which draws air from outside the mask through the first air filter into the space between the transparent portion and the person's mouth; and wherein the mask further comprises a second air filter 704 along the lower perimeter of the mask, wherein the second air filter is in fluid communication with space between the transparent portion and the person's mouth. In an example, the second air filter is a longitudinal air filter between the lower perimeter of the mask and the person's face. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 8:
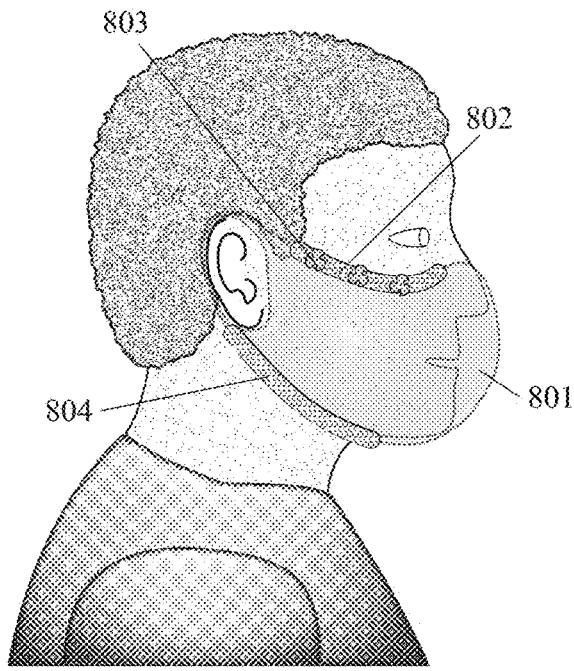
FIG. 8 shows a mask with a transparent portion, an impellor-driven air filter along the upper perimeter of the mask, and a passive air filter along the lower perimeter of the mask.

FIG. 8 shows a side view of an example of a protective face mask comprising: a face mask worn by a person; wherein the mask further comprises a transparent portion 801 which covers the person's mouth; wherein the mask further comprises a first air filter 802 along the upper perimeter of the mask, wherein the first air filter is in fluid communication with space between the transparent portion and the person's mouth; wherein the mask further comprises one or more impellors 803 which draw air from outside the mask through the first air filter into the space between the transparent portion and the person's mouth; and wherein the mask further comprises a second air filter 804 along the lower perimeter of the mask, wherein the second air filter is in fluid communication with space between the transparent portion and the person's mouth. In an example, the first and second air filters are longitudinal air filters between the upper and lower perimeters of the mask, respectively, and the person's face. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 9:
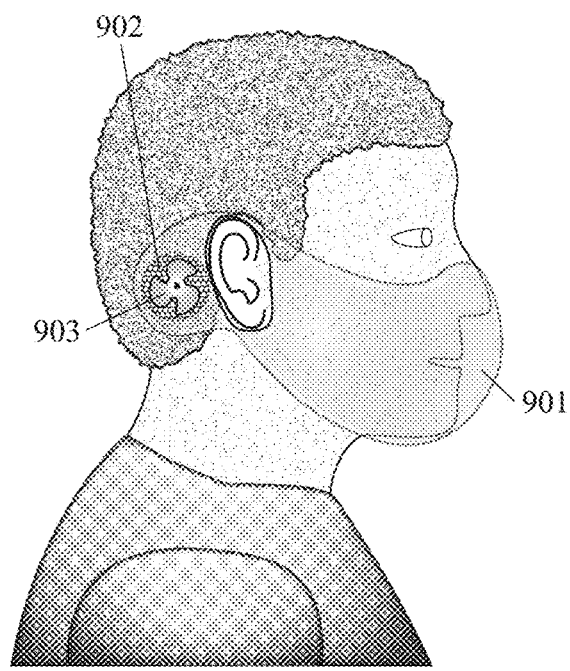
FIG. 9 shows a mask with a transparent portion and an impellor-driven air filter behind a person's ear.

FIG. 9 shows a side view of an example of a protective face mask comprising: a face mask worn by a person; wherein the mask further comprises a transparent portion 901 which covers the person's mouth; wherein the mask further comprises an air filter 902 worn behind the person's ear which is in fluid communication with space between the transparent portion and the person's mouth; and wherein the mask further comprises an impellor 903 which draws air from outside the mask through the air filter into the space between the transparent portion and the person's mouth. In an example, the mask can further comprise an air tube or air channel from the air filter to the space between the transparent portion and the person's mouth. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 10:
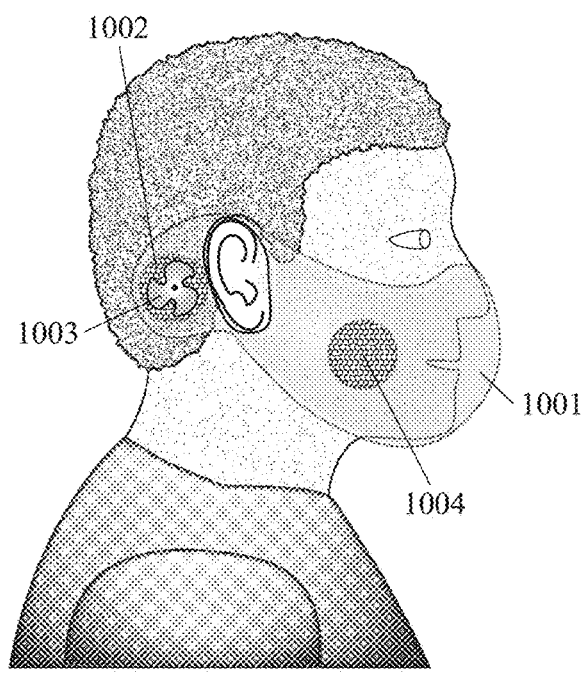
FIG. 10 shows a mask with a transparent portion, an impellor-driven air filter behind a person's ear, and a passive air filter on a side of the person's face.

FIG. 10 shows a side view of an example of a protective face mask comprising: a face mask worn by a person; wherein the mask further comprises a transparent portion 1001 which covers the person's mouth; wherein the mask further comprises a first air filter 1002 worn behind the person's ear which is in fluid communication with space between the transparent portion and the person's mouth; wherein the mask further comprises an impellor 1003 which draws air from outside the mask through the first air filter into the space between the transparent portion and the person's mouth; and wherein the mask further comprises a second air filter 1004 on the side of the person's face which is in fluid communication with space between the transparent portion and the person's mouth. In an example, the mask can further comprise an air tube or air channel from the first air filter to the space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 11:
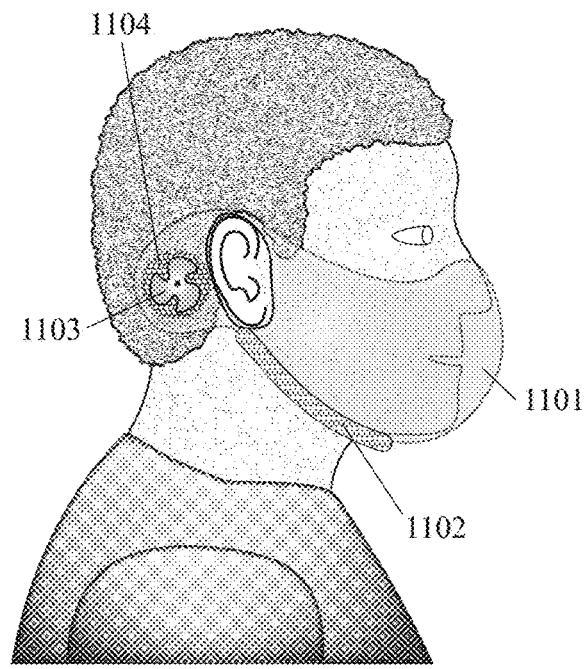
FIG. 11 shows a mask with a transparent portion, an impellor-driven air filter behind a person's ear, and a passive air filter along the lower perimeter of the mask.

FIG. 11 shows a side view of an example of a protective face mask comprising: a face mask worn by a person; wherein the mask further comprises a transparent portion 1101 which covers the person's mouth; wherein the mask further comprises a first air filter 1104 worn behind the person's ear which is in fluid communication with space between the transparent portion and the person's mouth; wherein the mask further comprises an impellor 1103 which draws air from outside the mask through the first air filter into the space between the transparent portion and the person's mouth; and wherein the mask further comprises a second air filter 1102 along the lower perimeter of the mask which is in fluid communication with space between the transparent portion and the person's mouth. In an example, the mask can further comprise an air tube or air channel from the first air filter to the space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 12:
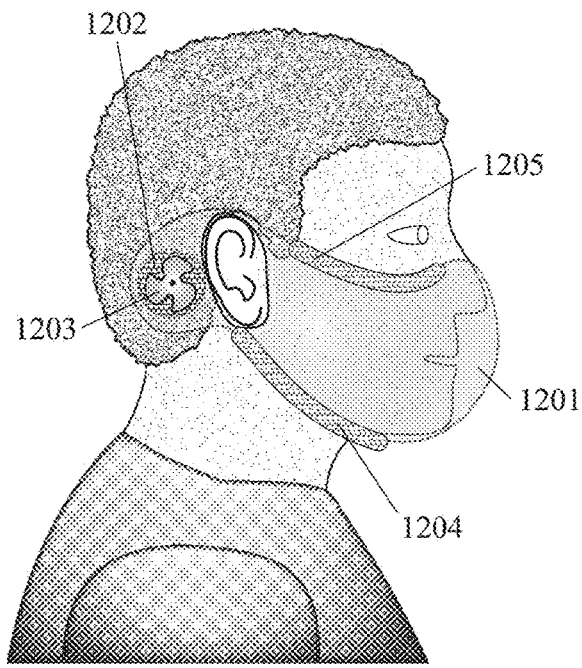
FIG. 12 shows a mask with a transparent portion, an impellor-driven air filter behind a person's ear, and passive air filters along the lower and upper perimeters of the mask.

FIG. 12 shows a side view of an example of a protective face mask comprising: a face mask worn by a person; wherein the mask further comprises a transparent portion 1201 which covers the person's mouth; wherein the mask further comprises a first air filter 1202 worn behind the person's ear which is in fluid communication with space between the transparent portion and the person's mouth; wherein the mask further comprises an impellor 1203 which draws air from outside the mask through the first air filter into the space between the transparent portion and the person's mouth; wherein the mask further comprises a second air filter 1204 along the lower perimeter of the mask which is in fluid communication with space between the transparent portion and the person's mouth; and wherein the mask further comprises a third air filter 1205 along the upper perimeter of the mask which is in fluid communication with space between the transparent portion and the person's mouth. In an example, the mask can further comprise an air tube or air channel from the first air filter to the space between the transparent portion and the person's mouth. In an example, air is drawn into the mask through the first air filter primarily by an impeller, but flows into or out of the mask through the second and/or third air filters due to the person's respiration. In an example, the first air filter can filter out more airborne particles than the second and/or third air filters. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 13:
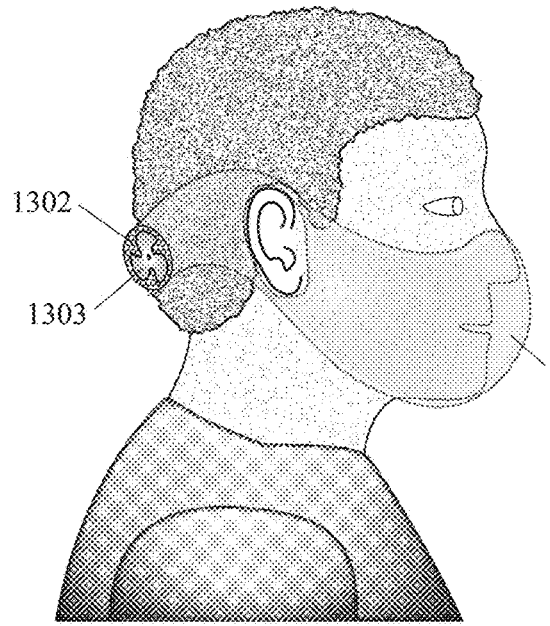
FIG. 13 shows a mask with a transparent portion and an impellor-driven air filter on the back of a person's head.

FIG. 13 shows a side view of an example of a protective face mask comprising: a face mask worn by a person; wherein the mask further comprises a transparent portion 1301 which covers the person's mouth; wherein the mask further comprises an air filter 1302 worn on the back of the person's head which is in fluid communication with space between the transparent portion and the person's mouth; and wherein the mask further comprises an impellor 1303 which draws air from outside the mask through the air filter into the space between the transparent portion and the person's mouth. In an example, the mask can further comprise an air tube or air channel from the air filter to the space between the transparent portion and the person's mouth. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 14:
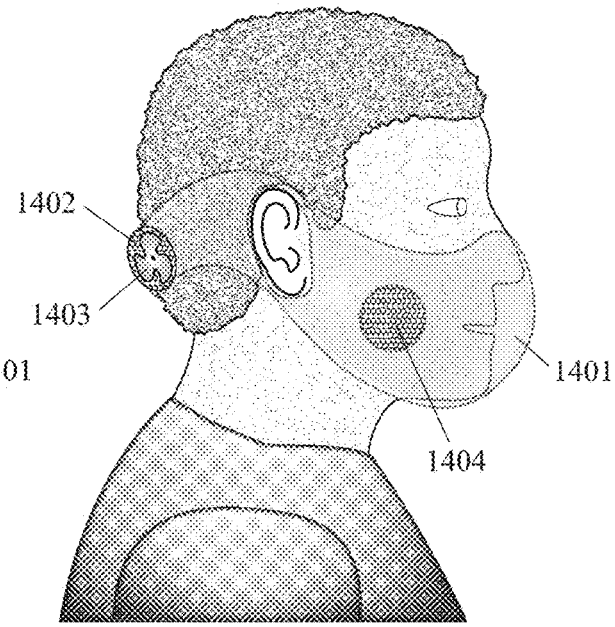
FIG. 14 shows a mask with a transparent portion, an impellor-driven air filter on the back of a person's head, and a passive air filter on a side of the person's face.

FIG. 14 shows a side view of an example of a protective face mask comprising: a face mask worn by a person; wherein the mask further comprises a transparent portion 1401 which covers the person's mouth; wherein the mask further comprises a first air filter 1402 worn on the back of the person's head which is in fluid communication with space between the transparent portion and the person's mouth; wherein the mask further comprises an impellor 1403 which draws air from outside the mask through the first air filter into the space between the transparent portion and the person's mouth; and wherein the mask further comprises a second air filter 1404 on the side of the person's face which is in fluid communication with space between the transparent portion and the person's mouth. In an example, the mask can further comprise an air tube or air channel from the first air filter to the space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 15:
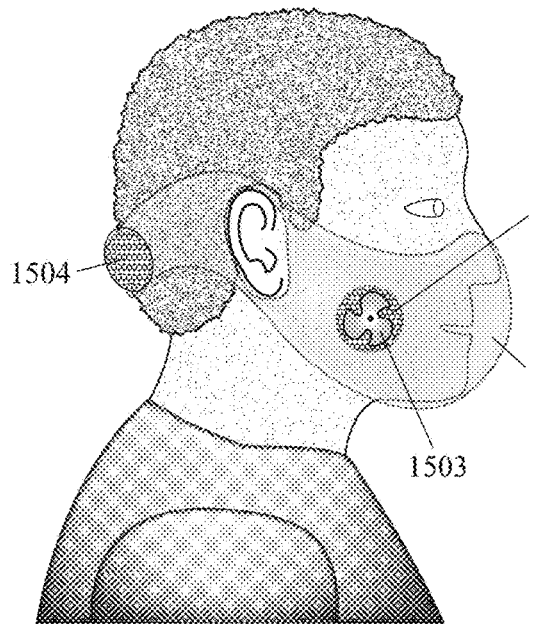
FIG. 15 shows a mask with a transparent portion, an impellor-driven air filter on a side of a person's face, and a passive air filter on the back of the person's head.

FIG. 15 shows a side view of an example of a protective face mask comprising: a face mask worn by a person; wherein the mask further comprises a transparent portion 1501 which covers the person's mouth; wherein the mask further comprises a first air filter 1502 worn on the side of the person's face which is in fluid communication with space between the transparent portion and the person's mouth; wherein the mask further comprises an impellor 1503 which draws air from outside the mask through the first air filter into the space between the transparent portion and the person's mouth; and wherein the mask further comprises a second air filter 1504 worn on the back of the person's head which is in fluid communication with space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 16:
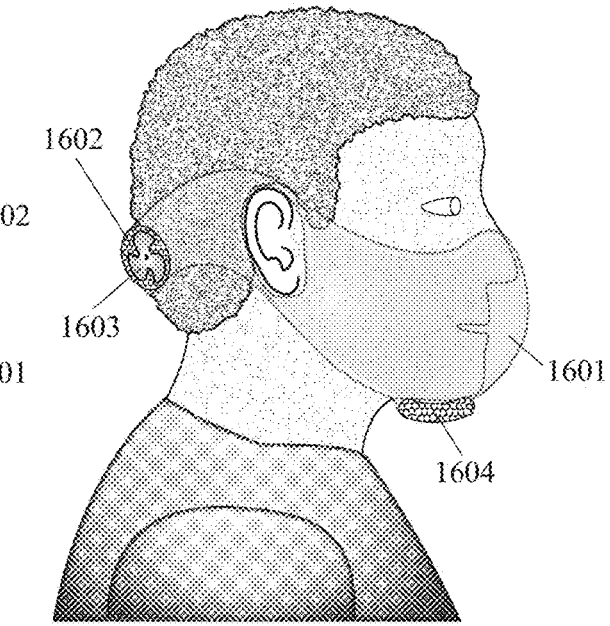
FIG. 16 shows a mask with a transparent portion, an impellor-driven air filter on the back of a person's head, and a passive air filter on the person's chin.

FIG. 16 shows a side view of an example of a protective face mask comprising: a face mask worn by a person; wherein the mask further comprises a transparent portion 1601 which covers the person's mouth; wherein the mask further comprises a first air filter 1602 worn on the back of the person's head which is in fluid communication with space between the transparent portion and the person's mouth; wherein the mask further comprises an impellor 1603 which draws air from outside the mask through the first air filter into the space between the transparent portion and the person's mouth; and wherein the mask further comprises a second air filter 1604 under (or on) the person's chin which is in fluid communication with space between the transparent portion and the person's mouth. In an example, the mask can further comprise an air tube or air channel from the first air filter to the space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 17:
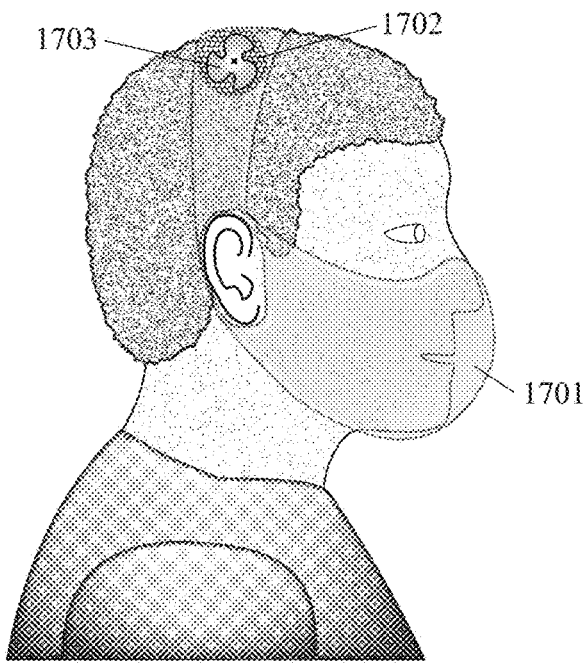
FIG. 17 shows a mask with a transparent portion and an impellor-driven air filter on the top of a person's head.

FIG. 17 shows a side view of an example of a protective face mask comprising: a face mask worn by a person; wherein the mask further comprises a transparent portion 1701 which covers the person's mouth; wherein the mask further comprises an air filter 1702 worn on the top of the person's head which is in fluid communication with space between the transparent portion and the person's mouth; and wherein the mask further comprises an impellor 1703 which draws air from outside the mask through the air filter into the space between the transparent portion and the person's mouth. In an example, the mask can further comprise an air tube or air channel from the air filter to the space between the transparent portion and the person's mouth. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 18:
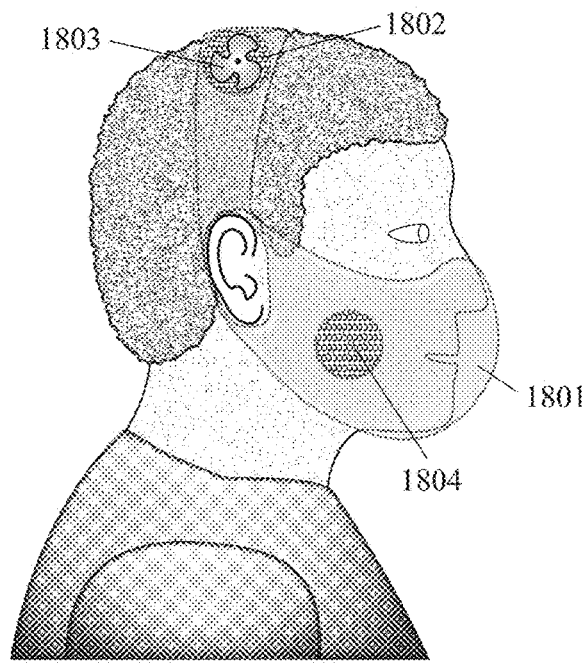
FIG. 18 shows a mask with a transparent portion, an impellor-driven air filter on the top of a person's head, and a passive air filter on a side of the person's face.

FIG. 18 shows a side view of an example of a protective face mask comprising: a face mask worn by a person; wherein the mask further comprises a transparent portion 1801 which covers the person's mouth; wherein the mask further comprises a first air filter 1802 worn on the top of the person's head which is in fluid communication with space between the transparent portion and the person's mouth; wherein the mask further comprises an impellor 1803 which draws air from outside the mask through the first air filter into the space between the transparent portion and the person's mouth; and wherein the mask further comprises a second air filter 1804 on the side of the person's face which is in fluid communication with space between the transparent portion and the person's mouth. In an example, the mask can further comprise an air tube or air channel from the first air filter to the space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow.

In an example, a protective face mask can comprise: a face mask configured to be worn by a person; wherein the mask further comprises a transparent portion configured to cover the person's mouth; wherein the mask further comprises a first air filter configured to be worn on the top of the person's head, wherein the first air filter is in fluid communication with space between the transparent portion and the person's mouth; wherein the mask further comprises an impellor which draws air from outside the mask through the first air filter; and wherein the mask further comprises a second air filter configured to be worn on a side of the person's face, wherein the second air filter is in fluid communication with space between the transparent portion and the person's mouth.

In an example, a mask can further comprise an air tube or air channel from a first air filter to the space between a transparent portion of a mask and a person's mouth. In an example, air can be drawn into a mask through a first air filter primarily by the impellor, but flows into or out of the mask through a second air filter due to the person's respiration. In an example, a first air filter can filter out more airborne particles than a second air filter. In an example, an impeller can be activated by a person. In an example, a mask can further comprise a sensor and the rotational speed of the impellor can be automatically increased when the sensor detects an environmental risk and/or a physiological need for more airflow. Variations disclosed elsewhere in this disclosure or in priority-linked disclosures can also be applied to this example.

Figure 19:
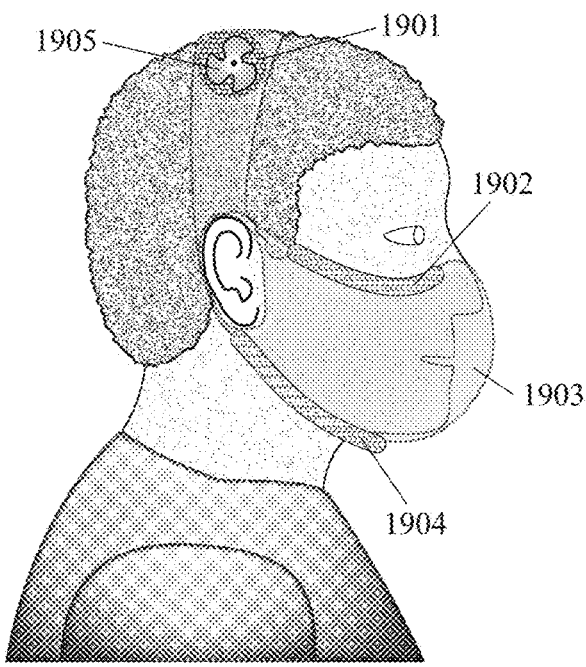
FIG. 19 shows a mask with a transparent portion, an impellor-driven air filter on the top of a person's head, and passive air filters along the lower and upper perimeters of the mask.

FIG. 19 shows a side view of an example of a protective face mask comprising: a face mask worn by a person; wherein the mask further comprises a transparent portion 1903 which covers the person's mouth; wherein the mask further comprises a first air filter 1901 worn on the top of the person's head which is in fluid communication with space between the transparent portion and the person's mouth; wherein the mask further comprises an impellor 1905 which draws air from outside the mask through the first air filter into the space between the transparent portion and the person's mouth; wherein the mask further comprises a second air filter 1904 along the lower perimeter of the mask which is in fluid communication with space between the transparent portion and the person's mouth; and wherein the mask further comprises a third air filter 1902 along the upper perimeter of the mask which is in fluid communication with space between the transparent portion and the person's mouth. In an example, the mask can further comprise an air tube or air channel from the first air filter to the space between the transparent portion and the person's mouth. In an example, air is drawn into the mask through the first air filter primarily by an impellor, but flows into or out of the mask through the second and/or third air filters due to the person's respiration. In an example, the first air filter can filter out more airborne particles than the second and/or third air filters. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 20:
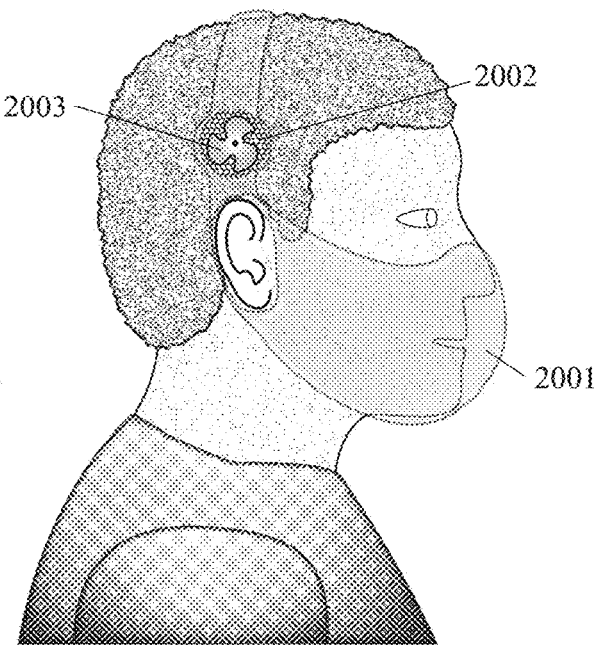
FIG. 20 shows a mask with a transparent portion and an impellor-driven air filter above a person's ear.

FIG. 20 shows a side view of an example of a protective face mask comprising: a face mask worn by a person; wherein the mask further comprises a transparent portion 2001 which covers the person's mouth; wherein the mask further comprises an air filter 2002 worn above the person's ear which is in fluid communication with space between the transparent portion and the person's mouth; and wherein the mask further comprises an impellor 2003 which draws air from outside the mask through the air filter into the space between the transparent portion and the person's mouth. In an example, the mask can further comprise an air tube or air channel from the air filter to the space between the transparent portion and the person's mouth. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figures 21, 22:
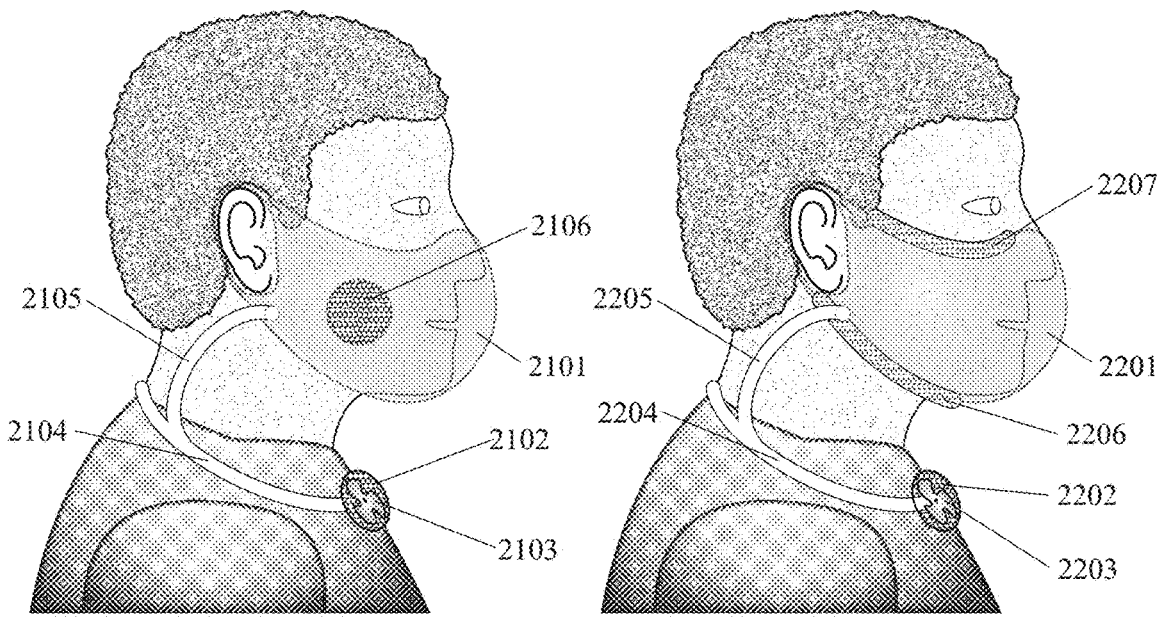
FIG. 21 shows a mask with a transparent portion, an impellor-driven air filter on the front of a necklace or collar, and a passive air filter on a side of a person's face.
FIG. 22 shows a mask with a transparent portion, an impellor-driven air filter on the front of a necklace or collar, and passive air filters along the lower and upper perimeters of the mask.

FIG. 21 shows a side view of an example of a protective face mask comprising: a face mask worn by a person; wherein the mask further comprises a transparent portion 2101 which covers the person's mouth; wherein the mask further comprises a first air filter 2102 on the front of a necklace (or collar) 2104, wherein the mask further comprises an air tube (or air channel) 2105 through which the first air filter is in fluid communication with space between the transparent portion and the person's mouth; wherein the mask further comprises an impellor 2103 which draws air from outside the mask through the first air filter into the space between the transparent portion and the person's mouth; and wherein the mask further comprises a second air filter 2106 on the side of the person's face which is in fluid communication with space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

FIG. 22 shows a side view of an example of a protective face mask comprising: a face mask worn by a person; wherein the mask further comprises a transparent portion 2201 which covers the person's mouth; wherein the mask further comprises a first air filter 2202 on a necklace (or collar) 2204 around the person's neck, wherein the mask further comprises an air tube (or air channel) 2205 through which the first air filter is in fluid communication with space between the transparent portion and the person's mouth; wherein the mask further comprises an impellor 2203 which draws air from outside the mask through the first air filter into the space between the transparent portion and the person's mouth; wherein the mask further comprises a second air filter 2206 along the lower perimeter of the mask which is in fluid communication with space between the transparent portion and the person's mouth; and wherein the mask further comprises a third air filter 2207 along the upper perimeter of the mask which is in fluid communication with space between the transparent portion and the person's mouth. In an example, air is drawn into the mask through the first air filter primarily by an impellor, but flows into or out of the mask through the second and/or third air filters due to the person's respiration. In an example, the first air filter can filter out more airborne particles than the second and/or third air filters. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figures 23, 24:
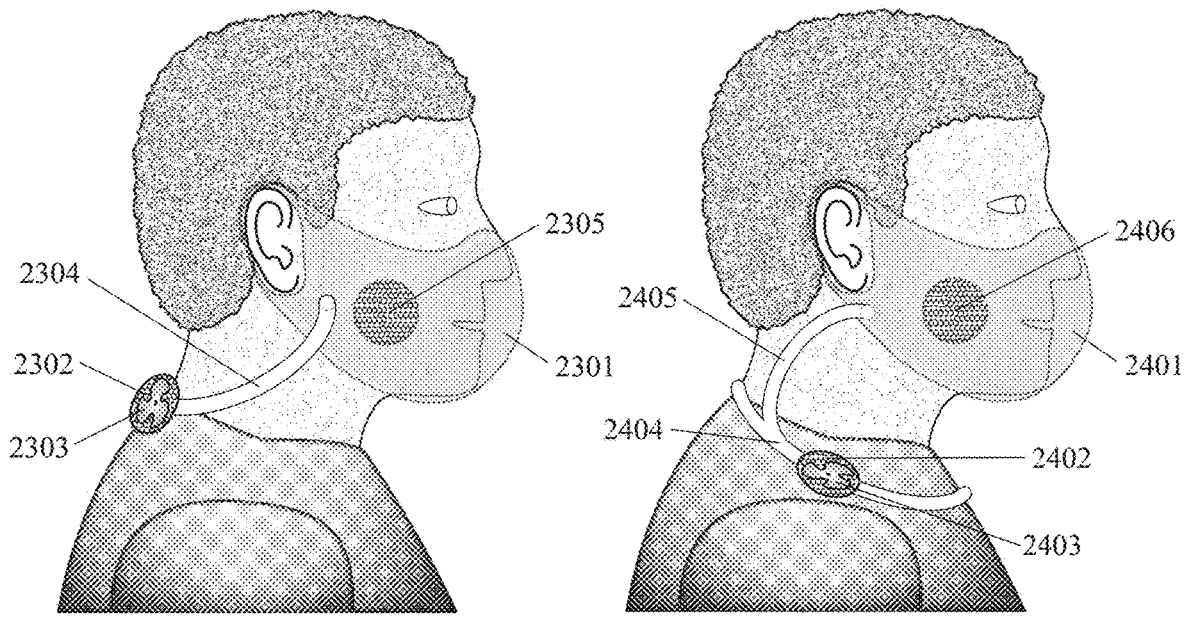
FIG. 23 shows a mask with a transparent portion, an impellor-driven air filter on the back of a person's neck, and a passive air filter on a side of a person's face.
FIG. 24 shows a mask with a transparent portion, an impellor-driven air filter on the right or left side of a necklace or collar, and a passive air filter on a side of a person's face.

FIG. 23 shows a side view of an example of a protective face mask comprising: a face mask worn by a person; wherein the mask further comprises a transparent portion 2301 which covers the person's mouth; wherein the mask further comprises a first air filter 2302 worn on the back of a person's neck (or the person's upper back); wherein the mask further comprises an air tube (or air channel) 2304 through which the first air filter is in fluid communication with space between the transparent portion and the person's mouth; wherein the mask further comprises an impellor 2303 which draws air from outside the mask through the first air filter into the space between the transparent portion and the person's mouth; and wherein the mask further comprises a second air filter 2305 on the side of the person's face which is in fluid communication with space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

FIG. 24 shows a side view of an example of a protective face mask comprising: a face mask worn by a person; wherein the mask further comprises a transparent portion 2401 which covers the person's mouth; wherein the mask further comprises a first air filter 2402 on the right or left side of a necklace (or collar) 2404, wherein the mask further comprises an air tube (or air channel) 2405 through which the first air filter is in fluid communication with space between the transparent portion and the person's mouth; wherein the mask further comprises an impellor 2403 which draws air from outside the mask through the first air filter into the space between the transparent portion and the person's mouth; and wherein the mask further comprises a second air filter 2406 on the side of the person's face which is in fluid communication with space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 25:
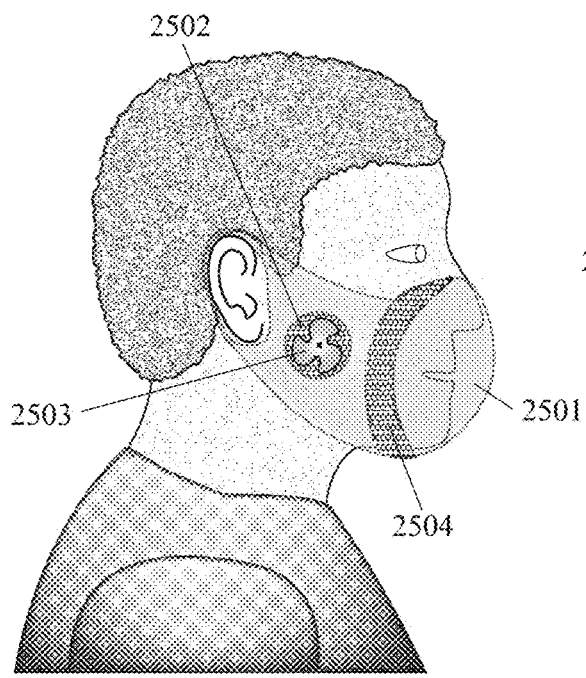
FIG. 25 shows a mask with a transparent portion, an impellor-driven air filter on the side of a person's face, and a passive air filter around the perimeter of the transparent portion.

FIG. 25 shows a side view of an example of a protective face mask comprising: a face mask worn by a person; wherein the mask further comprises a transparent portion 2501 which covers the person's mouth; wherein the mask further comprises a first air filter 2502 on a side of the person's face which is in fluid communication with space between the transparent portion and the person's mouth; wherein the mask further comprises an impellor 2503 which draws air from outside the mask through the first air filter into the space between the transparent portion and the person's mouth; and wherein the mask further comprises an arcuate second air filter 2504 around (at least part of) the perimeter of the transparent portion. In an example, the second air filter can have a conic-section shape. In an example, the second air filter can have a crescent or fish-gill shape. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 26:
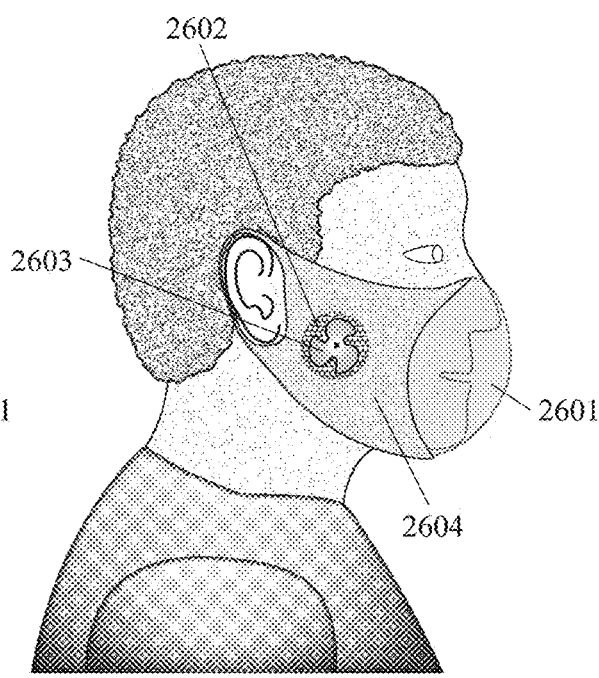
FIG. 26 shows a mask with a transparent portion and an impellor-driven air filter on a non-transparent portion of the mask.

FIG. 26 shows a side view of an example of a protective face mask comprising: a face mask worn by a person; wherein the mask further comprises a transparent portion 2601 which covers the person's mouth; wherein the mask further comprises a non-transparent portion 2604 which connects the transparent portion to the person's head (e.g. ears); wherein the mask further comprises a first air filter 2602 on a side of the person's face which is in fluid communication with space between the mask and the person's face; and wherein the mask further comprises an impellor 2603 which draws air from outside the mask through the first air filter into the space between the mask and the person's face. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 27:
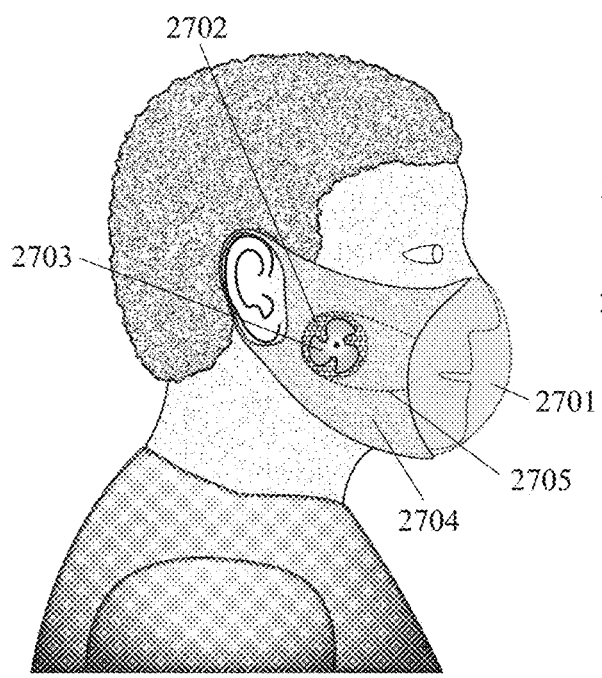
FIG. 27 shows a mask with a transparent portion and an impellor-driven air filter on a non-transparent portion of the mask which connects the air filter to the space between the transparent portion and the person's mouth.

FIG. 27 shows a side view of an example of a protective face mask comprising: a face mask worn by a person; wherein the mask further comprises a transparent portion 2701 which covers the person's mouth; wherein the mask further comprises a non-transparent portion 2704 which connects the transparent portion to the person's head (e.g. ears); wherein the mask further comprises a first air filter 2702 on a side of the person's face which is in fluid communication with space between the mask and the person's face via an air tube (or air channel) 2705; and wherein the mask further comprises an impellor 2703 which draws air from outside the mask through the first air filter into the space between the mask and the person's face. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 28:
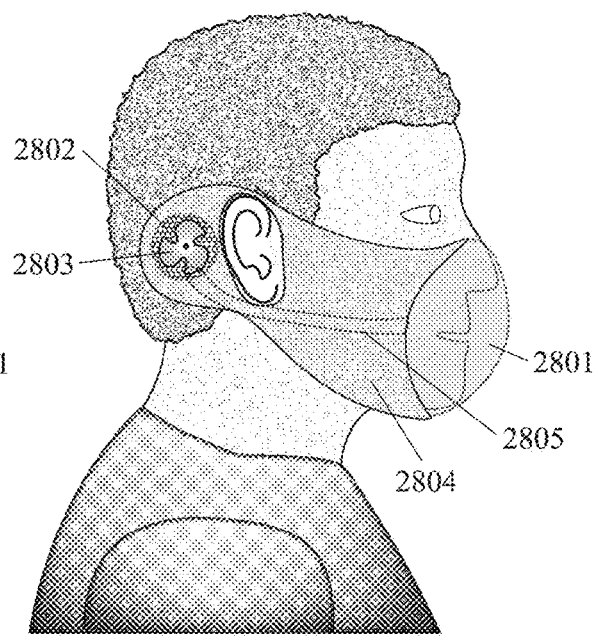
FIG. 28 shows a mask with a transparent portion and an impellor-driven air filter behind a person's ear which is connected by an air tube or channel to the space between the transparent portion and the person's mouth.

FIG. 28 shows a side view of an example of a protective face mask comprising: a face mask worn by a person; wherein the mask further comprises a transparent portion 2801 which covers the person's mouth; wherein the mask further comprises a non-transparent portion 2804 which connects the transparent portion to the person's head (e.g. ears); wherein the mask further comprises a first air filter 2802 worn behind an ear which is in fluid communication with space between the mask and the person's face via an air tube (or air channel) 2805; and wherein the mask further comprises an impellor 2803 which draws air from outside the mask through the first air filter into the space between the mask and the person's face. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 29:
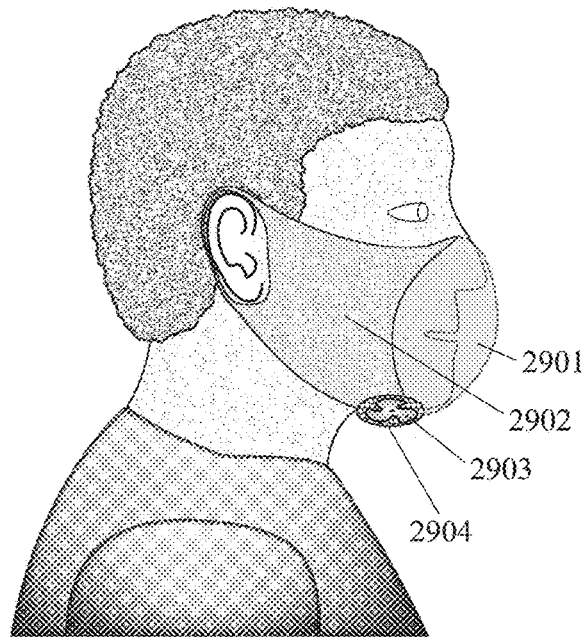
FIG. 29 shows a mask with a transparent portion, a non-transparent portion, and an impellor-driven air filter on a person's chin.

FIG. 29 shows a side view of an example of a protective face mask comprising: a face mask worn by a person; wherein the mask further comprises a transparent portion 2901 which covers the person's mouth; wherein the mask further comprises a non-transparent portion 2902 which connects the transparent portion to the person's head (e.g. ears); wherein the mask further comprises an air filter 2904 under (or on) the person's chin which is in fluid communication with space between the transparent portion and the person's mouth; and wherein the mask further comprises an impellor 2903 which draws air from outside the mask through the air filter into the space between the transparent portion and the person's mouth. In an example, the transparent portion can have a mouth-facing concavity. In this example, the air filter and the impellor are under the person's chin. In an alternative example, the air filter and impellor can be on the front of the person's chin. In this example, the air filter is closer to the person's face than the impellor. In an alternative example, the impellor can be closer to the person's face than the air filter. Variations disclosed elsewhere in this disclosure or in priority-linked disclosures can also be applied to this example.

Figure 30:
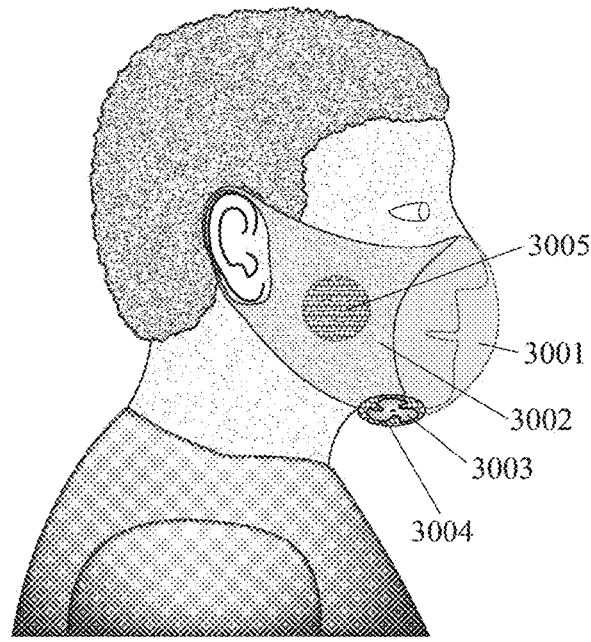
FIG. 30 shows a mask with a transparent portion, a non-transparent portion, an impellor-driven air filter on a person's chin, and a passive air filter on a side of the person's face.

FIG. 30 shows a side view of an example of a protective face mask comprising: a face mask worn by a person; wherein the mask further comprises a transparent portion 3001 which covers the person's mouth; wherein the mask further comprises a non-transparent portion 3002 which connects the transparent portion to the person's head (e.g. ears); wherein the mask further comprises a first air filter 3004 under (or on) the person's chin which is in fluid communication with space between the mask and the person's mouth; wherein the mask further comprises an impellor 3003 which draws air from outside the mask through the first air filter into the space between the mask and the person's mouth; and wherein the mask further comprises a second air filter 3005 on the side of the person's face which is in fluid communication with space between the mask and the person's mouth. In an example, the transparent portion can have a mouth-facing concavity. In this example, the air filter and the impellor are under the person's chin. In an alternative example, the air filter and impellor can be on the front of the person's chin. In this example, the air filter is closer to the person's face than the impellor. In an alternative example, the impellor can be closer to the person's face than the air filter. Variations disclosed elsewhere in this disclosure or in priority-linked disclosures can also be applied to this example.

Figure 31:
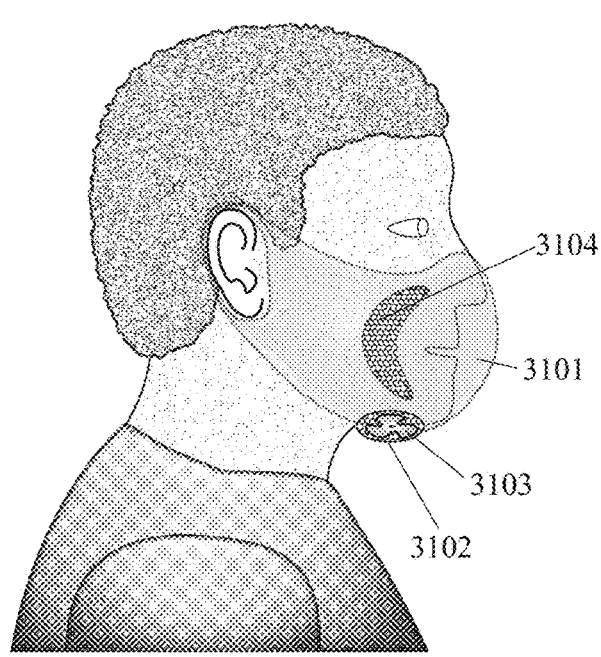
FIG. 31 shows a mask with a transparent portion, an impellor-driven air filter on a person's chin, and a crescent-shaped passive air filter on a side of the person's face.

FIG. 31 shows a side view of an example of a protective face mask comprising: a face mask worn by a person; wherein the mask further comprises a transparent portion 3101 which covers the person's mouth; wherein the mask further comprises a first air filter 3102 under (or on) the person's chin which is in fluid communication with space between the transparent portion and the person's mouth; wherein the mask further comprises an impellor 3103 which draws air from outside the mask through the first air filter into the space between the transparent portion and the person's mouth; and wherein the mask further comprises a second air filter 3104 on the side of the person's face which is in fluid communication with space between the transparent portion and the person's mouth, wherein the second air filter has a crescent, boomerang, and/or fish-gill shape. In an example, the transparent portion can have a mouth-facing concavity. In this example, the air filter and the impellor are under the person's chin. In an alternative example, the air filter and impellor can be on the front of the person's chin. In this example, the air filter is closer to the person's face than the impellor. In an alternative example, the impellor can be closer to the person's face than the air filter. Variations disclosed elsewhere in this disclosure or in priority-linked disclosures can also be applied to this example.

Figure 32:
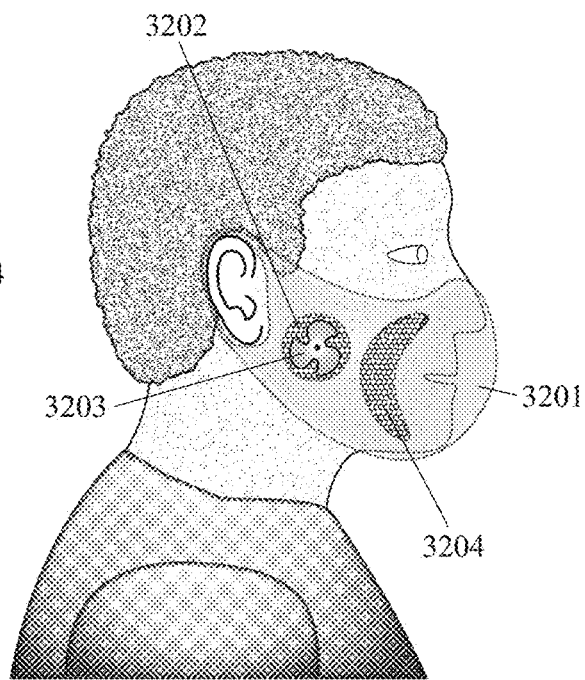
FIG. 32 shows a mask with a transparent portion, an impellor-driven air filter on a side of a person's face, and a crescent-shaped passive air filter on the side of the person's face.

FIG. 32 shows a side view of an example of a protective face mask comprising: a face mask worn by a person; wherein the mask further comprises a transparent portion 3201 which covers the person's mouth; wherein the mask further comprises a first air filter 3202 on a side of the person's face which is in fluid communication with space between the transparent portion and the person's mouth; wherein the mask further comprises an impellor 3203 which draws air from outside the mask through the first air filter into the space between the transparent portion and the person's mouth; and wherein the mask further comprises a second air filter 3204 on the side of the person's face which is in fluid communication with space between the transparent portion and the person's mouth, wherein the second air filter has a crescent, boomerang, and/or fish-gill shape. In an example, the transparent portion can have a mouth-facing concavity. In this example, the air filter and the impellor are under the person's chin. In an alternative example, the air filter and impellor can be on the front of the person's chin. In this example, the air filter is closer to the person's face than the impellor. In an alternative example, the impellor can be closer to the person's face than the air filter. Variations disclosed elsewhere in this disclosure or in priority-linked disclosures can also be applied to this example.

Figure 33:
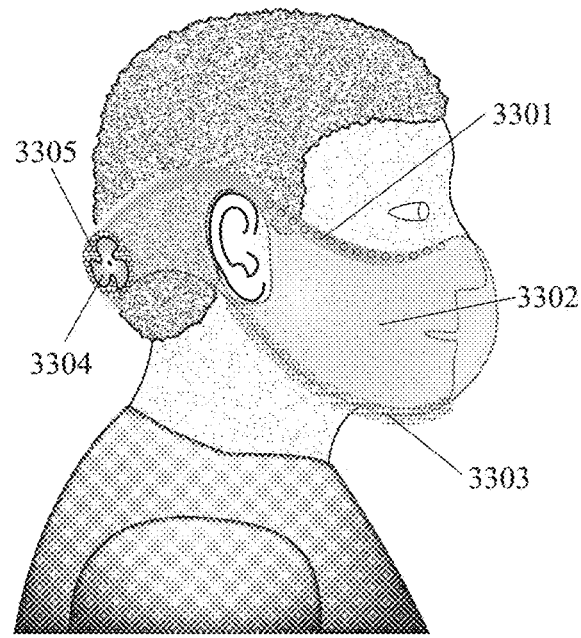
FIG. 33 shows a mask with a transparent portion, an impellor-driven air filter on the back of a person's head which is connected by an air tube to the upper perimeter of the mask, and a passive air filter along the lower perimeter of the mask.

FIG. 33 shows a side view of an example of a protective face mask comprising: a face mask worn by a person; wherein the mask further comprises a transparent portion 3302 which covers the person's mouth; wherein the mask further comprises a first air filter 3305 worn on the back of the person's head which is in fluid communication with space between the transparent portion and the person's mouth; wherein the mask further comprises an impellor 3304 which draws air from outside the mask through the first air filter; wherein the mask further comprises an air tube (or air channel) with holes 3301 through which air from the first air filter is emitted into the space between the transparent portion and the person; and wherein the mask further comprises a second air filter 3303 along the lower perimeter of the mask which is in fluid communication with space between the transparent portion and the person's mouth. In this example, the air tube (or air channel) is along the upper perimeter of the mask. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 34:
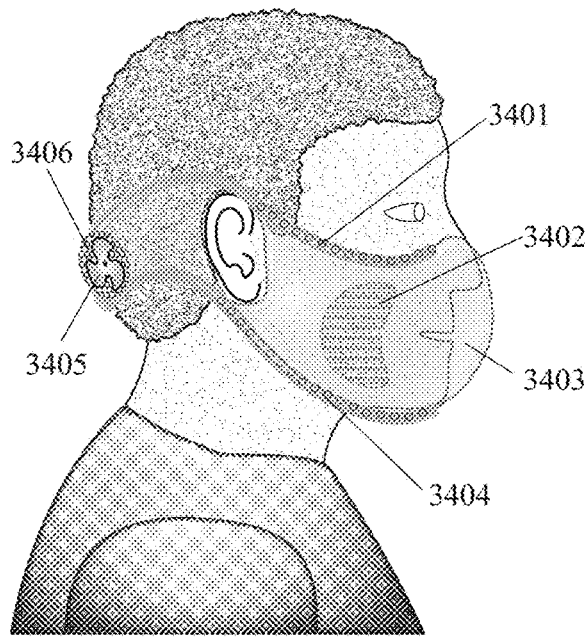
FIG. 34 shows a mask with a transparent portion, an impellor-driven air filter on the back of a person's head which is connected by air tubes to the lower and upper perimeters of the mask, and a passive air filter on a side of the person's face.

FIG. 34 shows a side view of an example of a protective face mask comprising: a face mask worn by a person; wherein the mask further comprises a transparent portion 3403 which covers the person's mouth; wherein the mask further comprises a first air filter 3406 worn on the back of the person's head which is in fluid communication with space between the transparent portion and the person's mouth; wherein the mask further comprises an impellor 3405 which draws air from outside the mask through the first air filter; wherein the mask further comprises a first air tube (or air channel) with holes 3401 through which air from the first air filter is emitted into the space between the transparent portion and the person, wherein the first air tube (or air channel) is along the upper perimeter of the mask; wherein the mask further comprises a second air tube (or air channel) with holes 3404 through which air from the first air filter is emitted into the space between the transparent portion and the person, wherein the second air tube (or air channel) is along the lower perimeter of the mask; and wherein the mask further comprises a second air filter 3402 on the side of the person's face which is in fluid communication with space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 35:
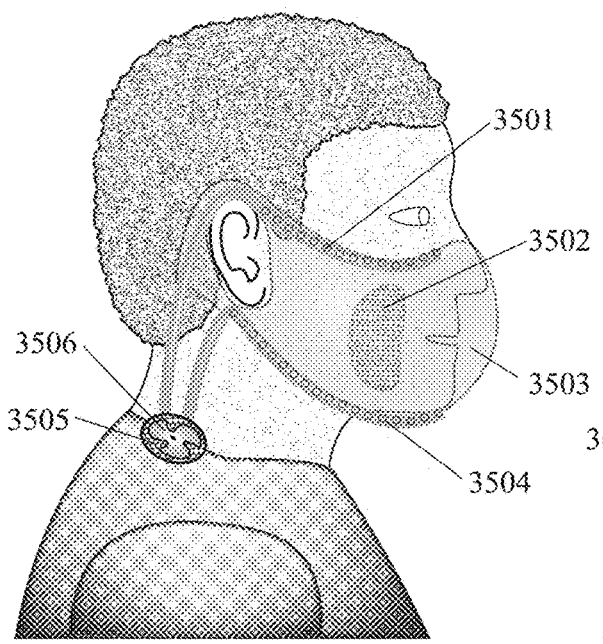
FIG. 35 shows a mask with a transparent portion, an impellor-driven air filter on the person's neck which is connected by air tubes to the lower and upper perimeters of the mask, and a passive air filter on a side of the person's face.

FIG. 35 shows a side view of an example of a protective face mask comprising: a face mask worn by a person; wherein the mask further comprises a transparent portion 3503 which covers the person's mouth; wherein the mask further comprises a first air filter 3505 worn on a person's neck (or torso) which is in fluid communication with space between the transparent portion and the person's mouth; wherein the mask further comprises an impellor 3506 which draws air from outside the mask through the first air filter; wherein the mask further comprises a first air tube (or air channel) with holes 3501 through which air from the first air filter is emitted into the space between the transparent portion and the person, wherein the first air tube (or air channel) is along the upper perimeter of the mask; wherein the mask further comprises a second air tube (or air channel) with holes 3504 through which air from the first air filter is emitted into the space between the transparent portion and the person, wherein the second air tube (or air channel) is along the lower perimeter of the mask; and wherein the mask further comprises a second air filter 3502 on the side of the person's face which is in fluid communication with space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 36:
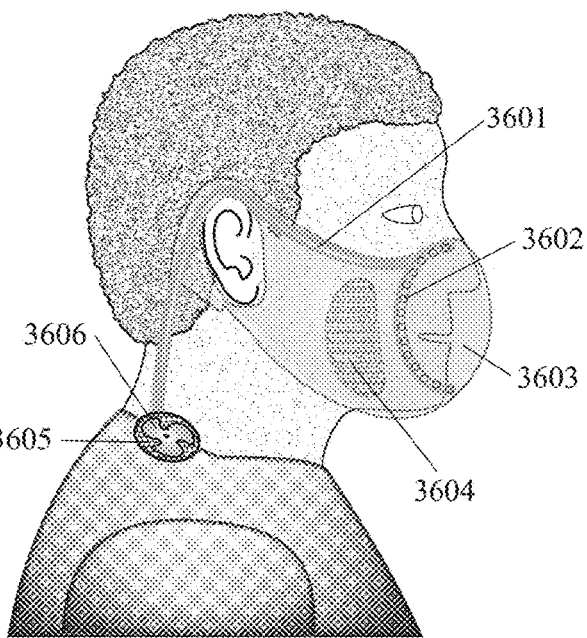
FIG. 36 shows a mask with a transparent portion, an impellor-driven air filter on the person's neck which is connected to an air tube which encircles the person's mouth, and a passive air filter on a side of the person's face.

FIG. 36 shows a side view of an example of a protective face mask comprising: a face mask worn by a person; wherein the mask further comprises a transparent portion 3603 which covers the person's mouth; wherein the mask further comprises a first air filter 3605 worn on a person's neck (or torso) which is in fluid communication with space between the transparent portion and the person's mouth; wherein the mask further comprises an impellor 3606 which draws air from outside the mask through the first air filter; wherein the mask further comprises an air tube (or air channel) 3601 with holes 3602 through which air from the first air filter is emitted into the space between the transparent portion and the person's mouth, wherein the holes at least partially encircle the person's mouth; and wherein the mask further comprises a second air filter 3604 on the side of the person's face which is in fluid communication with space between the transparent portion and the person's mouth. In an example, air is drawn into the mask through the first air filter primarily by an impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 37:
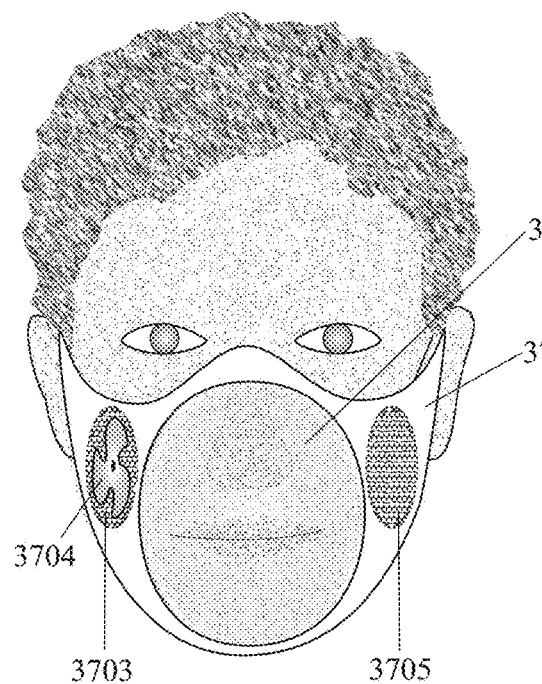
FIG. 37 shows a mask with a transparent portion, a right-side impellor-driven air filter, and a left-side passive air filter.

FIG. 37 shows a front view of an example of a protective face mask comprising: a face mask worn by a person; wherein the mask further comprises a non-transparent portion 3701; wherein the mask further comprises a transparent portion 3702 which covers the person's mouth; wherein the mask further comprises a first air filter 3703 on a first side (e.g. the right side) of the person's head, wherein the first air filter is in fluid communication with space between the transparent portion and the person's mouth; wherein the mask further comprises a second air filter 3705 on the opposite side (e.g. the left side) of the person's head, wherein the second air filter is in fluid communication with the space between the transparent portion and the person's mouth; and wherein the mask further comprises an impeller 3704 which draws air from outside the mask through the first air filter into the space between the transparent portion and the person's mouth.

In an example, the transparent portion can have a concavity which faces toward the person's mouth. In an example, the transparent portion can have a circular, elliptical, oval-shaped, or egg-shaped perimeter. In an example, the air filters can be located over the person's cheeks. In an example, air is drawn into the mask through the first air filter primarily by the impellor, but flows into or out of the mask through the second air filter due to the person's respiration. In an example, the first air filter can filter out more airborne particles than the second air filter. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow.

In an example, a protective face mask can comprise: a face mask configured to be worn by a person; wherein the mask further comprises a transparent portion configured to cover the person's mouth; wherein the mask further comprises a first air filter configured to be worn on a first side of the person's head, wherein the first air filter is in fluid communication with space between the transparent portion and the person's mouth; wherein the mask further comprises a second air filter configured to be worn on the opposite side of the person's head, wherein the second air filter is in fluid communication with the space between the transparent portion and the person's mouth; and wherein the mask further comprises an impellor which draws air from outside the mask through the first air filter into the space between the transparent portion and the person's mouth.

In an example, a transparent portion of a mask can have a concavity which faces toward a person's mouth. In an example, first and second air filters can be located over a person's first side and second side cheeks, respectively. In another example, first and second air filters can be located behind a person's first side and second side ears, respectively. In an example, air can be is drawn into a mask through a first air filter primarily by the impellor, but flow into or out of the mask through a second air filter due to the person's respiration. In an example, a first air filter can filter out more airborne particles than a second air filter. In an example, a mask can further comprise an environmental sensor and the rotational speed of the impellor can be automatically increased when the sensor detects an environmental risk. In an example, a mask can further comprise a biometric sensor and the rotational speed of the impellor can be automatically increased when the sensor detects a physiological need for more airflow. Variations disclosed elsewhere in this disclosure or in priority-linked disclosures can also be applied to this example.

Figure 38:
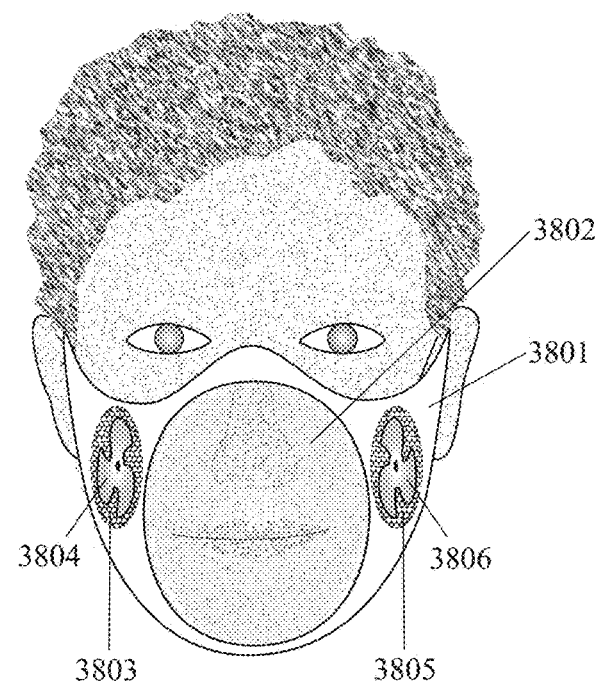
FIG. 38 shows a mask with a transparent portion, a right-side impellor-driven air filter, and a left-side impellor-driven air filter.

FIG. 38 shows a front view of an example of a protective face mask comprising: a face mask worn by a person; wherein the mask further comprises a non-transparent portion 3801; wherein the mask further comprises a transparent portion 3802 which covers the person's mouth; wherein the mask further comprises a first air filter 3803 on a first side (e.g. the right side) of the person's head, wherein the first air filter is in fluid communication with space between the transparent portion and the person's mouth; wherein the mask further comprises a first impellor 3804 which draws air from outside the mask through the first air filter into the space between the transparent portion and the person's mouth; wherein the mask further comprises a second air filter 3805 on the opposite side (e.g. the left side) of the person's head, wherein the second air filter is in fluid communication with the space between the transparent portion and the person's mouth; and wherein the mask further comprises a second impellor 3806 which draws air through the second air filter.

In an example, the transparent portion can have a concavity which faces toward the person's mouth. In an example, the transparent portion can have a circular, elliptical, oval-shaped, or egg-shaped perimeter. In an example, the air filters can be located over the person's cheeks. In an example, air can be drawn into the mask through the second air filter by an impellor. In an example, air can be drawn out of the mask through the second air filter by an impellor. In an example, one or both impellers can be activated by the person when the person detects an environmental risk and/or a physiological need for more airflow. In an example, the mask can further comprise a sensor and one or both impellers can be automatically activated when the sensor detects an environmental risk and/or a physiological need for more airflow. Variations disclosed elsewhere in this disclosure or in priority-linked disclosures can also be applied to this example.

Figure 39:
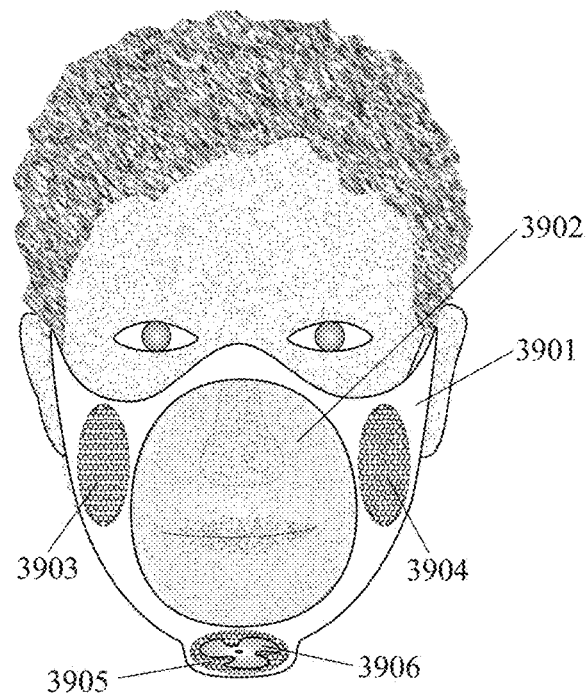
FIG. 39 shows a mask with a transparent portion, an impellor-driven air filter on a person's chin, a right-side passive air filter, and a left-side passive air filter.

FIG. 39 shows a front view of an example of a protective face mask comprising: a face mask worn by a person; wherein the mask further comprises a non-transparent portion 3901; wherein the mask further comprises a transparent portion 3902 which covers the person's mouth; wherein the mask further comprises a first air filter 3903 on a first side (e.g. the right side) of the person's head, wherein the first air filter is in fluid communication with space between the transparent portion and the person's mouth; wherein the mask further comprises a second air filter 3904 on the opposite side (e.g. the left side) of the person's head, wherein the second air filter is in fluid communication with the space between the transparent portion and the person's mouth; wherein the mask further comprises a third air filter 3905 under (or on) the person's chin, wherein the third air filter is in fluid communication with the space between the transparent portion and the person's mouth; and wherein the mask further comprises an impellor 3906 which draws air from outside the mask through the third air filter into the space between the transparent portion and the person's mouth.

In an example, the transparent portion can have a concavity which faces toward the person's mouth. In an example, the transparent portion can have a circular, elliptical, oval-shaped, or egg-shaped perimeter. In an example, the first and second air filters can be located over the person's cheeks, respectively. In an example, air can be drawn into the mask through the third air filter primarily by the impellor, but can flow into or out of the mask through the first and second air filters due to the person's respiration. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 40:
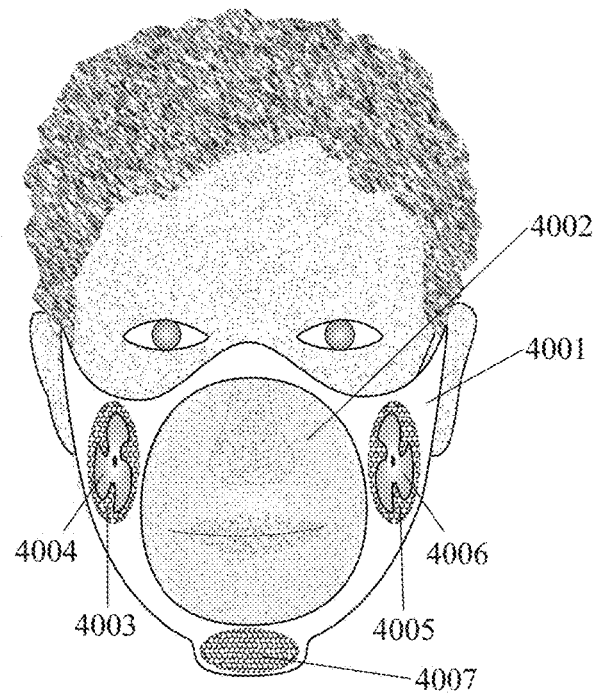
FIG. 40 shows a mask with a transparent portion, a right-side impellor-driven air filter, a left-side impellor-driven air filter, and a passive air filter on a person's chin.

FIG. 40 shows a front view of an example of a protective face mask comprising: a face mask worn by a person; wherein the mask further comprises a non-transparent portion 4001; wherein the mask further comprises a transparent portion 4002 which covers the person's mouth; wherein the mask further comprises a first air filter 4003 on a first side (e.g. the right side) of the person's head, wherein the first air filter is in fluid communication with space between the transparent portion and the person's mouth; wherein the mask further comprises a first impellor 4004 which draws air from outside the mask through the first air filter into the space between the transparent portion and the person's mouth; wherein the mask further comprises a second air filter 4005 on the opposite side (e.g. the left side) of the person's head, wherein the second air filter is in fluid communication with the space between the transparent portion and the person's mouth; wherein the mask further comprises a second impellor 4006 which draws air from outside the mask through the second air filter into the space between the transparent portion and the person's mouth; and wherein the mask further comprises a third air filter 4007 under (or on) the person's chin, wherein the third air filter is in fluid communication with the space between the transparent portion and the person's mouth.

In an example, the transparent portion of the mask can have a concavity which faces toward the person's mouth. In an example, the transparent portion can have a circular, elliptical, oval-shaped, or egg-shaped perimeter. In an example, the first and second air filters can be located over the person's cheeks, respectively. In an example, one or both impellers can be activated by the person when the person detects an environmental risk and/or a physiological need for more airflow. In an example, the mask can further comprise a sensor and one or both impellers can be automatically activated when the sensor detects an environmental risk and/or a physiological need for more airflow. Variations disclosed elsewhere in this disclosure or in priority-linked disclosures can also be applied to this example.

Figure 41:
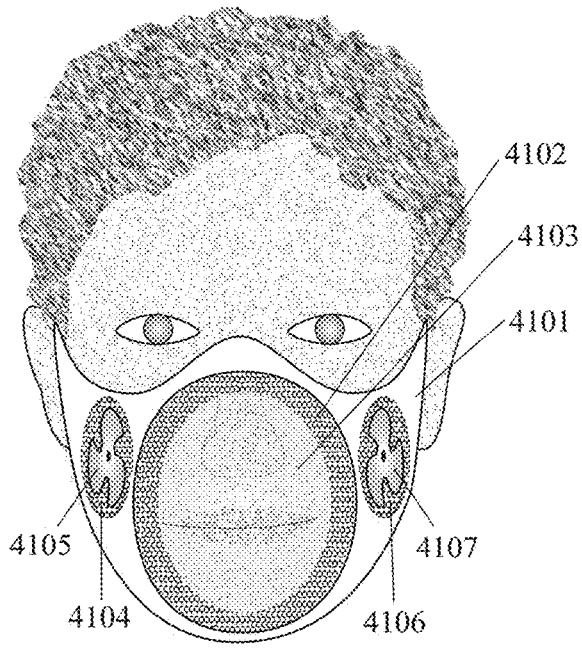
FIG. 41 shows a mask with a transparent portion, a right-side impellor-driven air filter, a left-side impellor-driven air filter, and a passive air filter around the transparent portion.

FIG. 41 shows a front view of an example of a protective face mask comprising: a face mask worn by a person; wherein the mask further comprises a non-transparent portion 4101; wherein the mask further comprises a transparent portion 4103 which covers the person's mouth; wherein the mask further comprises a first air filter 4104 on a first side (e.g. the right side) of the person's head, wherein the first air filter is in fluid communication with space between the transparent portion and the person's mouth; wherein the mask further comprises a first impellor 4105 which draws air from outside the mask through the first air filter into the space between the transparent portion and the person's mouth; wherein the mask further comprises a second air filter 4106 on the opposite side (e.g. the left side) of the person's head, wherein the second air filter is in fluid communication with the space between the transparent portion and the person's mouth; wherein the mask further comprises a second impellor 4107 which draws air from outside the mask through the second air filter into the space between the transparent portion and the person's mouth; and wherein the mask further comprises an arcuate third air filter 4102 around (at least a portion of) the perimeter of the transparent portion.

In an example, the transparent portion of the mask can have a concavity which faces toward the person's mouth. In an example, the transparent portion can have a circular, elliptical, oval-shaped, or egg-shaped perimeter. In an example, the first and second air filters can be located over the person's cheeks, respectively. In an example, one or both impellers can be activated by the person when the person detects an environmental risk and/or a physiological need for more airflow. In an example, the mask can further comprise a sensor and one or both impellers can be automatically activated when the sensor detects an environmental risk and/or a physiological need for more airflow. Variations disclosed elsewhere in this disclosure or in priority-linked disclosures can also be applied to this example.

Figure 42:
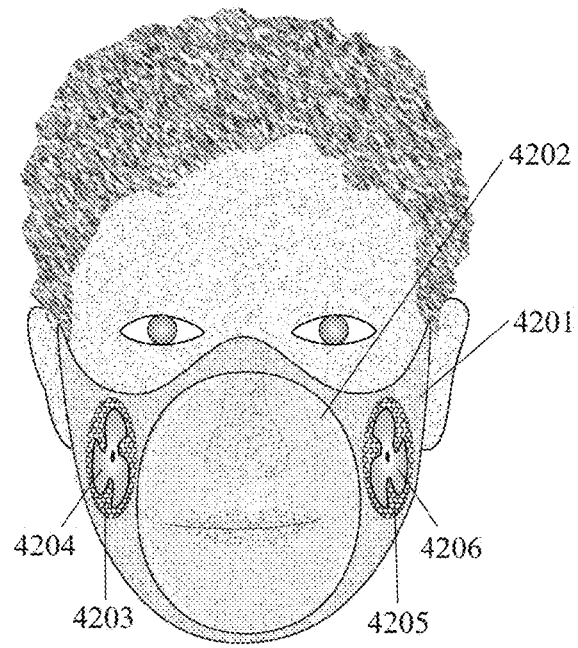
FIG. 42 shows a mask with a transparent portion, a right-side impellor-driven air filter and a left-side impellor-driven air filter.

FIG. 42 shows a front view of an example of a protective face mask comprising: a face mask worn by a person; wherein the mask further comprises a non-transparent portion 4201; wherein the mask further comprises a transparent portion 4202 which covers the person's mouth; wherein the mask further comprises a first air filter 4203 on a first side (e.g. the right side) of the person's head, wherein the first air filter is in fluid communication with space between the transparent portion and the person's mouth; wherein the mask further comprises a first impellor 4204 which draws air through the first air filter; wherein the mask further comprises a second air filter 4205 on the opposite side (e.g. the left side) of the person's head, wherein the second air filter is in fluid communication with the space between the transparent portion and the person's mouth; and wherein the mask further comprises a second impellor 4206 which draws air through the second air filter.

In an example, both impellors can draw air into the mask. In an example, one impellors can draw air into the mask and the other impellor can draw air out of the mask. In an example, the transparent portion of the mask can have a concavity which faces toward the person's mouth. In an example, the transparent portion can have a circular, elliptical, oval-shaped, or egg-shaped perimeter. In an example, the first and second air filters can be located over the person's cheeks, respectively. In an example, one or both impellers can be activated by the person when the person detects an environmental risk and/or a physiological need for more airflow. In an example, the mask can further comprise a sensor and one or both impellers can be automatically activated when the sensor detects an environmental risk and/or a physiological need for more airflow. Variations disclosed elsewhere in this disclosure or in priority-linked disclosures can also be applied to this example.

Figure 43:
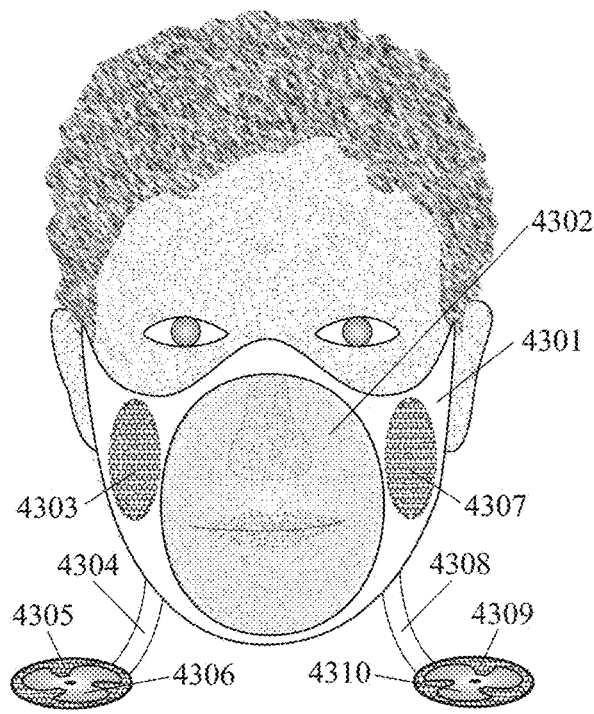
FIG. 43 shows a mask with a transparent portion, passive air filters on the sides of a person's face, and impellor-driven air filters on the person's neck or torso.

FIG. 43 shows a front view of an example of a protective face mask comprising: a face mask worn by a person; wherein the mask further comprises a non-transparent portion 4301; wherein the mask further comprises a transparent portion 4302 which covers the person's mouth; wherein the mask further comprises a first air filter 4303 on a first side (e.g. the right side) of the person's head, wherein the first air filter is in fluid communication with space between the transparent portion and the person's mouth; wherein the mask further comprises a second air filter 4307 on the opposite side (e.g. the left side) of the person's head, wherein the second air filter is in fluid communication with the space between the transparent portion and the person's mouth; wherein the mask further comprises a third air filter 4305 on a first side (e.g. the right side) of the person's neck or torso, a first air tube (or air channel) 4304 through which the third air filter is in fluid communication with the space between the transparent portion and the person's mouth, and a first impellor 4306 which draws air from outside the mask through the third air filter; and wherein the mask further comprises a fourth air filter 4309 on the opposite side (e.g. the left side) of the person's neck or torso, a second air tube (or air channel) 4308 through which the fourth air filter is in fluid communication with the space between the transparent portion and the person's mouth, and a second impellor 4310 which draws air from outside the mask through the fourth air filter.

In an example, the transparent portion can have a concavity which faces toward the person's mouth. In an example, the transparent portion can have a circular, elliptical, oval-shaped, or egg-shaped perimeter. In an example, the first and second air filters can be located over the person's cheeks, respectively. In an example, air can be drawn into the mask through the third and fourth air filters primarily by impellors, but can flow into or out of the mask through the first and second air filters due to the person's respiration. In an example, the impellers can be activated by the person when the person detects an environmental risk and/or a physiological need for more airflow. In an example, the mask can further comprise a sensor and the impellers can be automatically activated when the sensor detects an environmental risk and/or a physiological need for more airflow. Variations disclosed elsewhere in this disclosure or in priority-linked disclosures can also be applied to this example.

Figure 44:
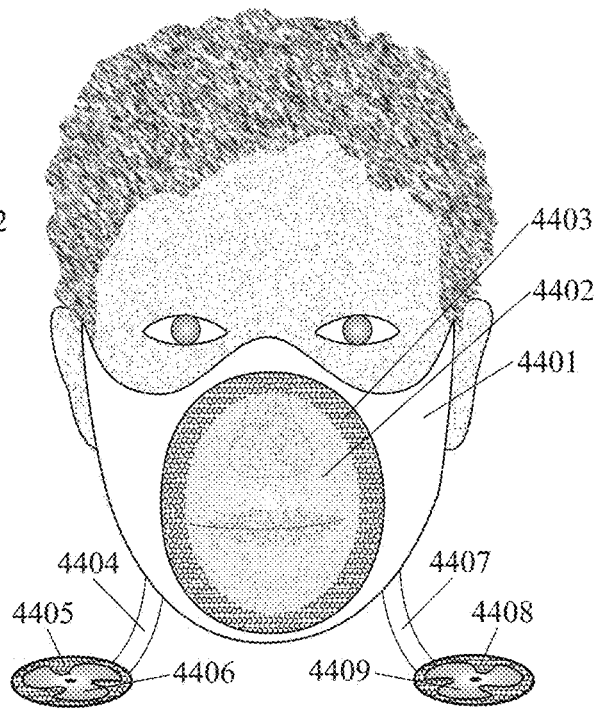
FIG. 44 shows a mask with a transparent portion, a passive air filter around the transparent portion, and impellor-driven air filters on the person's neck or torso.

FIG. 44 shows a front view of an example of a protective face mask comprising: a face mask worn by a person; wherein the mask further comprises a non-transparent portion 4401; wherein the mask further comprises a transparent portion 4402 which covers the person's mouth; wherein the mask further comprises a first air filter 4403 around (at least part of) the perimeter of the transparent portion; wherein the mask further comprises a second air filter 4405 on a first side (e.g. the right side) of the person's neck or torso, a first air tube (or air channel) 4404 through which the second air filter is in fluid communication with the space between the transparent portion and the person's mouth, and a first impellor 4406 which draws air from outside the mask through the second air filter; and wherein the mask further comprises a third air filter 4408 on the opposite side (e.g. the left side) of the person's neck or torso, a second air tube (or air channel) 4407 through which the third air filter is in fluid communication with the space between the transparent portion and the person's mouth, and a second impellor 4409 which draws air from outside the mask through the third air filter.

In an example, the transparent portion can have a concavity which faces toward the person's mouth. In an example, the transparent portion can have a circular, elliptical, oval-shaped, or egg-shaped perimeter. In an example, air can be drawn into the mask through the second and third air filters primarily by impellors, but can flow into or out of the mask through the first air filter due to the person's respiration. In an example, the impellers can be activated by the person when the person detects an environmental risk and/or a physiological need for more airflow. In an example, the mask can further comprise a sensor and the impellers can be automatically activated when the sensor detects an environmental risk and/or a physiological need for more airflow. Variations disclosed elsewhere in this disclosure or in priority-linked disclosures can also be applied to this example.

Figures 45, 46:
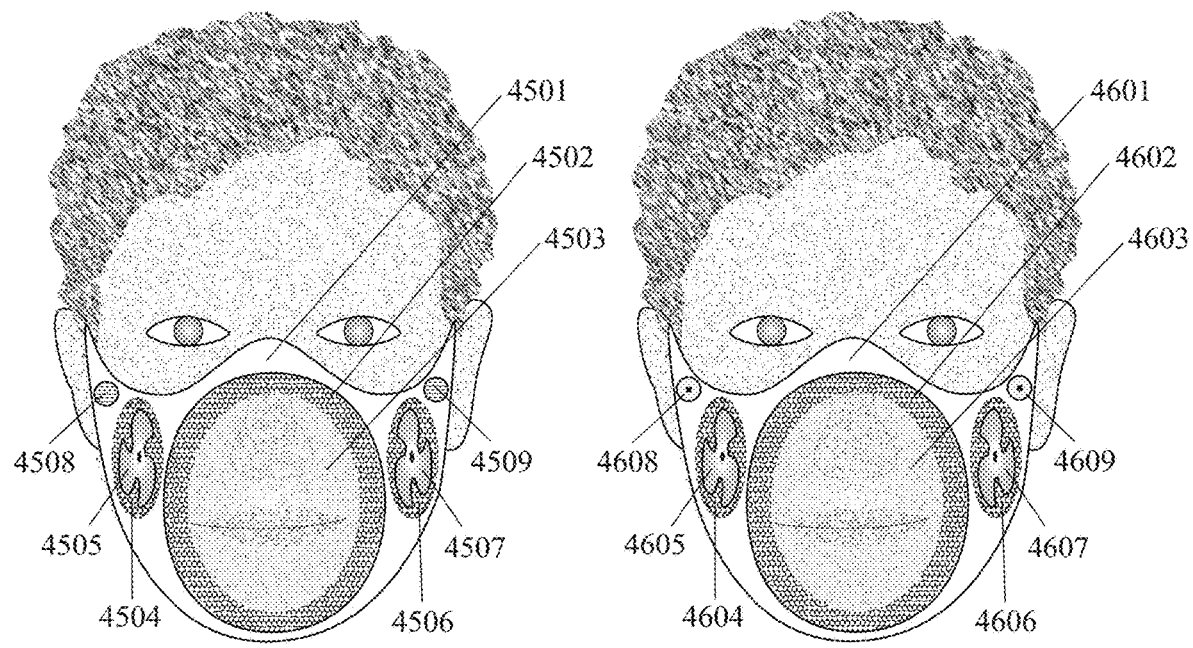
FIG. 45 shows a mask with a transparent portion, a passive air filter around the transparent portion, impellor-driven air filters on the sides of a person's face, and one or more microphones.
FIG. 46 shows a mask with a transparent portion, a passive air filter around the transparent portion, impellor-driven air filters on the sides of a person's face, and one or more cameras.

FIG. 45 shows a front view of an example of a protective face mask comprising: a face mask worn by a person; wherein the mask further comprises a non-transparent portion 4501; a transparent portion 4503 which covers the person's mouth; a first air filter 4504 on a first (e.g. right) side of the person's head, wherein the first air filter is in fluid communication with space between the transparent portion and the person's mouth; a first impellor 4505 which draws air from outside the mask through the first air filter into the space between the transparent portion and the person's mouth; a second air filter 4506 on the opposite (e.g. left) side of the person's head, wherein the second air filter is in fluid communication with the space between the transparent portion and the person's mouth; a second impellor 4507 which draws air from outside the mask through the second air filter into the space between the transparent portion and the person's mouth; a third air filter 4502 around (at least a portion of) the transparent portion; and one or more microphones (4508 and 4509), wherein the rotational speed of the first impellor and/or the second impellor is increased automatically in response to a potential environmental or physiological risk which is detected by analysis of data from the one or more microphones.

In an example, a potential environmental risk can be the sound of someone nearby coughing, sneezing, or talking. In an example, a potential physiological risk can be the sound of labored or heavy breathing. In an example, a mask can have a right-side microphone and a left-side microphone. In an example, a mask can further comprise one or more motion sensors. In an example, a transparent portion of the mask can have a concavity which faces toward the person's mouth. In an example, a non-transparent portion can connect and/or attach the transparent portion to the person's head (e.g. to the person's ears). In an example, a transparent portion can have a circular, elliptical, oval-shaped, or egg-shaped perimeter. In an example, a transparent portion of a mask can cover a person's nose nostrils as well as the person's mouth. In an example, a third air filter can encircle the transparent portion and/or the person's mouth. In an example, first and second air filters can be located over the person's right and left cheeks, respectively. Variations disclosed elsewhere in this disclosure or in priority-linked disclosures can also be applied to this example.

FIG. 46 shows a front view of an example of a protective face mask comprising: a face mask worn by a person; wherein the mask further comprises a non-transparent portion 4601; a transparent portion 4603 which covers the person's mouth; a first air filter 4604 on a first (e.g. right) side of the person's head, wherein the first air filter is in fluid communication with space between the transparent portion and the person's mouth; a first impellor 4605 which draws air from outside the mask through the first air filter into the space between the transparent portion and the person's mouth; a second air filter 4606 on the opposite (e.g. left) side of the person's head, wherein the second air filter is in fluid communication with the space between the transparent portion and the person's mouth; a second impellor 4607 which draws air from outside the mask through the second air filter into the space between the transparent portion and the person's mouth; a third air filter 4602 around (at least a portion of) the transparent portion; and one or more cameras (4608 and 4609), wherein the rotational speed of the first impellor and/or the second impellor is increased automatically in response to a potential environmental or physiological risk which is detected by analysis of data from the one or more cameras.

In an example, a potential environmental risk can be one or more people nearby (e.g. closer than six feet away) and/or rapidly approaching. In an example, a potential environmental risk can be detection of a (building or vehicle) interior environment. In an example, a mask can have a right-side camera and a left-side camera. In an example, a mask can further comprise one or more motion sensors. In an example, a transparent portion of the mask can have a concavity which faces toward the person's mouth. In an example, a non-transparent portion can connect and/or attach the transparent portion to the person's head (e.g. to the person's ears). In an example, a transparent portion can have a circular, elliptical, oval-shaped, or egg-shaped perimeter. In an example, a transparent portion of a mask can cover a person's nose nostrils as well as the person's mouth. In an example, a third air filter can encircle the transparent portion and/or the person's mouth. In an example, first and second air filters can be located over the person's right and left cheeks, respectively. Variations disclosed elsewhere in this disclosure or in priority-linked disclosures can also be applied to this example.

Figures 47, 48:
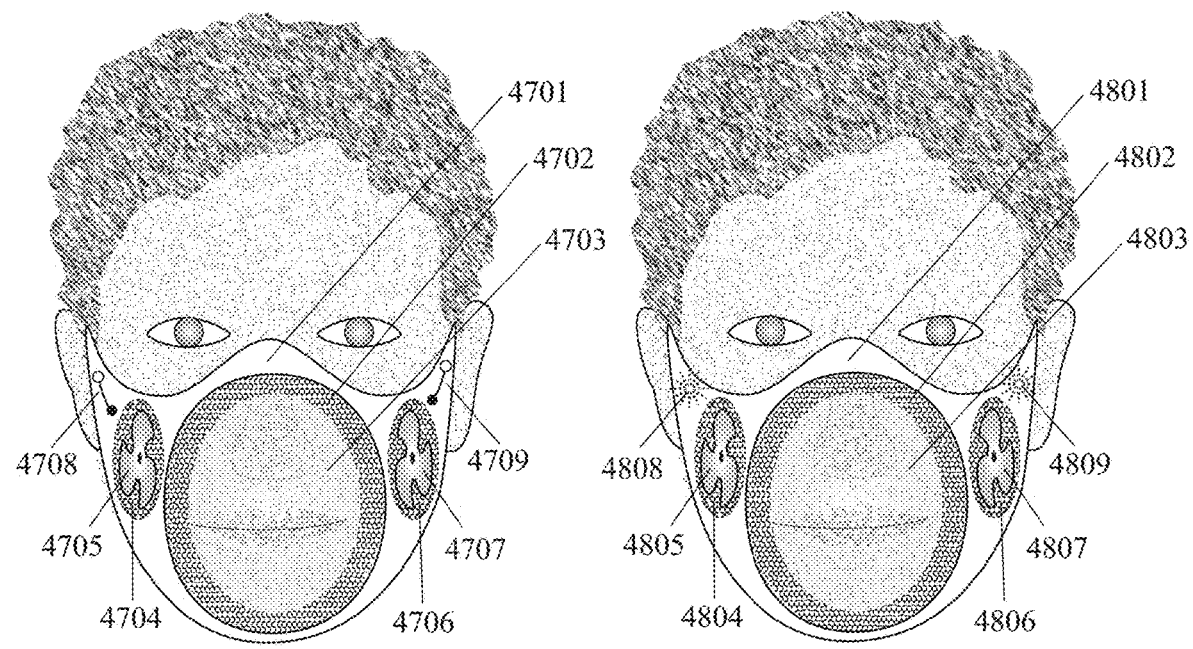
FIG. 47 shows a mask with a transparent portion, a passive air filter around the transparent portion, impellor-driven air filters on the sides of a person's face, and one or more electromagnetic energy sensors.
FIG. 48 shows a mask with a transparent portion, a passive air filter around the transparent portion, impellor-driven air filters on the sides of a person's face, and one or more light-emitting (e.g. spectroscopic or infrared) sensors.

FIG. 47 shows a front view of an example of a protective face mask comprising: a face mask worn by a person; wherein the mask further comprises a non-transparent portion 4701; a transparent portion 4703 which covers the person's mouth; a first air filter 4704 on a first (e.g. right) side of the person's head, wherein the first air filter is in fluid communication with space between the transparent portion and the person's mouth; a first impellor 4705 which draws air from outside the mask through the first air filter into the space between the transparent portion and the person's mouth; a second air filter 4706 on the opposite (e.g. left) side of the person's head, wherein the second air filter is in fluid communication with the space between the transparent portion and the person's mouth; a second impellor 4707 which draws air from outside the mask through the second air filter into the space between the transparent portion and the person's mouth; a third air filter 4702 around (at least a portion of) the transparent portion; and one or more electromagnetic energy sensors (4708 and 4709), wherein the rotational speed of the first impellor and/or the second impellor is increased automatically in response to a potential physiological or environmental risk which is detected by analysis of data from the one or more cameras.

In an example, a mask can have a right-side electromagnetic energy sensor and a left-side electromagnetic energy sensor. In an example, a mask can further comprise one or more motion sensors. In an example, a transparent portion of the mask can have a concavity which faces toward the person's mouth. In an example, a non-transparent portion can connect and/or attach the transparent portion to the person's head (e.g. to the person's ears). In an example, a transparent portion can have a circular, elliptical, oval-shaped, or egg-shaped perimeter. In an example, a transparent portion of a mask can cover a person's nose nostrils as well as the person's mouth. In an example, a third air filter can encircle the transparent portion and/or the person's mouth. In an example, first and second air filters can be located over the person's right and left cheeks, respectively. Variations disclosed elsewhere in this disclosure or in priority-linked disclosures can also be applied to this example.

FIG. 48 shows a front view of an example of a protective face mask comprising: a face mask worn by a person; wherein the mask further comprises a non-transparent portion 4801; a transparent portion 4803 which covers the person's mouth; a first air filter 4804 on a first (e.g. right) side of the person's head, wherein the first air filter is in fluid communication with space between the transparent portion and the person's mouth; a first impellor 4805 which draws air from outside the mask through the first air filter into the space between the transparent portion and the person's mouth; a second air filter 4806 on the opposite (e.g. left) side of the person's head, wherein the second air filter is in fluid communication with the space between the transparent portion and the person's mouth; a second impellor 4807 which draws air from outside the mask through the second air filter into the space between the transparent portion and the person's mouth; a third air filter 4802 around (at least a portion of) the transparent portion; and one or more light-emitting (e.g. spectroscopic or infrared) sensors (4808 and 4809), wherein the rotational speed of the first impellor and/or the second impellor is increased automatically in response to a potential physiological or environmental risk which is detected by analysis of data from the one or more light-emitting sensors.

In an example, a mask can have a right-side light-emitting (e.g. spectroscopic or infrared) sensor and a left-side light-emitting (e.g. spectroscopic or infrared) sensor. In an example, a mask can further comprise one or more motion sensors. In an example, a transparent portion of the mask can have a concavity which faces toward the person's mouth. In an example, a non-transparent portion can connect and/or attach the transparent portion to the person's head (e.g. to the person's ears). In an example, a transparent portion can have a circular, elliptical, oval-shaped, or egg-shaped perimeter. In an example, a transparent portion of a mask can cover a person's nose nostrils as well as the person's mouth. In an example, a third air filter can encircle the transparent portion and/or the person's mouth. In an example, first and second air filters can be located over the person's right and left cheeks, respectively. Variations disclosed elsewhere in this disclosure or in priority-linked disclosures can also be applied to this example.

Figure 49:
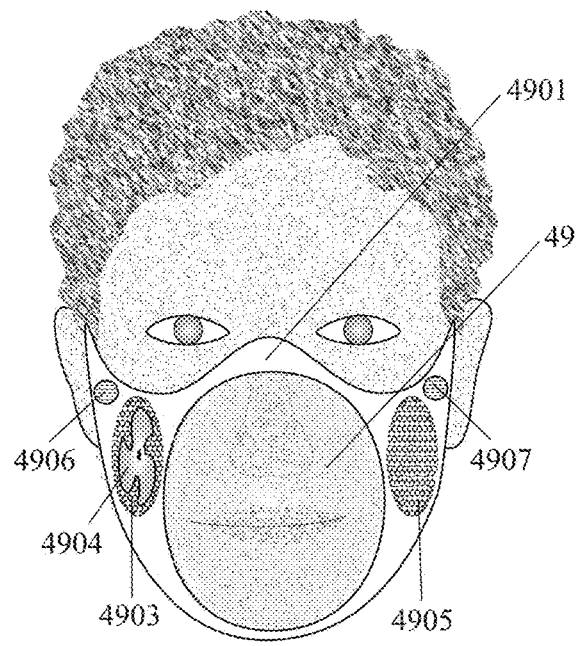
FIG. 49 shows a mask with a transparent portion, an impellor-driven air filter on one side of a person's face, a passive air filter on the other side of the person's face, and one or more microphones.

FIG. 49 shows a front view of an example of a protective face mask comprising: a face mask worn by a person; wherein the mask further comprises a non-transparent portion 4901; a transparent portion 4902 which covers the person's mouth; a first air filter 4903 on a first (e.g. right) side of the person's head, wherein the first air filter is in fluid communication with space between the transparent portion and the person's mouth; an impellor 4904 which draws air from outside the mask through the first air filter into the space between the transparent portion and the person's mouth; a second air filter 4905 on the opposite (e.g. left) side of the person's head, wherein the second air filter is in fluid communication with the space between the transparent portion and the person's mouth; and one or more microphones (4906 and 4907), wherein the rotational speed of the impellor is increased automatically in response to a potential environmental or physiological risk which is detected by analysis of data from the one or more microphones.

In an example, a potential environmental risk can be the sound of someone nearby coughing, sneezing, or talking. In an example, a potential physiological risk can be the sound of labored or heavy breathing. In an example, a mask can have a right-side microphone and a left-side microphone. In an example, a mask can further comprise one or more motion sensors. In an example, a transparent portion of the mask can have a concavity which faces toward the person's mouth. In an example, a non-transparent portion can connect and/or attach the transparent portion to the person's head (e.g. to the person's ears). In an example, a transparent portion can have a circular, elliptical, oval-shaped, or egg-shaped perimeter. In an example, a transparent portion of a mask can cover a person's nose nostrils as well as the person's mouth. In an example, first and second air filters can be located over the person's right and left cheeks, respectively. Variations disclosed elsewhere in this disclosure or in priority-linked disclosures can also be applied to this example.

Figure 50:
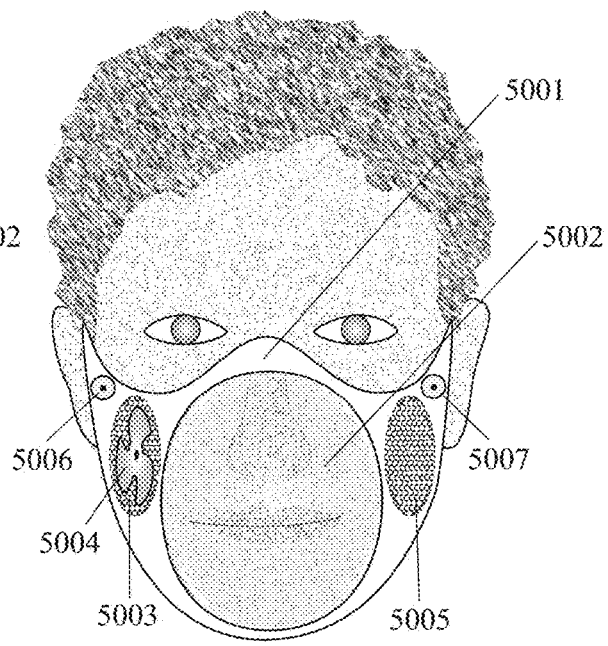
FIG. 50 shows a mask with a transparent portion, an impellor-driven air filter on one side of a person's face, a passive air filter on the other side of the person's face, and one or more cameras.

FIG. 50 shows a front view of an example of a protective face mask comprising: a face mask worn by a person; wherein the mask further comprises a non-transparent portion 5001; a transparent portion 5002 which covers the person's mouth; a first air filter 5003 on a first (e.g. right) side of the person's head, wherein the first air filter is in fluid communication with space between the transparent portion and the person's mouth; an impellor 5004 which draws air from outside the mask through the first air filter into the space between the transparent portion and the person's mouth; a second air filter 5005 on the opposite (e.g. left) side of the person's head, wherein the second air filter is in fluid communication with the space between the transparent portion and the person's mouth; and one or more cameras (5006 and 5007), wherein the rotational speed of the impellor is increased automatically in response to a potential environmental or physiological risk which is detected by analysis of data from the one or more cameras.

In an example, a potential environmental risk can be one or more people nearby (e.g. closer than six feet away) and/or rapidly approaching. In an example, a potential environmental risk can be detection of a (building or vehicle) interior environment. In an example, a mask can have a right-side camera and a left-side camera. In an example, a mask can further comprise one or more motion sensors. In an example, a transparent portion of the mask can have a concavity which faces toward the person's mouth. In an example, a non-transparent portion can connect and/or attach the transparent portion to the person's head (e.g. to the person's ears). In an example, a transparent portion can have a circular, elliptical, oval-shaped, or egg-shaped perimeter. In an example, a transparent portion of a mask can cover a person's nose nostrils as well as the person's mouth. In an example, first and second air filters can be located over the person's right and left cheeks, respectively. Variations disclosed elsewhere in this disclosure or in priority-linked disclosures can also be applied to this example.

Figure 51:
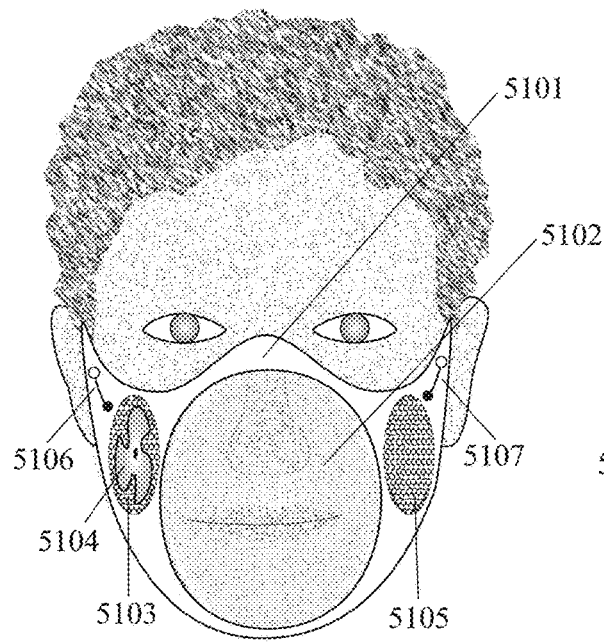
FIG. 51 shows a mask with a transparent portion, an impellor-driven air filter on one side of a person's face, a passive air filter on the other side of the person's face, and one or more electromagnetic energy sensors.

FIG. 51 shows a front view of an example of a protective face mask comprising: a face mask worn by a person; wherein the mask further comprises a non-transparent portion 5101; a transparent portion 5102 which covers the person's mouth; a first air filter 5103 on a first (e.g. right) side of the person's head, wherein the first air filter is in fluid communication with space between the transparent portion and the person's mouth; an impellor 5104 which draws air from outside the mask through the first air filter into the space between the transparent portion and the person's mouth; a second air filter 5105 on the opposite (e.g. left) side of the person's head, wherein the second air filter is in fluid communication with the space between the transparent portion and the person's mouth; and one or more electromagnetic energy sensors (5106 and 5107), wherein the rotational speed of the impellor is increased automatically in response to a potential physiological or environmental risk which is detected by analysis of data from the one or more cameras.

In an example, a mask can have a right-side electromagnetic energy sensor and a left-side electromagnetic energy sensor. In an example, a mask can further comprise one or more motion sensors. In an example, a transparent portion of the mask can have a concavity which faces toward the person's mouth. In an example, a non-transparent portion can connect and/or attach the transparent portion to the person's head (e.g. to the person's ears). In an example, a transparent portion can have a circular, elliptical, oval-shaped, or egg-shaped perimeter. In an example, a transparent portion of a mask can cover a person's nose nostrils as well as the person's mouth. In an example, first and second air filters can be located over the person's right and left cheeks, respectively. Variations disclosed elsewhere in this disclosure or in priority-linked disclosures can also be applied to this example.

Figure 52:
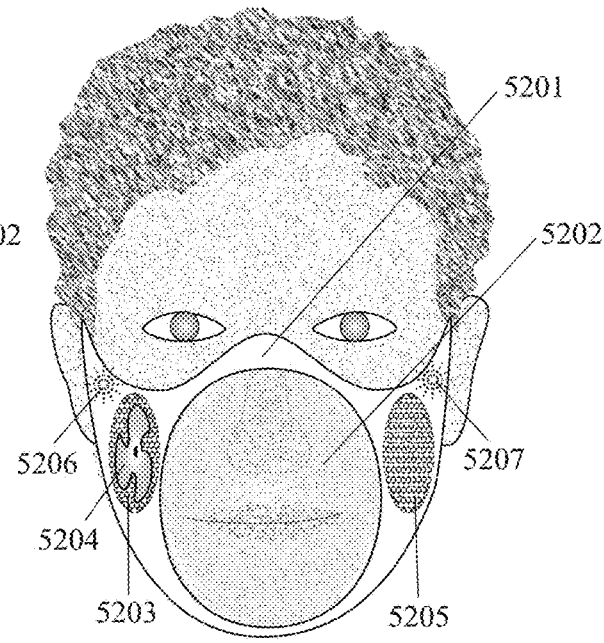
FIG. 52 shows a mask with a transparent portion, an impellor-driven air filter on one side of a person's face, a passive air filter on the other side of the person's face, and one or more light-emitting (e.g. spectroscopic or infrared) sensors.

FIG. 52 shows a front view of an example of a protective face mask comprising: a face mask worn by a person; wherein the mask further comprises a non-transparent portion 5201; a transparent portion 5202 which covers the person's mouth; a first air filter 5203 on a first (e.g. right) side of the person's head, wherein the first air filter is in fluid communication with space between the transparent portion and the person's mouth; an impellor 5204 which draws air from outside the mask through the first air filter into the space between the transparent portion and the person's mouth; a second air filter 5205 on the opposite (e.g. left) side of the person's head, wherein the second air filter is in fluid communication with the space between the transparent portion and the person's mouth; and one or more light-emitting (e.g. spectroscopic or infrared) sensors (5206 and 5207), wherein the rotational speed of the impellor is increased automatically in response to a potential physiological or environmental risk which is detected by analysis of data from the one or more light-emitting sensors.

In an example, a mask can have a right-side light-emitting (e.g. spectroscopic or infrared) sensor and a left-side light-emitting (e.g. spectroscopic or infrared) sensor. In an example, a mask can further comprise one or more motion sensors. In an example, a transparent portion of the mask can have a concavity which faces toward the person's mouth. In an example, a non-transparent portion can connect and/or attach the transparent portion to the person's head (e.g. to the person's ears). In an example, a transparent portion can have a circular, elliptical, oval-shaped, or egg-shaped perimeter. In an example, a transparent portion of a mask can cover a person's nose nostrils as well as the person's mouth. In an example, first and second air filters can be located over the person's right and left cheeks, respectively. Variations disclosed elsewhere in this disclosure or in priority-linked disclosures can also be applied to this example.

Figure 53:
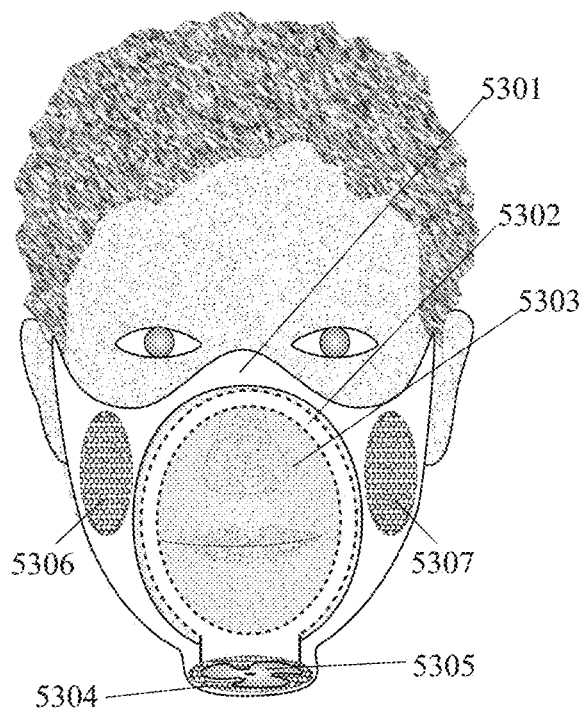
FIG. 53 shows a mask with a transparent portion, an impellor-driven air filter on a person's chin, wherein the air filter is connected to an air tube around the transparent portion, and passive air filters on the sides of the person's face.

FIG. 53 shows a front view of an example of a protective face mask comprising: a face mask worn by a person; wherein the mask further comprises: a non-transparent portion 5301; a transparent portion 5303 which covers the person's mouth; a first air filter 5306 on a first (e.g. right) side of the person's head, wherein the first air filter is in fluid communication with space between the transparent portion and the person's mouth; a second air filter 5307 on the opposite (e.g. left) side of the person's head, wherein the second air filter is in fluid communication with the space between the transparent portion and the person's mouth; a third air filter 5304 under (or on) the person's chin; an impellor 5305 which draws air from outside the mask through the third air filter; and an air tube 5302 with holes (or openings) around (at least a portion of) the perimeter of the transparent portion, wherein air flows through the air tube from the third air filter into the space between the transparent portion and the person's mouth.

In an example, the transparent portion can have a concavity which faces toward the person's mouth. In an example, the transparent portion can have a circular, elliptical, oval-shaped, or egg-shaped perimeter. In an example, the first and second air filters can be located over the person's cheeks, respectively. In an example, air can be drawn into the mask through the third air filter primarily by the impellor, but can flow into or out of the mask through the first and second air filters due to the person's respiration. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 54:
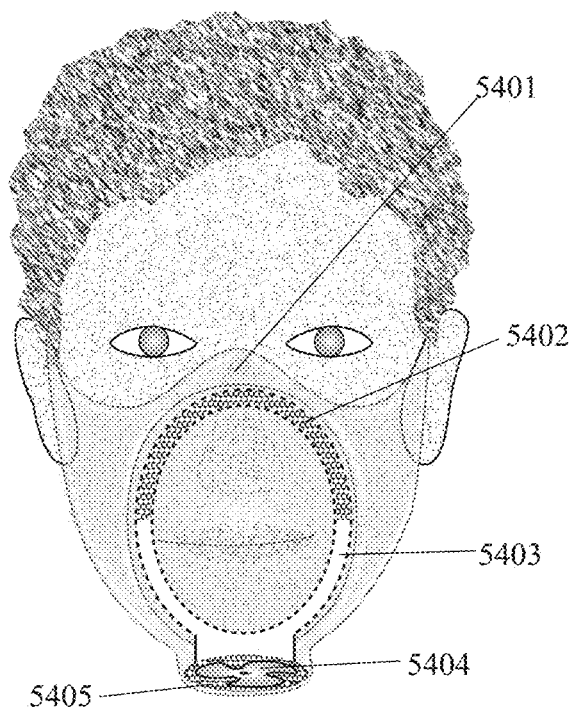
FIG. 54 shows a mask with a transparent portion, an impellor-driven air filter on a person's chin, wherein the air filter is connected to an air tube along the lower perimeter of the transparent portion, and a passive air filters along the upper perimeter of the transparent portion.

FIG. 54 shows a front view of an example of a protective face mask comprising: a face mask worn by a person; wherein the mask further comprises a transparent portion 5401; a first air filter 5402 around the person's mouth; a second air filter 5405 under (or on) the person's chin; an impellor 5404 which draws air from outside the mask through the second air filter; and an air tube 5403 with holes (or openings) around the person's mouth, wherein air flows through the air tube from the second air filter into the space between the transparent portion and the person's mouth.

In an example, the transparent portion can have a concavity which faces toward the person's mouth. In an example, the transparent portion can have a circular, elliptical, oval-shaped, or egg-shaped perimeter. In an example, air can be drawn into the mask through the second air filter primarily by the impellor, but can flow into or out of the mask through the first air filter due to the person's respiration. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

Figure 55:
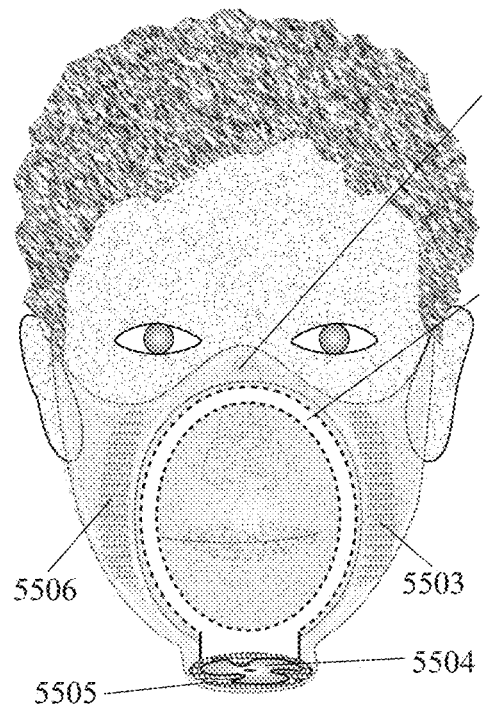
FIG. 55 shows a mask with a transparent portion, an impellor-driven air filter on a person's chin, wherein the air filter is connected to an air tube around the perimeter of the transparent portion, and passive air filters on the sides of the person's face.

FIG. 55 shows a front view of an example of a protective face mask comprising: a face mask worn by a person; wherein the mask further comprises a transparent portion 5501; a first crescent, boomerang, or fish-gill-shaped air filter 5506 on a first (e.g. right) side of the person's head, wherein the first air filter is in fluid communication with space between the transparent portion and the person's mouth; a second crescent, boomerang, or fish-gill-shaped air filter 5503 on the opposite (e.g. left) side of the person's head, wherein the second air filter is in fluid communication with the space between the transparent portion and the person's mouth; a third air filter 5505 under (or on) the person's chin; an impellor 5504 which draws air from outside the mask through the second air filter; and an air tube 5502 with holes (or openings) around the person's mouth, wherein air flows through the air tube from the second air filter into the space between the transparent portion and the person's mouth.

In an example, the transparent portion can have a concavity which faces toward the person's mouth. In an example, the transparent portion can have a circular, elliptical, oval-shaped, or egg-shaped perimeter. In an example, air can be drawn into the mask through the third air filter primarily by the impellor, but can flow into or out of the mask through the first and/or second air filters due to the person's respiration. In an example, the impeller can be activated by the person when the person detects an environmental risk and/or a physiological need for more airflow. In an example, the mask can further comprise a sensor and the impeller can be automatically activated when the sensor detects an environmental risk and/or a physiological need for more airflow. Variations disclosed elsewhere in this disclosure or in priority-linked disclosures can also be applied to this example.

FIG. 56 shows a front view of an example of a protective face mask comprising: a face mask worn by a person; wherein the mask further comprises a transparent portion 5601; an air tube (or air channel) 5602 with holes which (entirely or partially) encircles the person's mouth, wherein the air tube (or air channel) is in fluid communication with the space between transparent portion and the person's mouth; a first air filter 5607, a first impellor 5608, and a second air filter 5606 on a first (e.g. right) side of the person's head, wherein the first impellor draws air through the first air filter into the air tube (or air channel); and a third air filter 5604, a second impellor 5603, and a fourth air filter 5605 on the opposite (e.g. left) side of the person's head, wherein the second impellor draws air through the third air filter into the air tube (or air channel).

In an example, the transparent portion can have a concavity which faces toward the person's mouth. In an example, the transparent portion can have a circular, elliptical, oval-shaped, or egg-shaped perimeter. In an example, air can be drawn into the mask through the first and third air filters primarily by impellors, but can flow into or out of the mask through the second and fourth air filters due to the person's respiration. In an example, one or both impellers can be activated by the person when the person detects an environmental risk and/or a physiological need for more airflow. In an example, the mask can further comprise a sensor and one or both impellers can be automatically activated when the sensor detects an environmental risk and/or a physiological need for more airflow. Variations disclosed elsewhere in this disclosure or in priority-linked disclosures can also be applied to this example.

FIG. 57 shows an example of In an example, a smart mask can comprise: a face mask which is configured to be worn by a person so as to cover the person's mouth and nose nostrils, wherein the mask defines an interior space between the mask and the person's mouth and nose nostrils, wherein the portion of the mask which covers the person's mouth is transparent and substantially impermeable to airflow; a first air filter which filters air entering the interior space and a fan (e.g. air fan, impeller, turbine, or pump) which draws or pushes air through the first air filter; a second air filter which filters air exiting the interior space; a data processing unit which controls the operation (e.g. activation and/or speed) of the fan; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of the fan is adjusted based on analysis of data from the sensor.

With respect to specific components, FIG. 57 shows an example of In an example, a smart mask can comprise: a face mask 5701 which is configured to be worn by a person so as to cover the person's mouth and nose nostrils, wherein the mask defines an interior space between the mask and the person's mouth and nose nostrils, wherein the portion 5702 of the mask which covers the person's mouth is transparent and substantially impermeable to airflow; a first air filter 5703 which filters air 5705 entering the interior space and a fan (e.g. air fan, impeller, turbine, or pump) 5704 which draws or pushes air through the first air filter; a second air filter 5707 which filters air 5706 exiting the interior space; a data processing unit 5708 which controls the operation (e.g. activation and/or speed) of the fan; and a sensor 5709 which collects data concerning the person's immediate environment, the person's activity, and/or the person's biometric parameters; wherein the sensor is selected from the group consisting of motion sensor, temperature sensor, humidity sensor, environmental oxygen sensor, carbon dioxide sensor, airborne particle sensor, spectroscopic sensor, ambient light sensor, pulse rate sensor, blood pressure sensor, microphone, and infrared sensor; and wherein the operation of the fan is adjusted based on analysis of data from the sensor.

In this example, the first air filter and the fan are located at the rear of the person's head to reduce forward-projected noise from the mask. Alternatively, the first air filter and/or the fan can be located on a side of the person's face or on the top of the person's head. In this example, air travels through a channel in the mask from the fan to the transparent portion of the mask which covers the person's mouth. In this example, the second air filter is located under the person's jaw so that potentially-humid air is exhausted away from possible eyewear to avoid fogging. Alternatively, the second air filter can be located on a side of the person's face, on the top of the person's head, or at the rear of the person's head.

In this example, there is no second fan which separately draws or pushes air through the second air filter. Alternatively, there can be a second fan which draws or pushes air through the second air filter. In this example, the sensor is biometric sensor which is attached to the person's ear. In an example, this sensor can be a pulse oximeter and the mask can automatically increase airflow (e.g. by activating the fan and/or increasing fan speed) when data from the pulse oximeter indicates that the person's blood oxygen level is low. Alternatively, the sensor can measure the level of oxygen, carbon dioxide, or humidity in air in the interior space of the mask. Example variations discussed elsewhere in this or in priority-linked disclosures can also be applied to this example where relevant.

I claim:

1. A smart mask for air filtration comprising:
   a face mask which is configured to be worn by a person so as to cover the person's mouth and nose nostrils, wherein the face mask defines an interior space between the face mask and the person's mouth and nose nostrils, wherein a transparent portion of the face mask is configured to cover the person's mouth and is substantially impermeable to airflow;
   a first air filter which filters air entering the interior space and a fan which draws or pushes air through the first air filter into the interior space;
   a second air filter which filters air exiting the interior space, wherein the second air filter spans at least 40% of a perimeter of the transparent portion of the face mask and is configured to be substantially parallel to a posterior-anterior axis of the person's head;
   a data processing unit which controls the operation of the fan; and
   a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of the fan is adjusted based on analysis of data from the sensor.

2. A smart mask for air filtration comprising:
   a face mask which is configured to be worn by a person so as to cover the person's mouth and nose nostrils, wherein the face mask defines an interior space between the face mask and the person's mouth and nose nostrils, wherein a transparent portion of the face mask is configured to cover the person's mouth and is substantially impermeable to airflow;
   a first air filter which filters air entering the interior space and a fan which draws or pushes air through the first air filter into the interior space;
   a second air filter which filters air exiting the interior space;
   a data processing unit which controls the operation of the fan;
   an air channel around at least a portion of the perimeter of the transparent portion of the face mask, wherein the air channel has a plurality of openings, and wherein the fan draws or pushes air through the air channel; and a sensor which collects data concerning the person's immediate environment, the person's activity, and/or the person's biometric parameters; wherein the sensor is selected from the group consisting of motion sensor, temperature sensor, humidity sensor, environmental oxygen sensor, blood oxygen sensor, carbon dioxide sensor, airborne particle sensor, spectroscopic sensor, ambient light sensor, pulse rate sensor, blood pressure sensor, microphone, and infrared sensor; and wherein the operation of the fan is adjusted based on analysis of data from the sensor.

* * * * *